(12) United States Patent
McAninch

(10) Patent No.: US 11,258,795 B2
(45) Date of Patent: Feb. 22, 2022

(54) CYBERSECURITY TRAINING SYSTEM AND PROCESS

(71) Applicant: Prevade, LLC, Dallas, TX (US)

(72) Inventor: Bryan McAninch, Frisco, TX (US)

( * ) Notice: Subject to any disclaimer, the term of this patent is extended or adjusted under 35 U.S.C. 154(b) by 0 days.

(21) Appl. No.: 16/351,202

(22) Filed: Mar. 12, 2019

(65) Prior Publication Data

US 2019/0281057 A1 Sep. 12, 2019

Related U.S. Application Data

(60) Provisional application No. 62/641,658, filed on Mar. 12, 2018.

(51) Int. Cl.
*H04L 29/06* (2006.01)
*G06F 9/455* (2018.01)

(52) U.S. Cl.
CPC .......... *H04L 63/10* (2013.01); *G06F 9/45558* (2013.01); *G06F 2009/45587* (2013.01)

(58) Field of Classification Search
CPC .................. H04L 63/10; G06F 9/45558; G06F 2009/45587
See application file for complete search history.

(56) References Cited

U.S. PATENT DOCUMENTS

| | | | |
|---|---|---|---|
| 8,793,799 B2 * | 7/2014 | Fritzson | H04L 63/1441 726/25 |
| 9,509,783 B1 * | 11/2016 | Hayden | H04L 67/34 |
| 10,601,865 B1 * | 3/2020 | Mesdaq | H04L 51/12 |
| 2007/0266426 A1 * | 11/2007 | Iyengar | H04L 9/3213 726/5 |
| 2011/0294564 A1 * | 12/2011 | Michelstein | G06Q 10/10 463/23 |
| 2012/0258437 A1 * | 10/2012 | Sadeh-Koniecpol | G06F 21/55 434/362 |
| 2013/0177878 A1 * | 7/2013 | Rodriquez | G09B 19/0053 434/118 |
| 2014/0123255 A1 * | 5/2014 | Etchegoyen | G06F 21/73 726/7 |
| 2014/0199663 A1 * | 7/2014 | Sadeh-Koniecpol | H04L 63/145 434/118 |
| 2015/0363877 A1 * | 12/2015 | Richardson | G06Q 40/04 705/37 |
| 2016/0154539 A1 * | 6/2016 | Buddhiraja | G06F 9/45558 715/738 |
| 2017/0099278 A1 * | 4/2017 | Ducatel | G06F 21/31 |
| 2017/0140660 A1 * | 5/2017 | Morton | H04L 67/38 |
| 2017/0148347 A1 * | 5/2017 | Stinson | G09B 9/00 |
| 2017/0289168 A1 * | 10/2017 | Bar | G06F 21/316 |
| 2017/0304707 A1 * | 10/2017 | Morton | G09B 9/003 |
| 2018/0247562 A1 * | 8/2018 | Downs | G09B 5/00 |
| 2019/0066530 A1 * | 2/2019 | Lee | G06N 3/006 |
| 2019/0228058 A1 * | 7/2019 | Shang | G06F 40/106 |

* cited by examiner

*Primary Examiner* — Ghodrat Jamshidi

(57) ABSTRACT

A system and process for operating a cybersecurity training platform, providing an immersive and hands-on learning experience through a secure virtual machine and simulated environment with real-world vulnerabilities, which is customized and provisioned on-demand using automation and artificial intelligence.

7 Claims, 77 Drawing Sheets

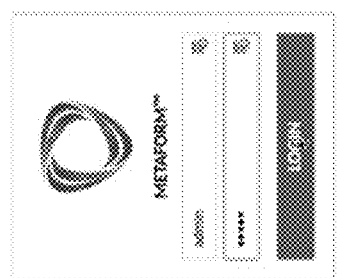
Fig. 4.1

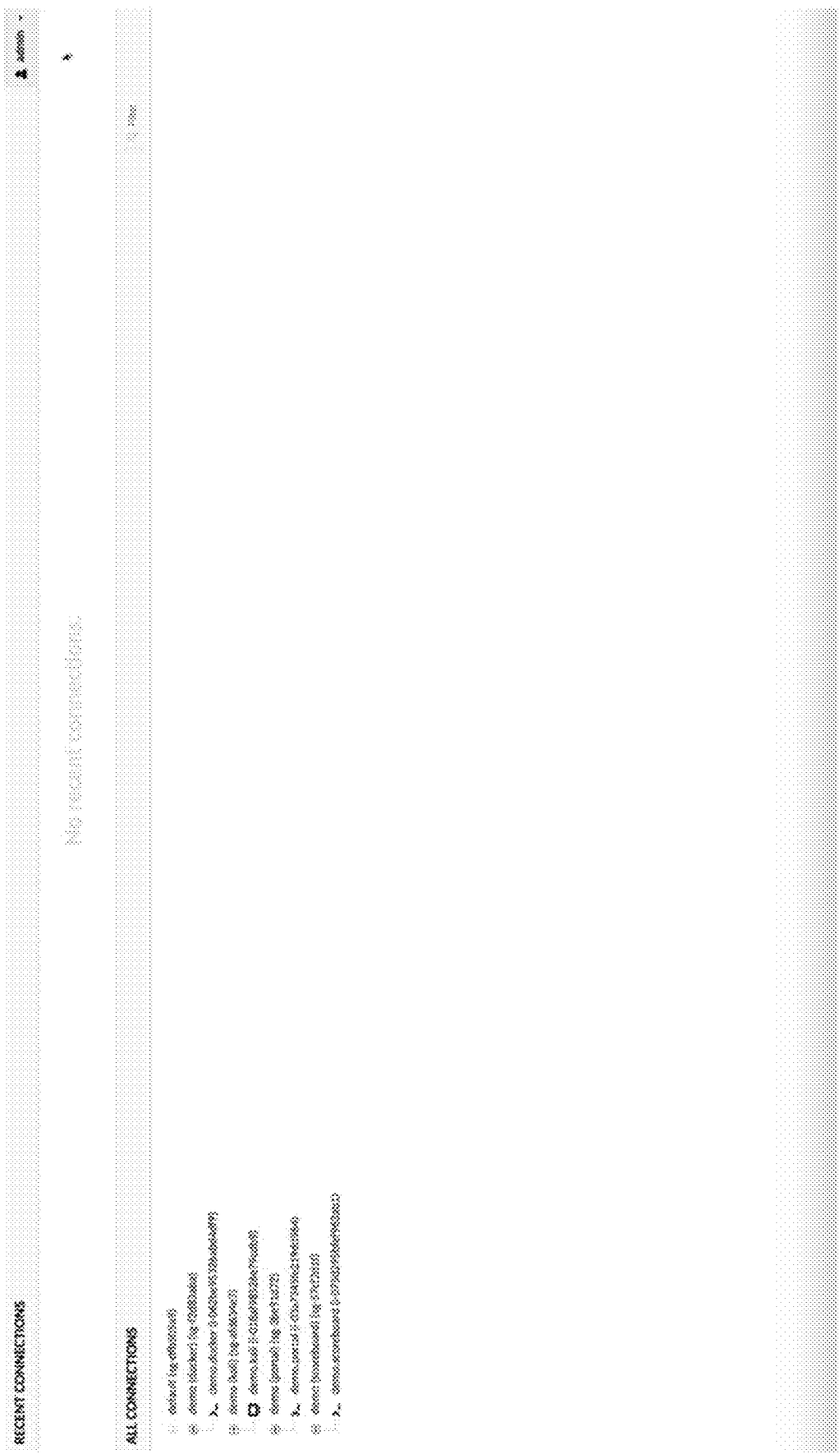

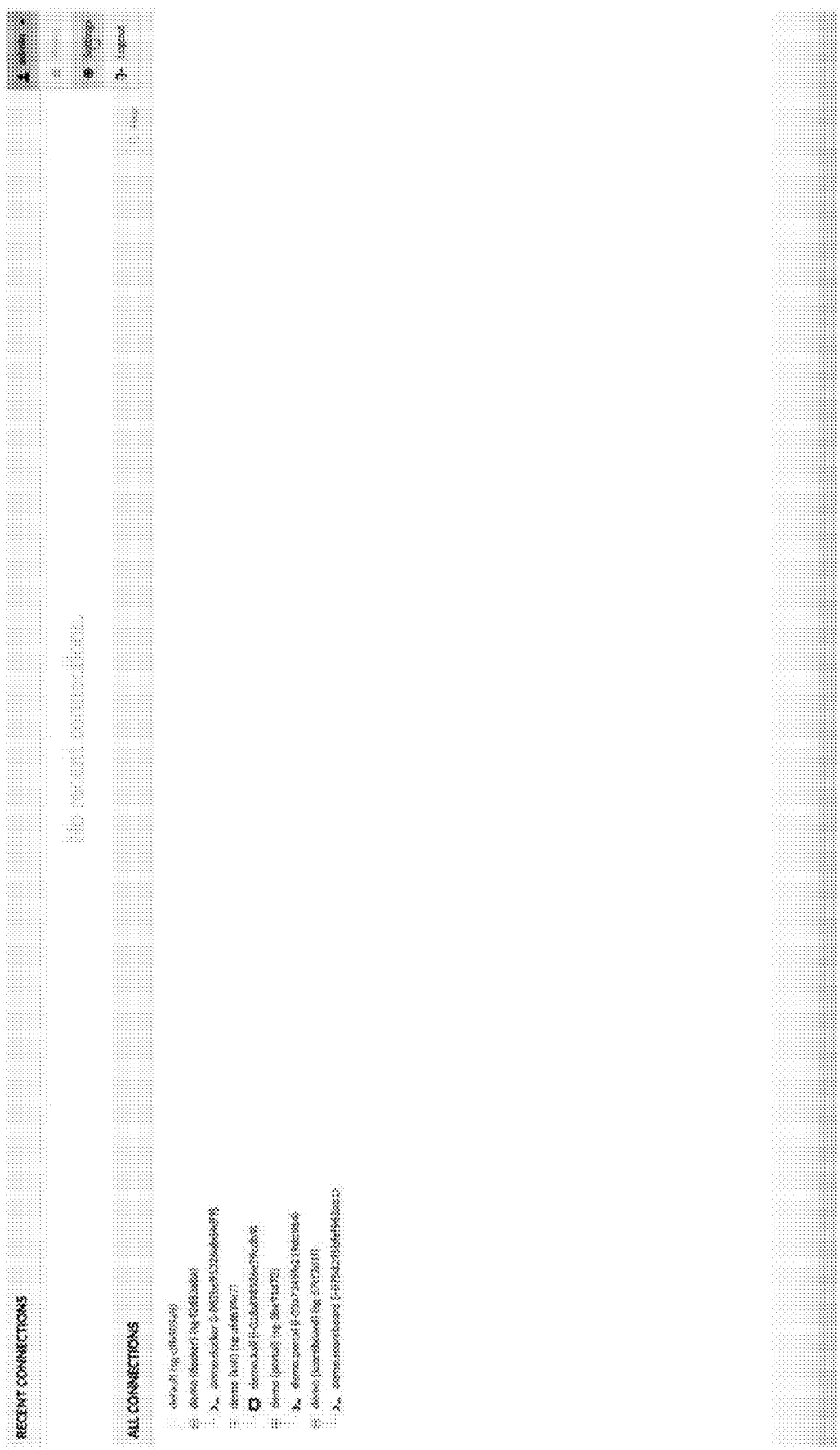
Fig. 4.3

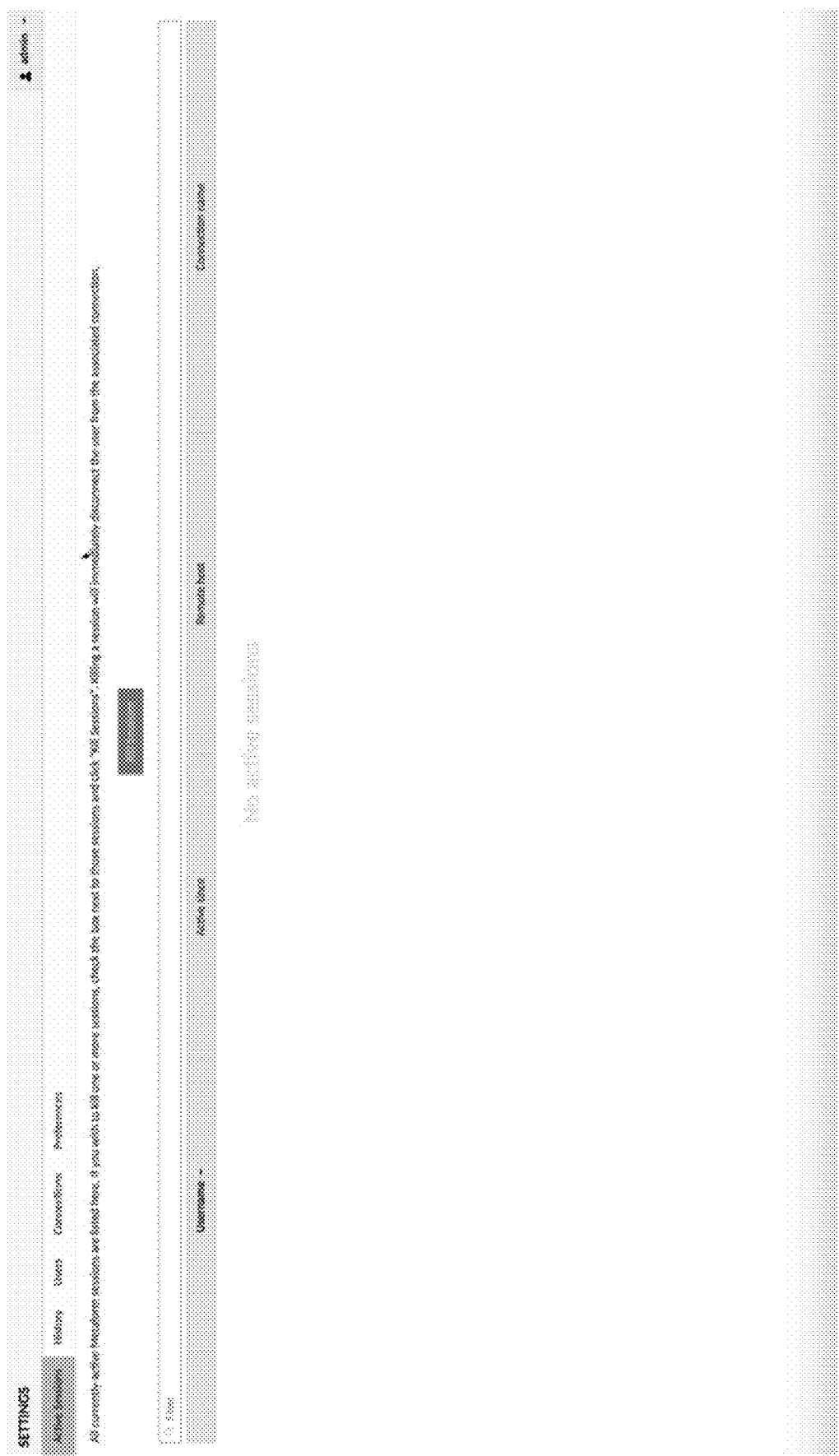

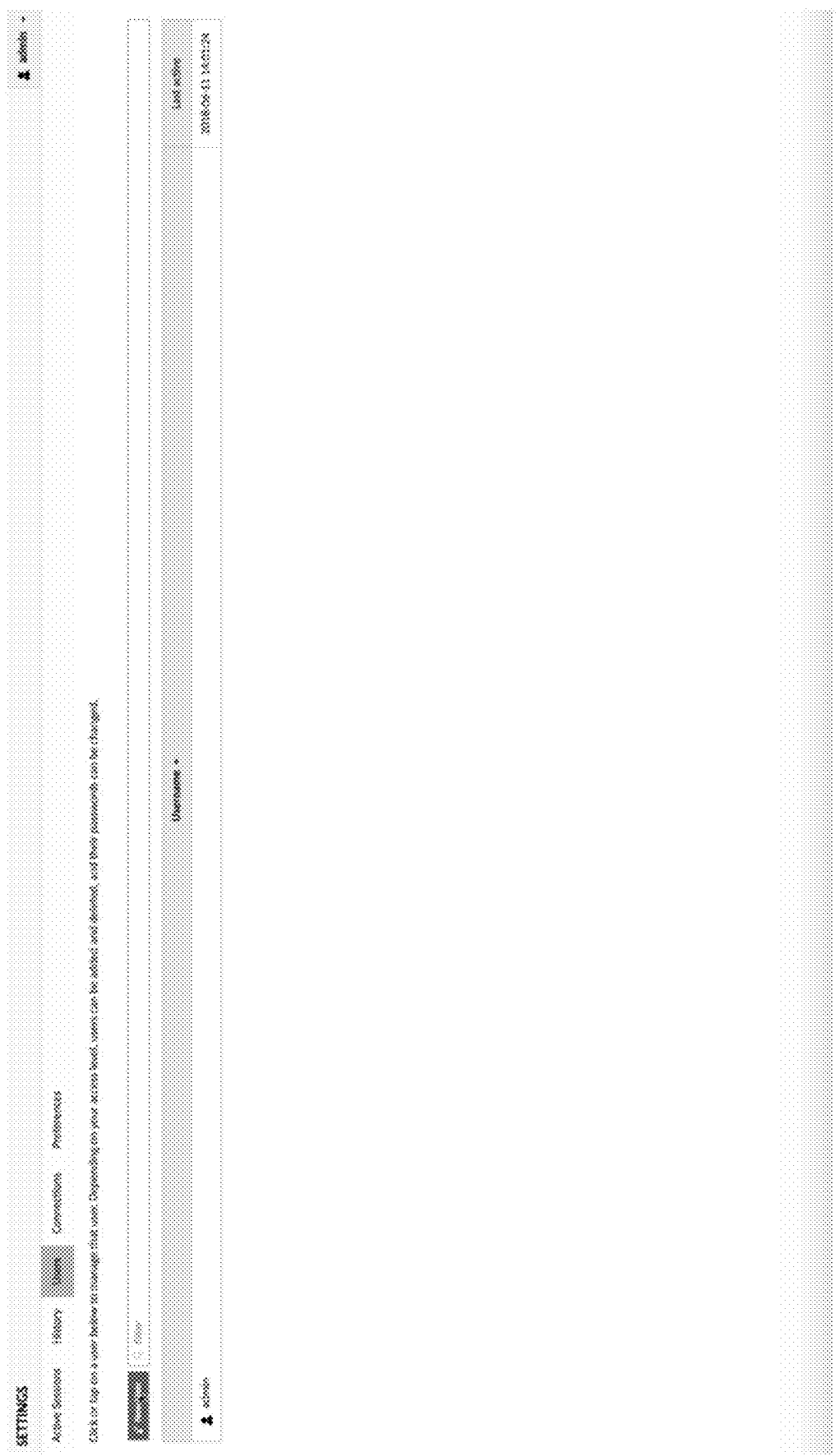
Fig. 4.5

Fig. 4.6

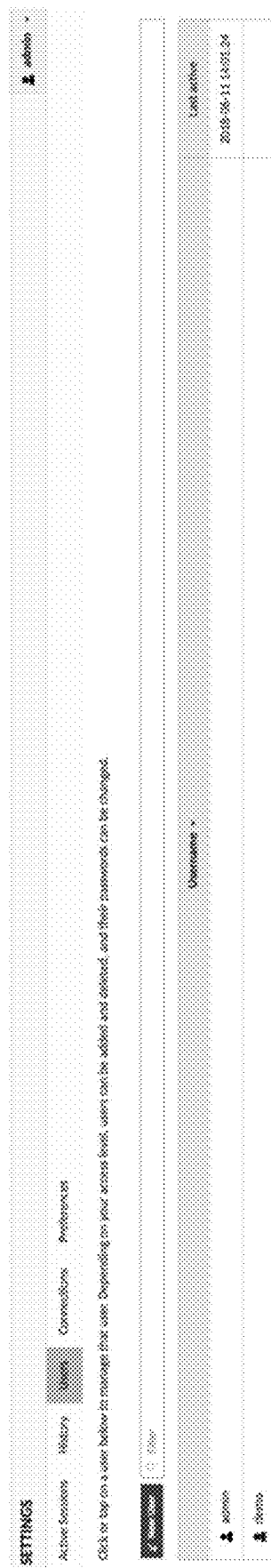
Fig. 4.7

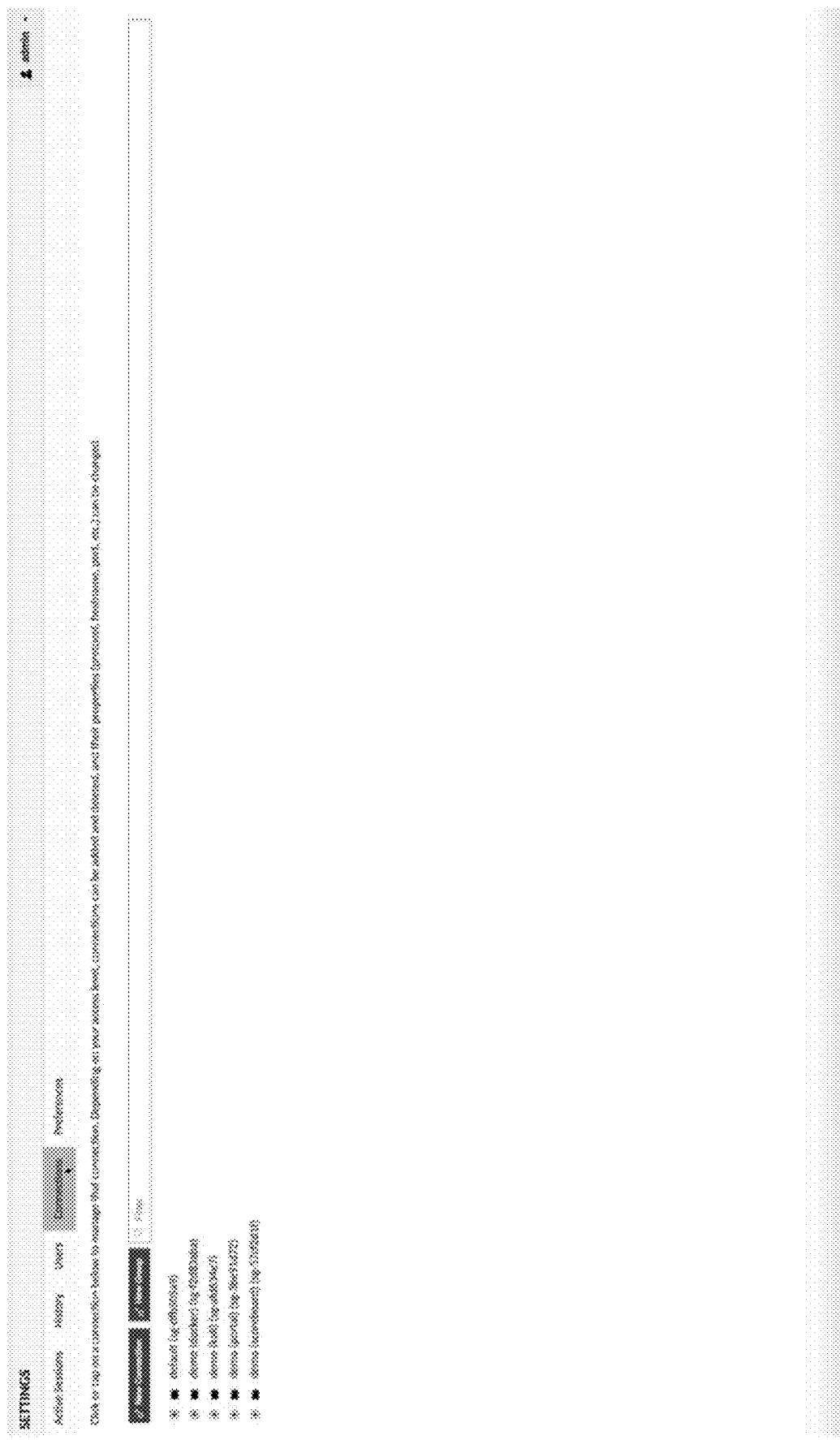
Fig. 4.8

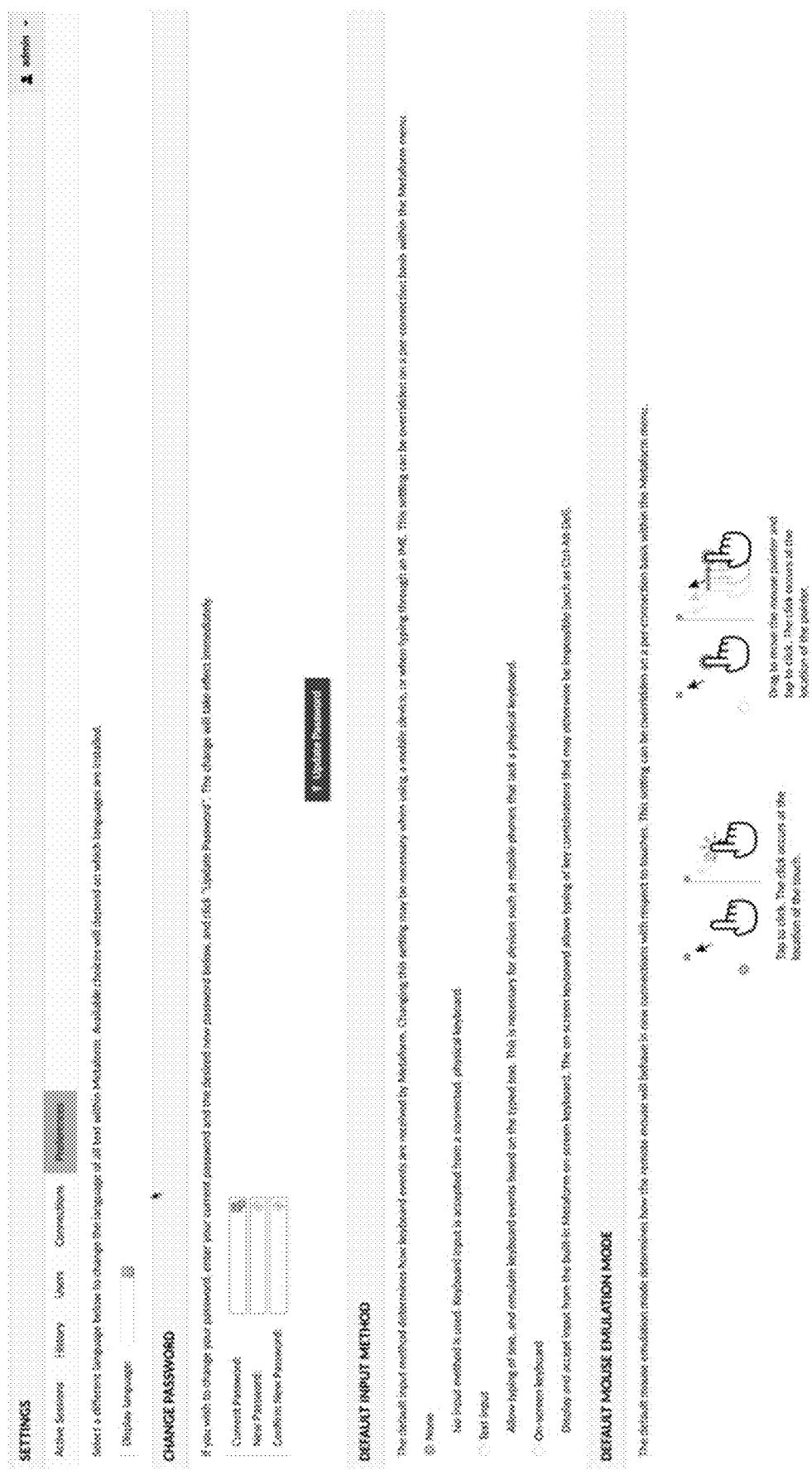
Fig. 4.9

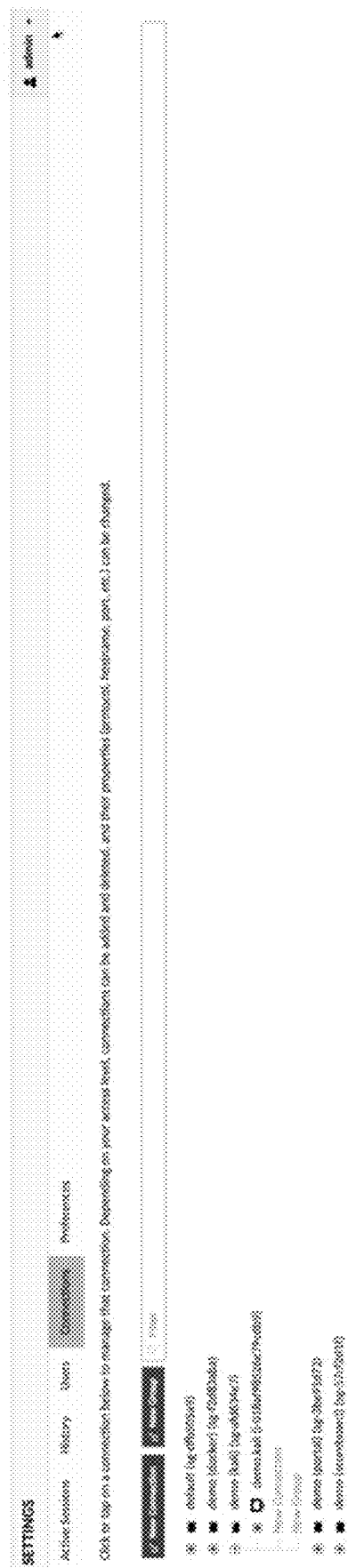
Fig. 4.10

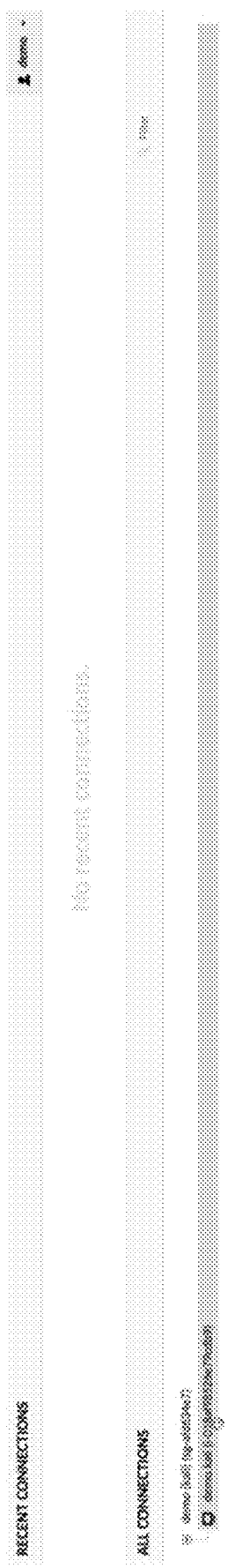
Fig. 4.11

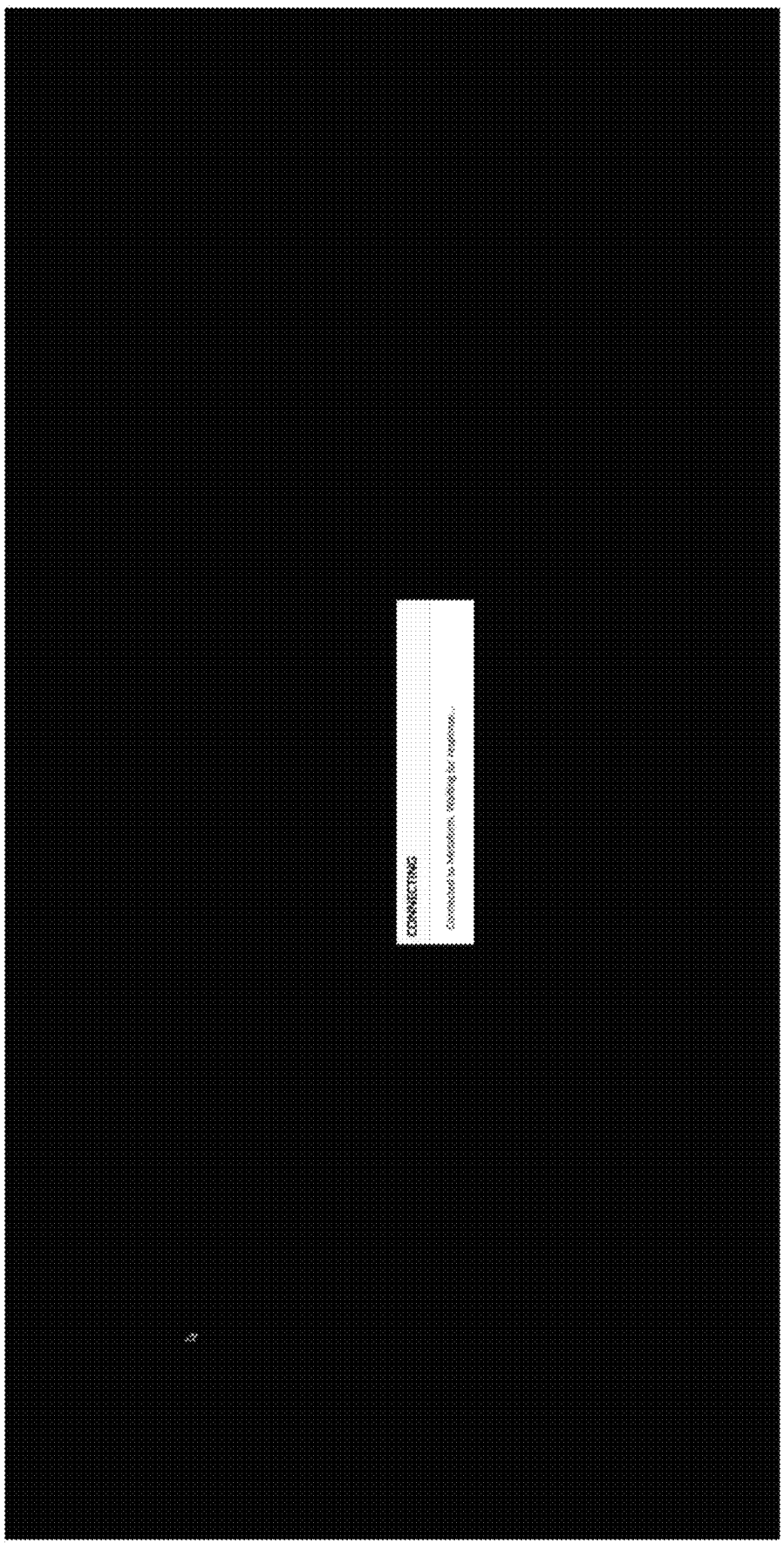
Fig. 4.12

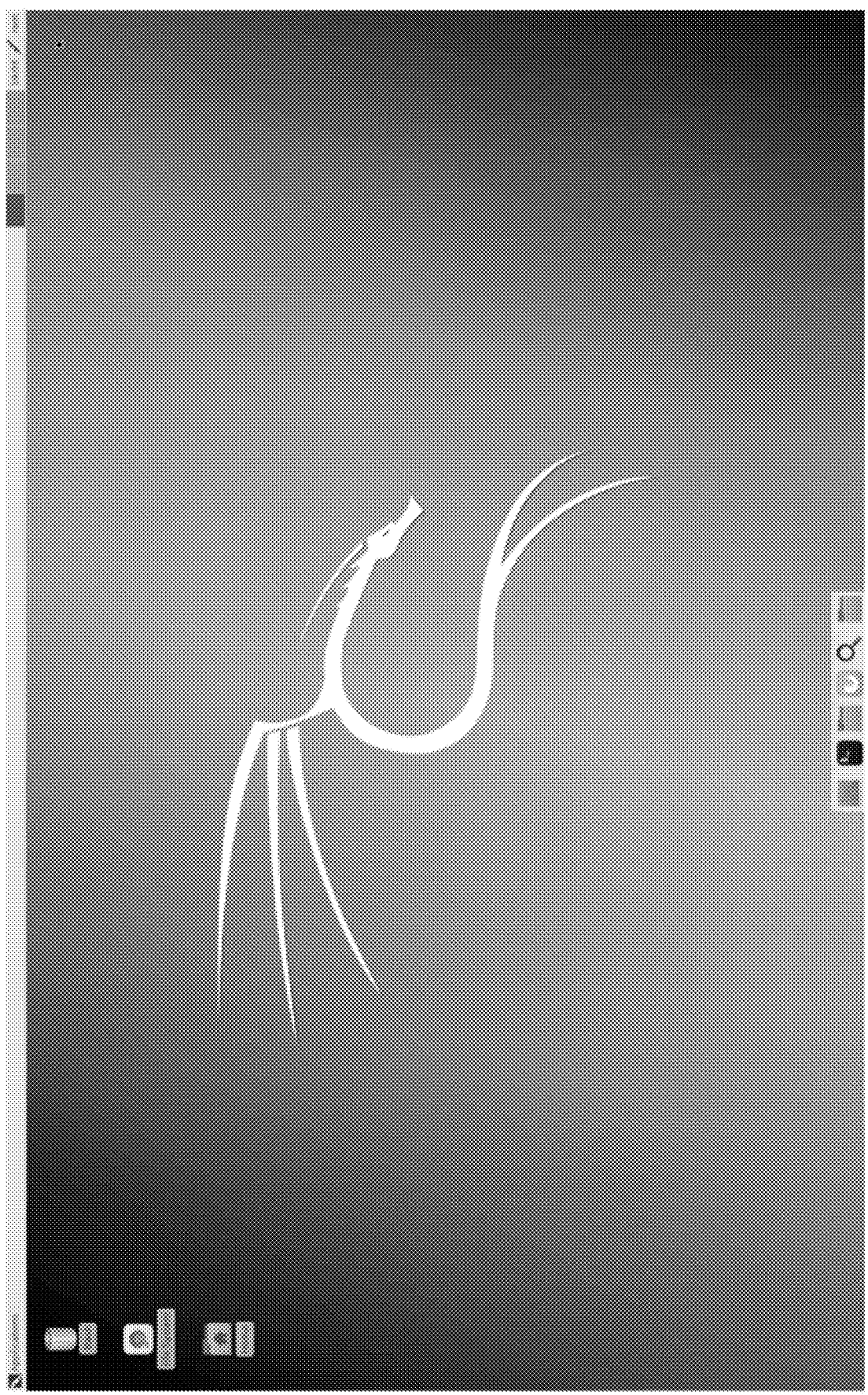
Fig. 4.13

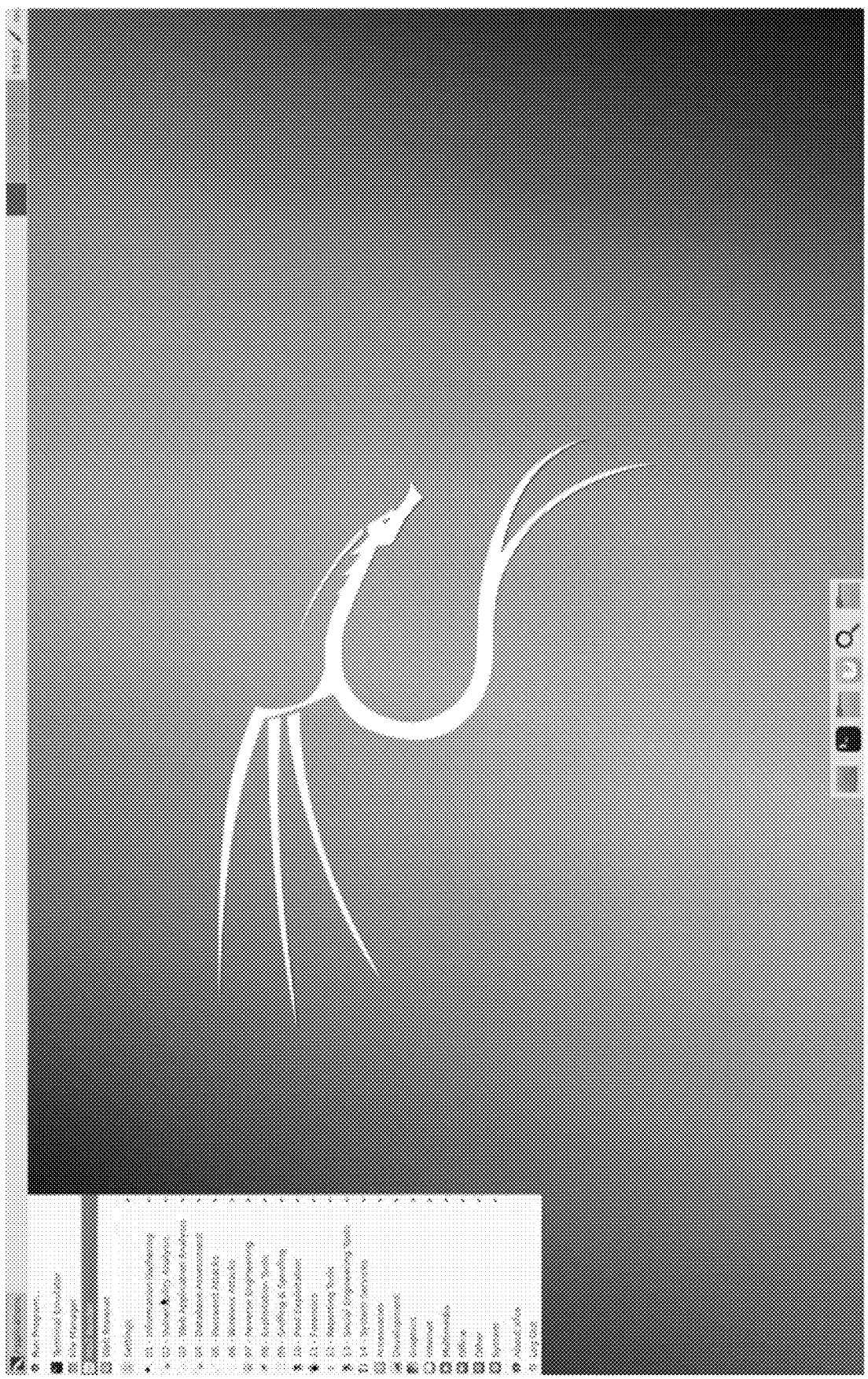
Fig. 4.14

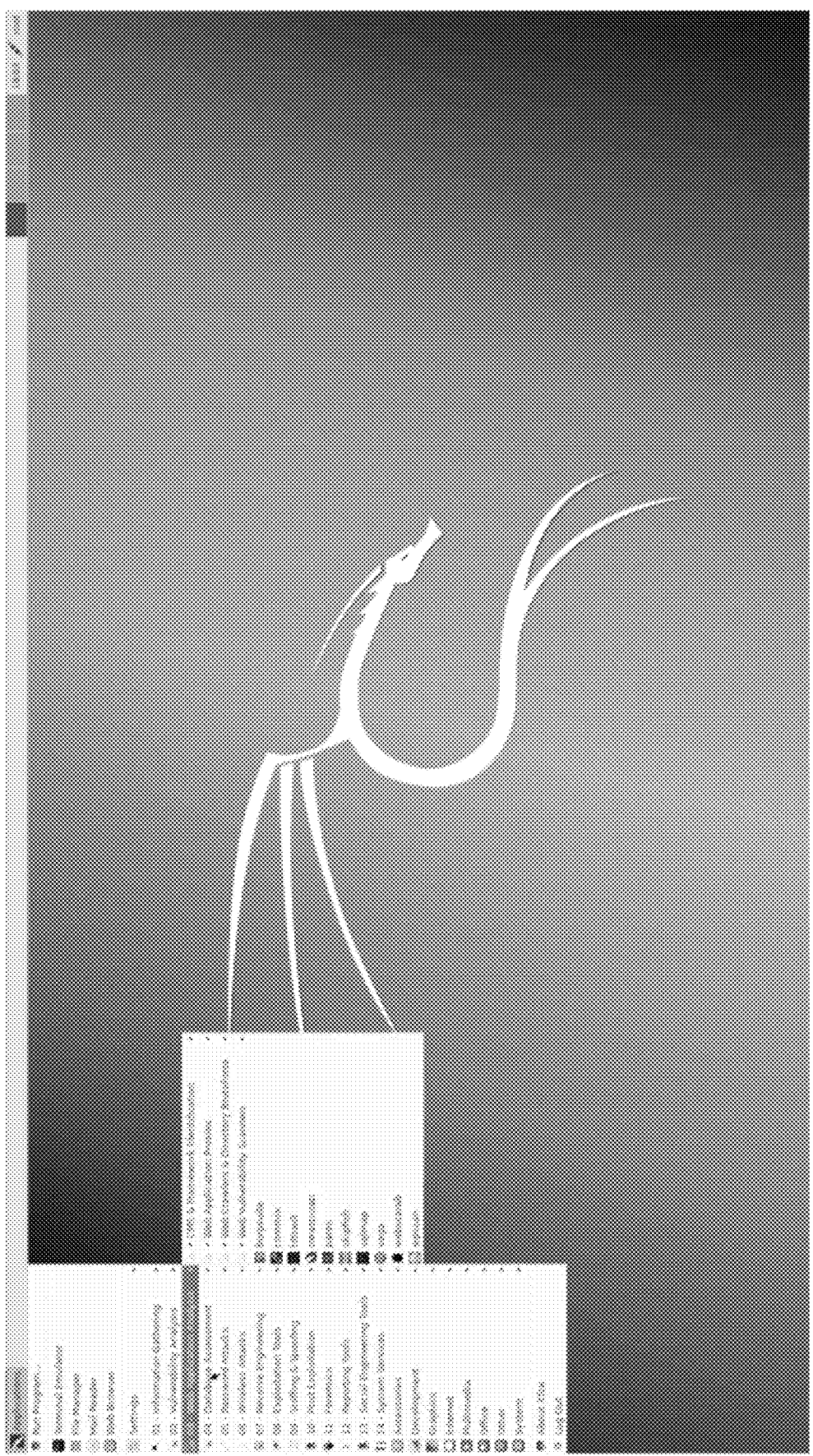
Fig. 4.15

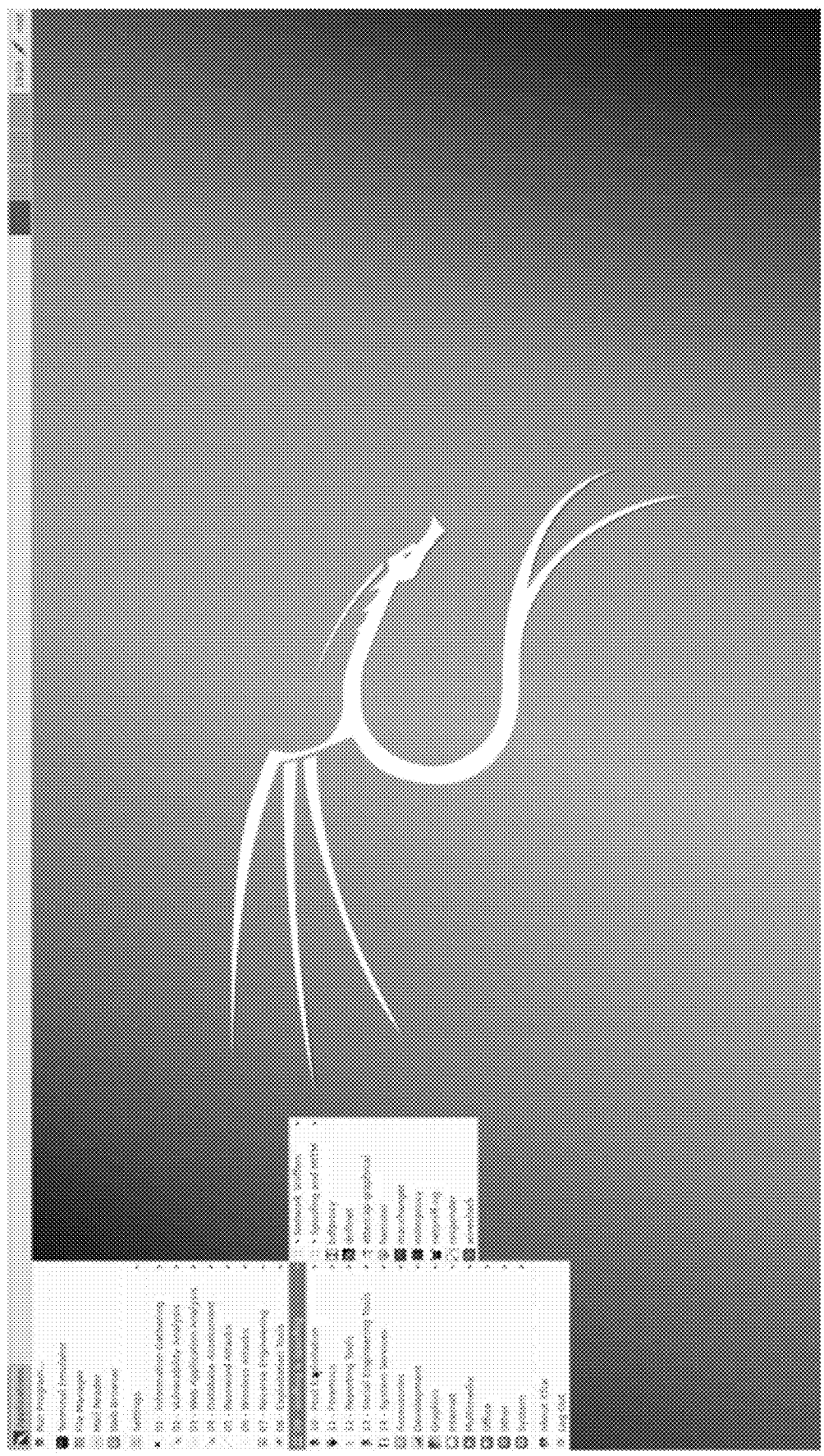
Fig. 4.16

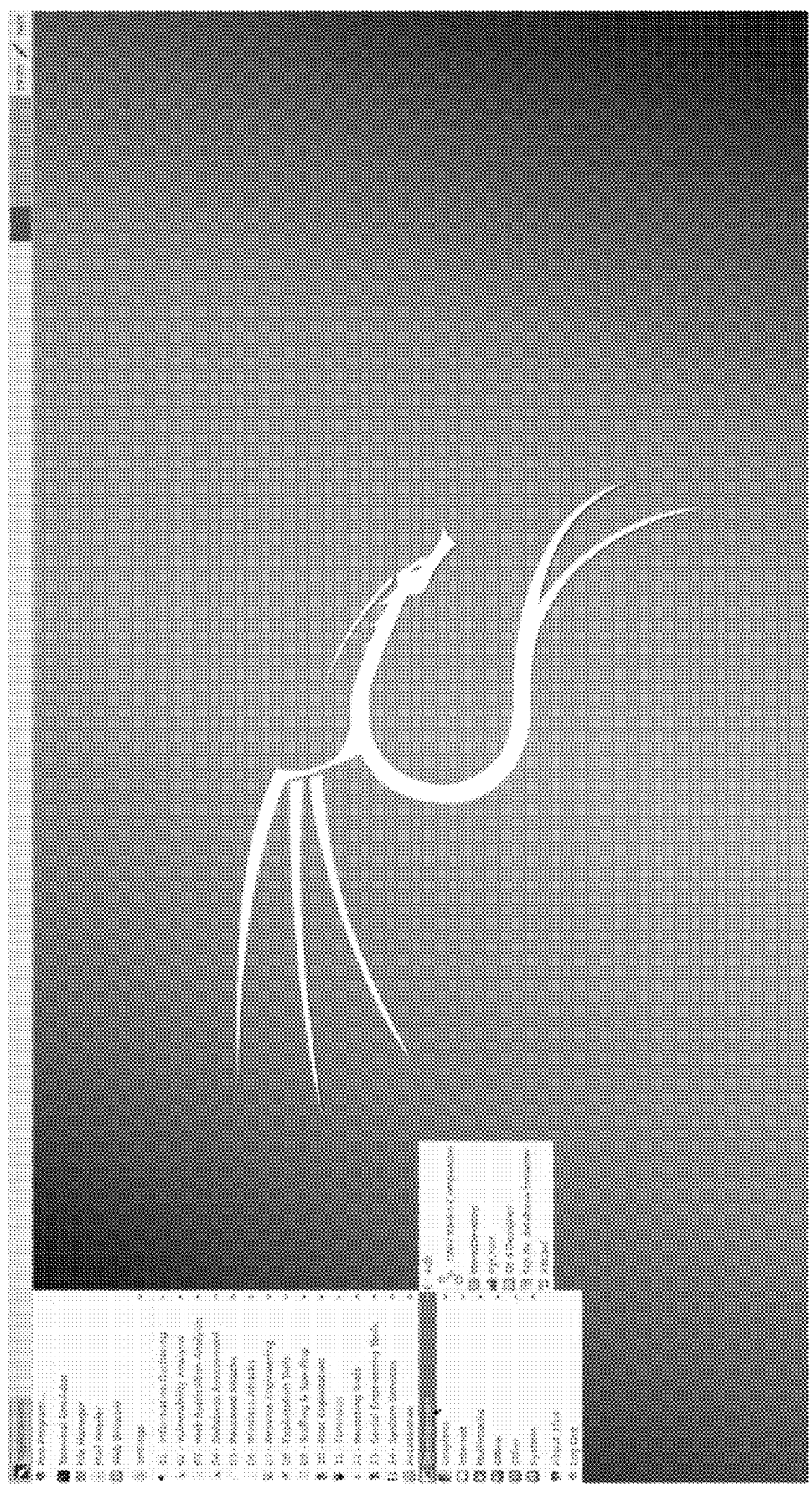
Fig. 4.17

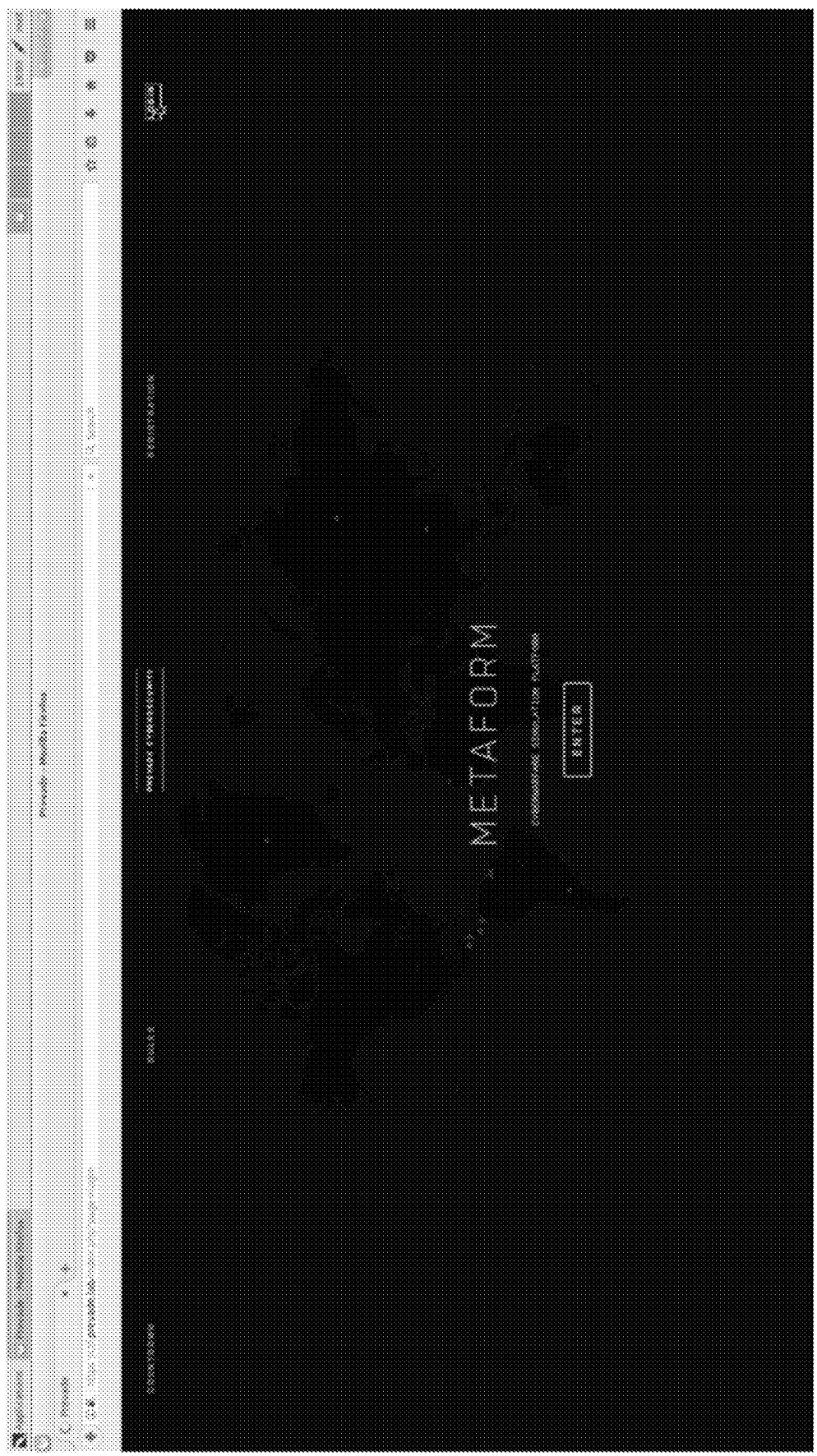
Fig. 4.18

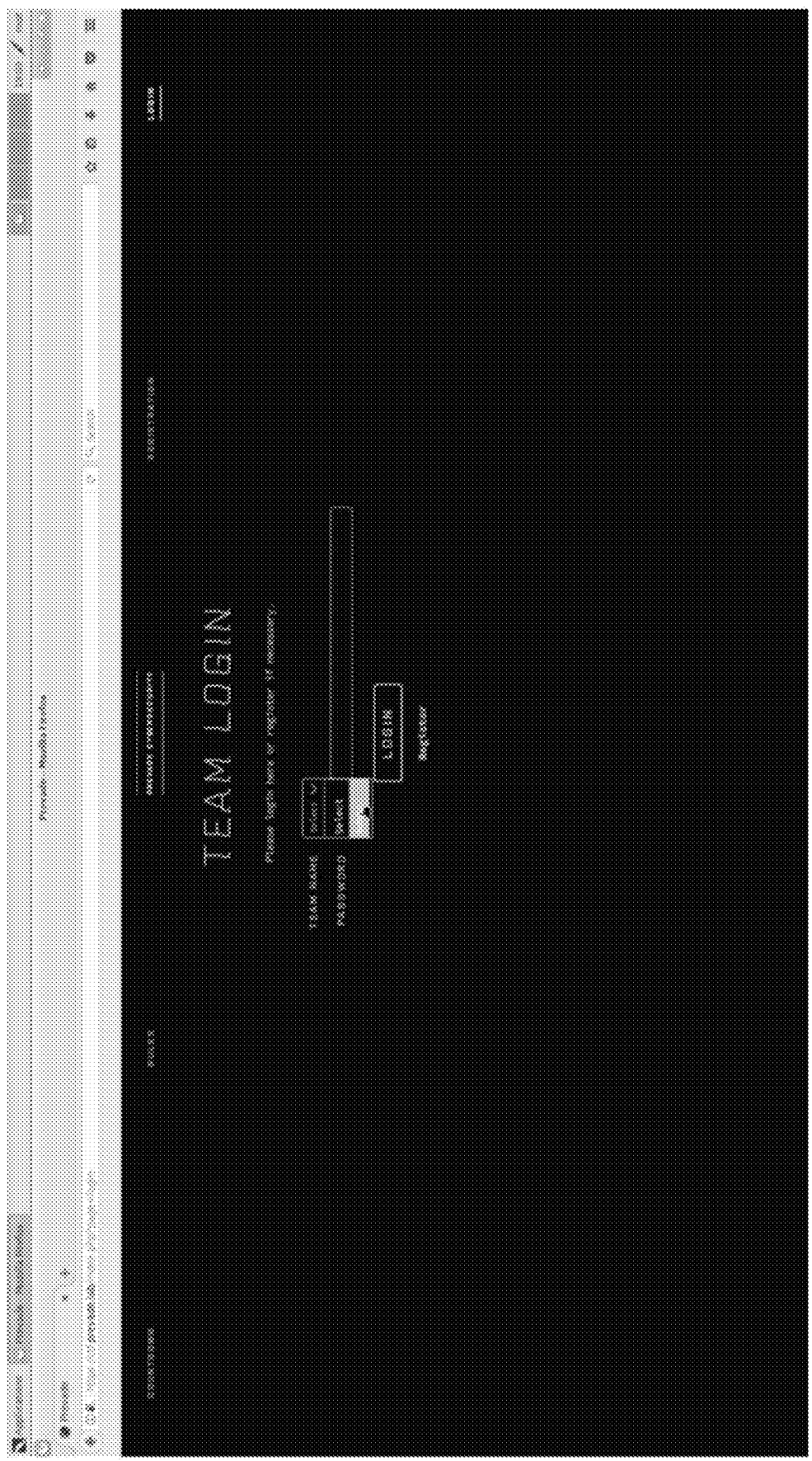
Fig. 4.19

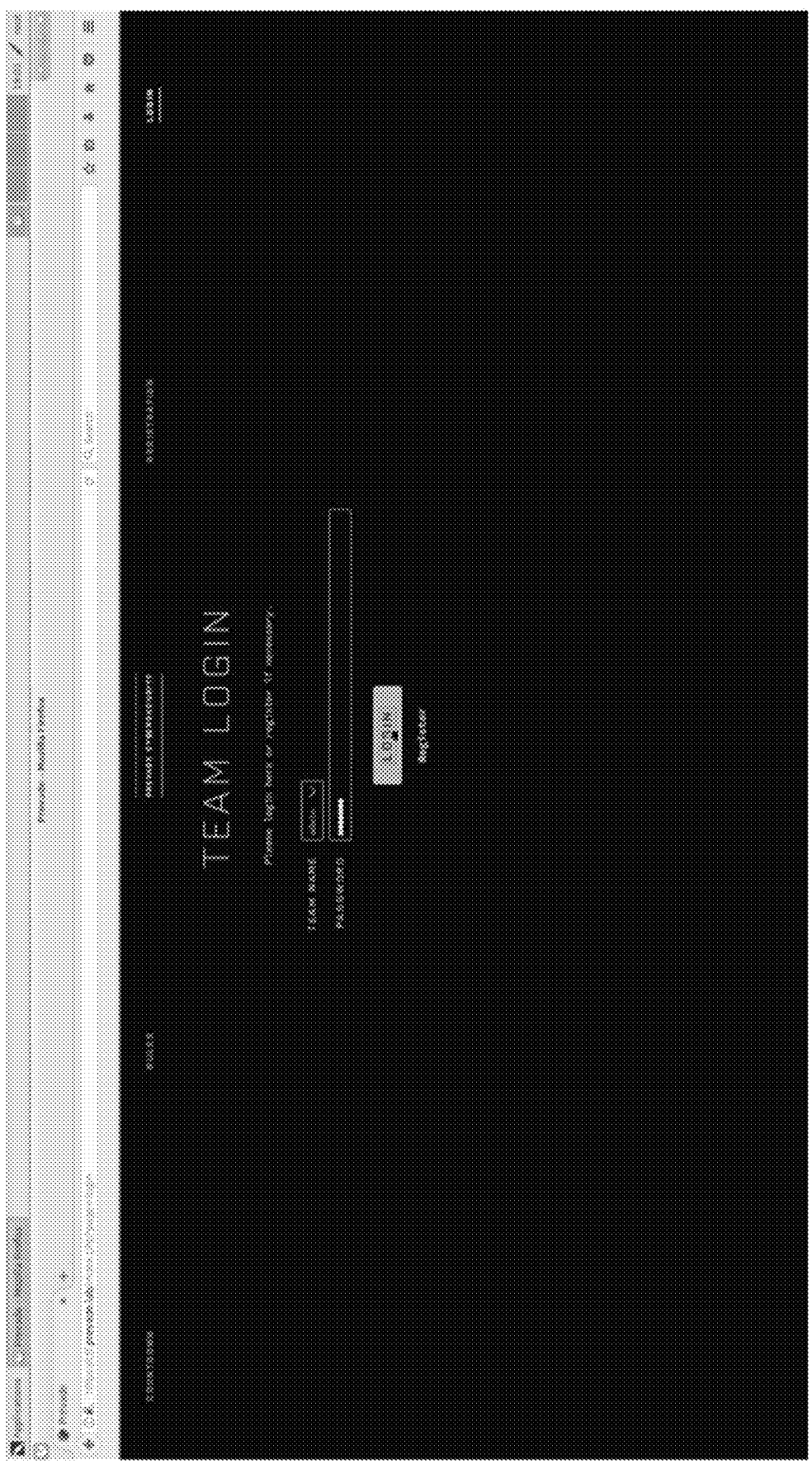
Fig. 4.20

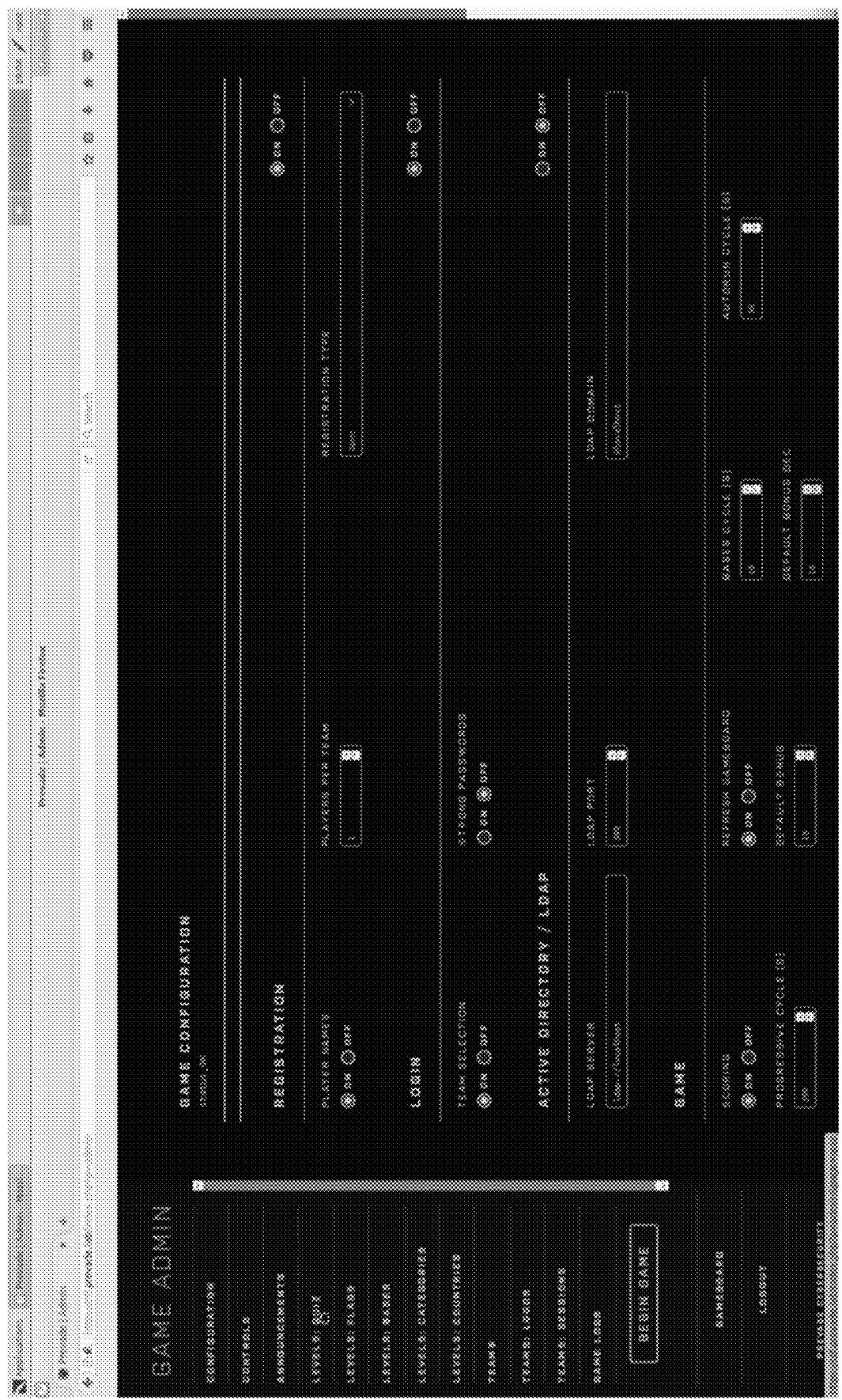
Fig. 4.21

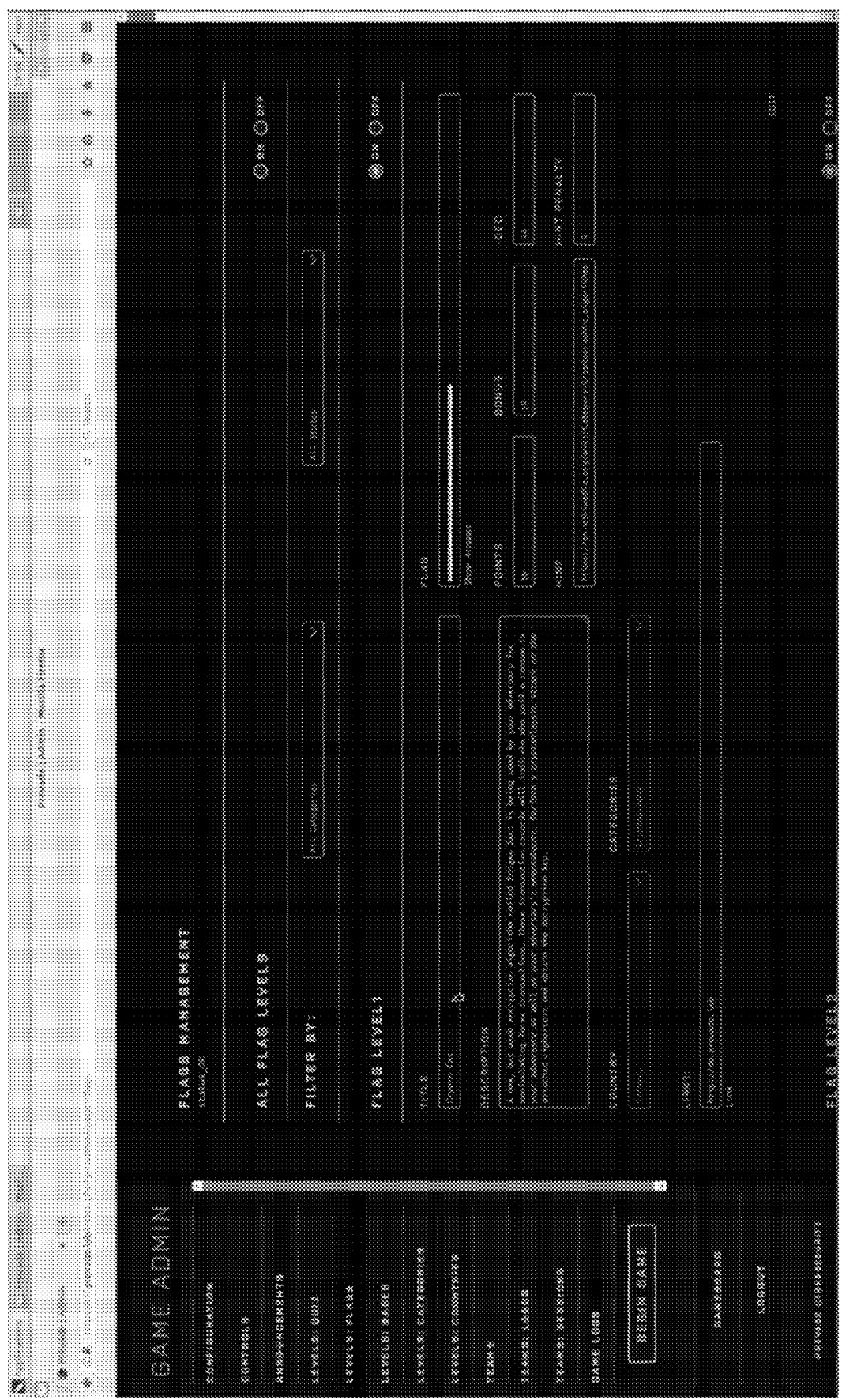
Fig. 4.22

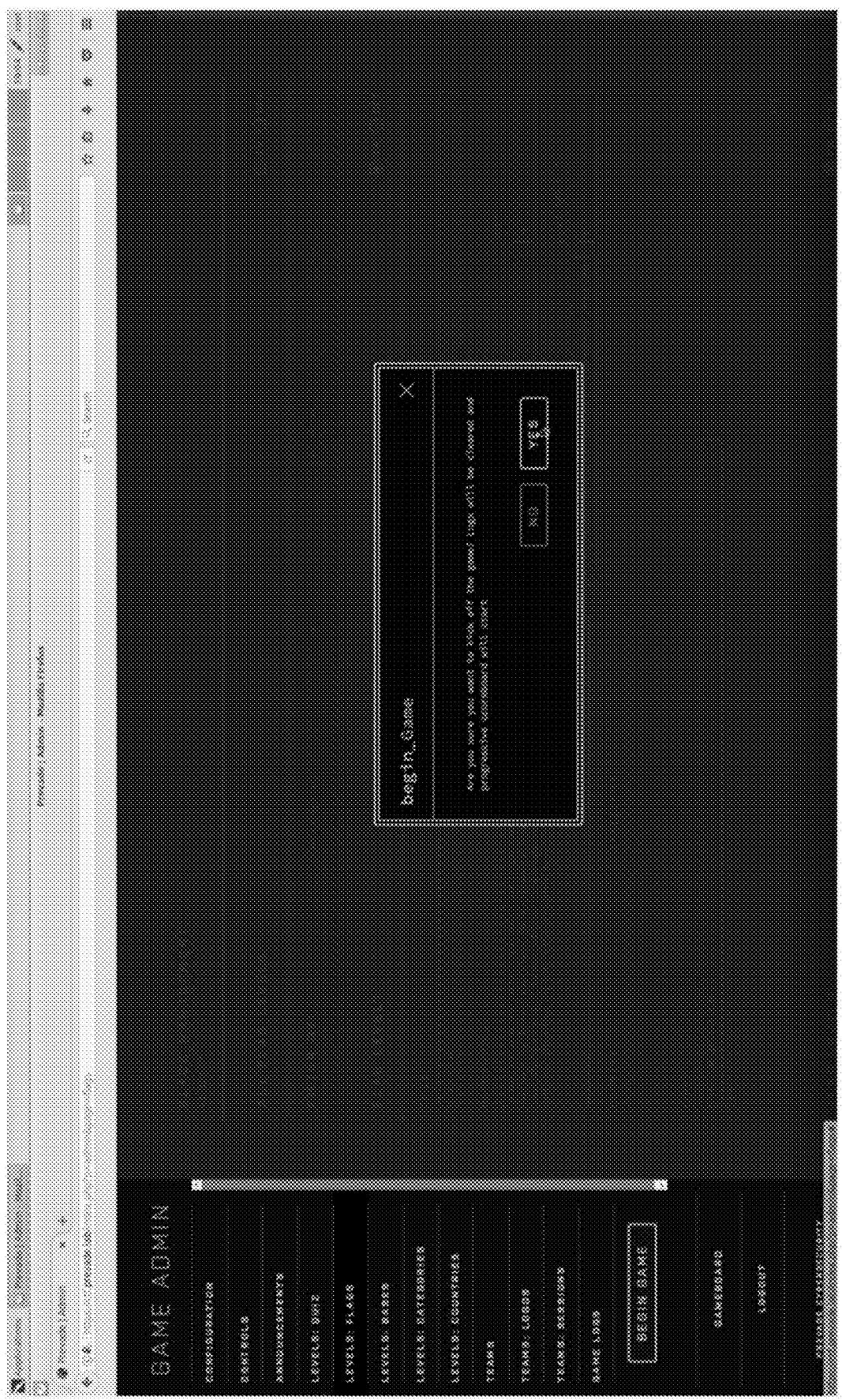
Fig. 4.23

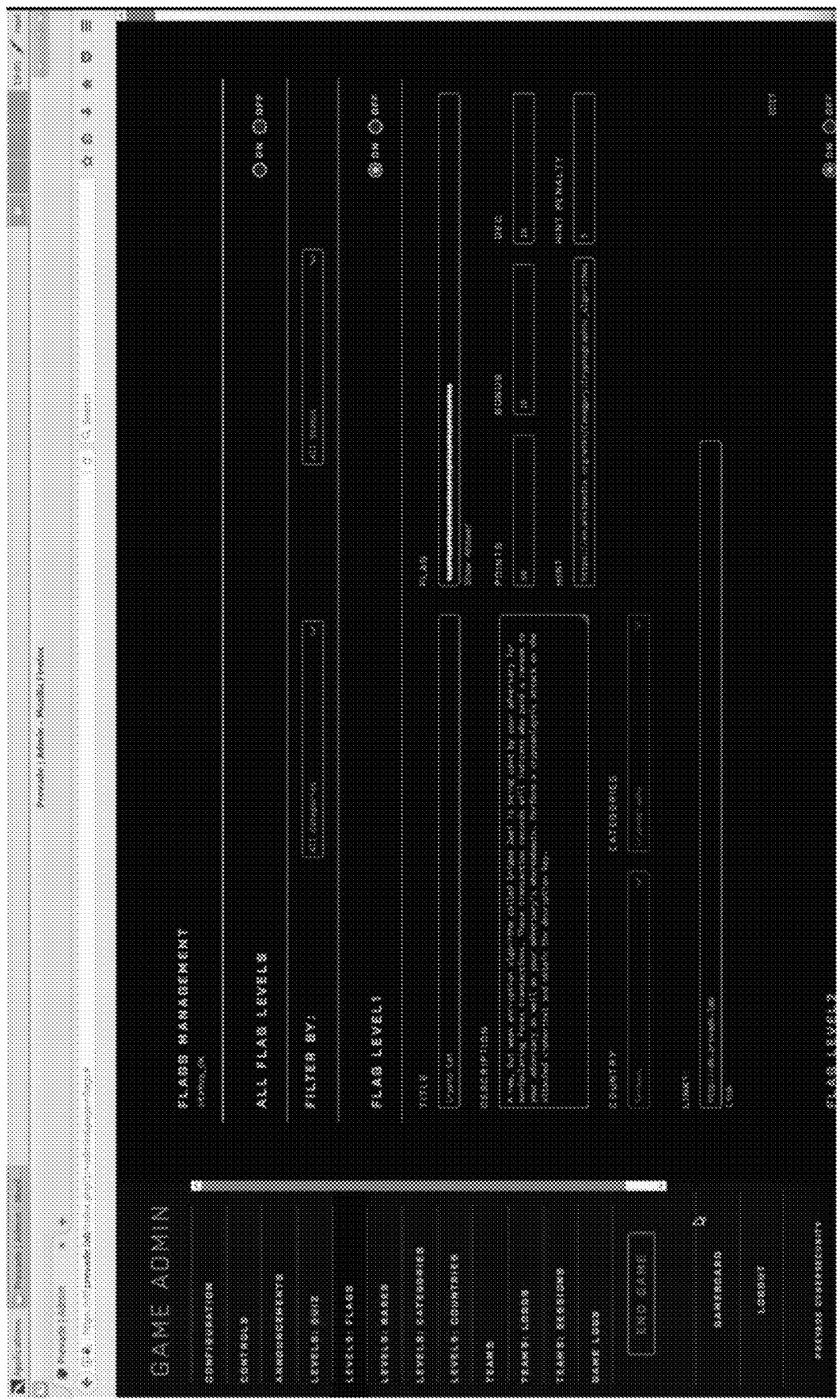
Fig. 4.24

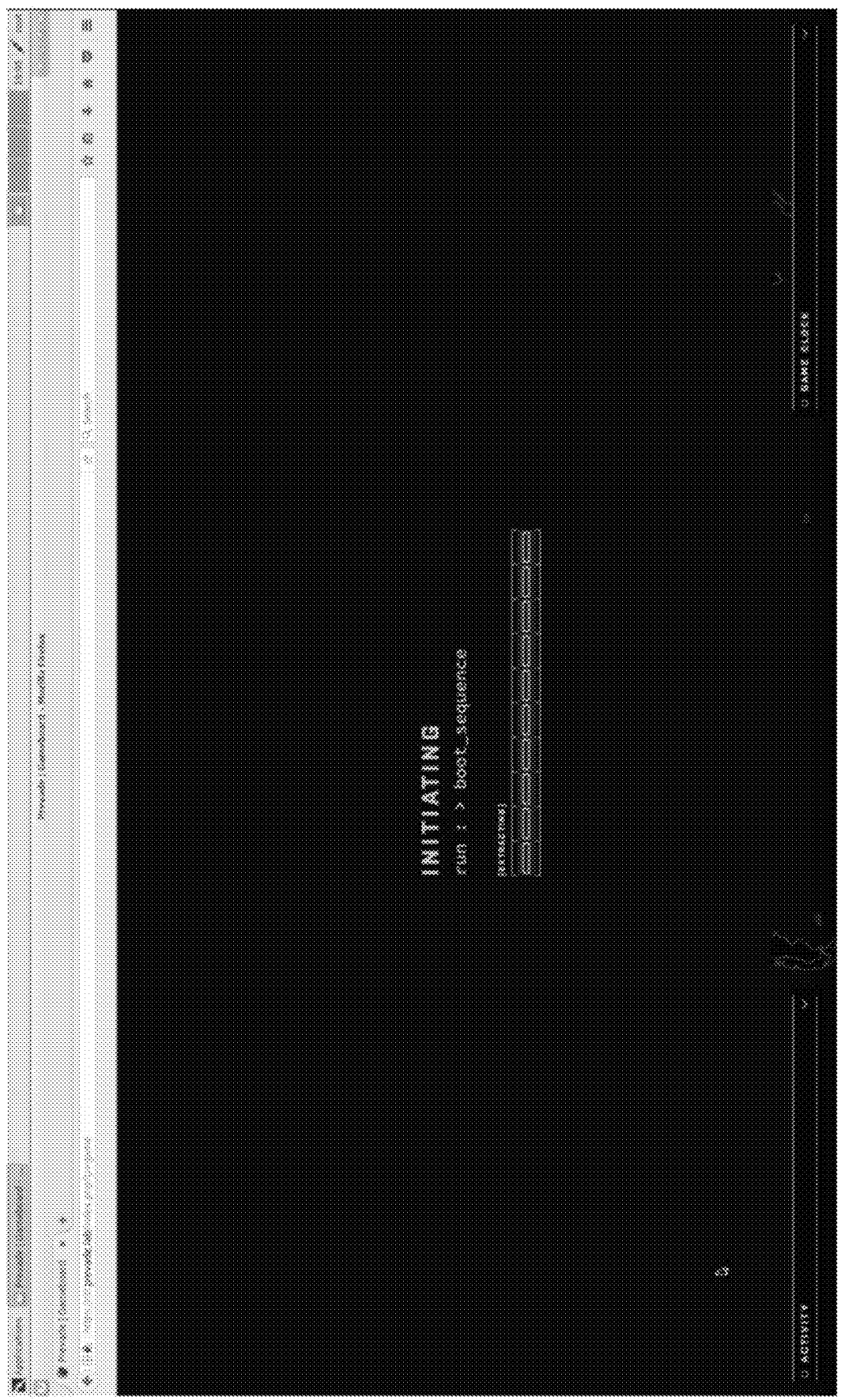
Fig. 4.25

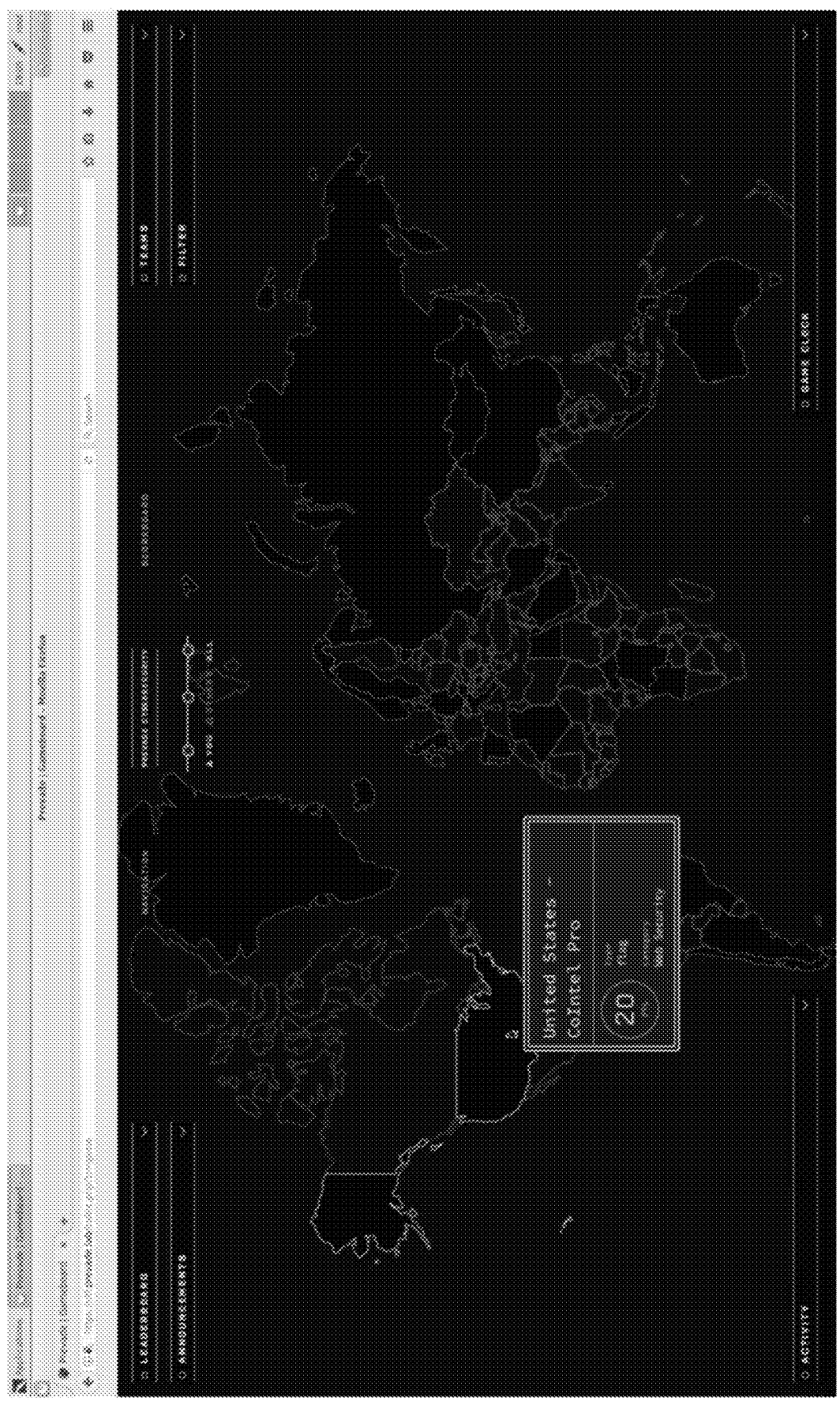
Fig. 4.26

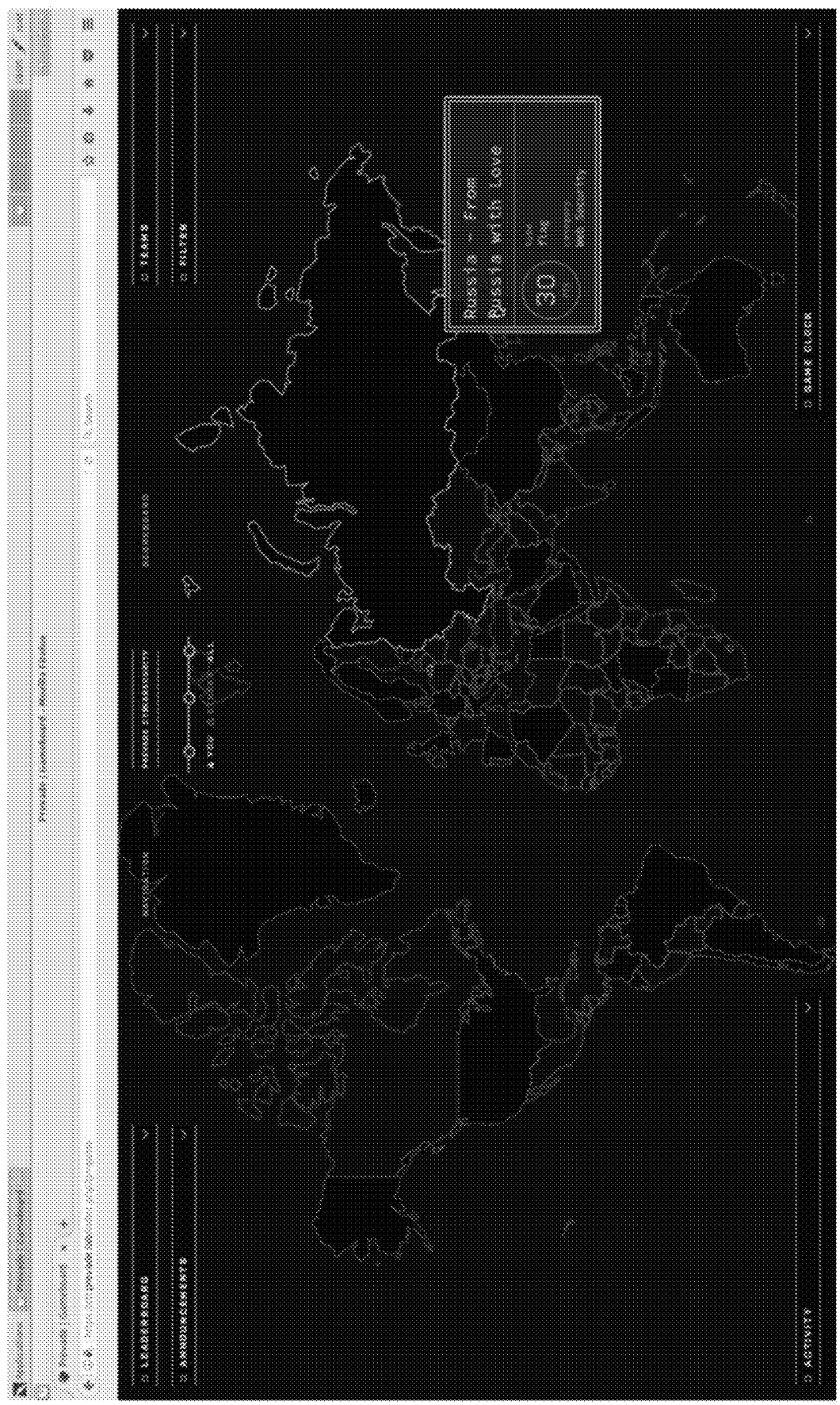
Fig. 4.27

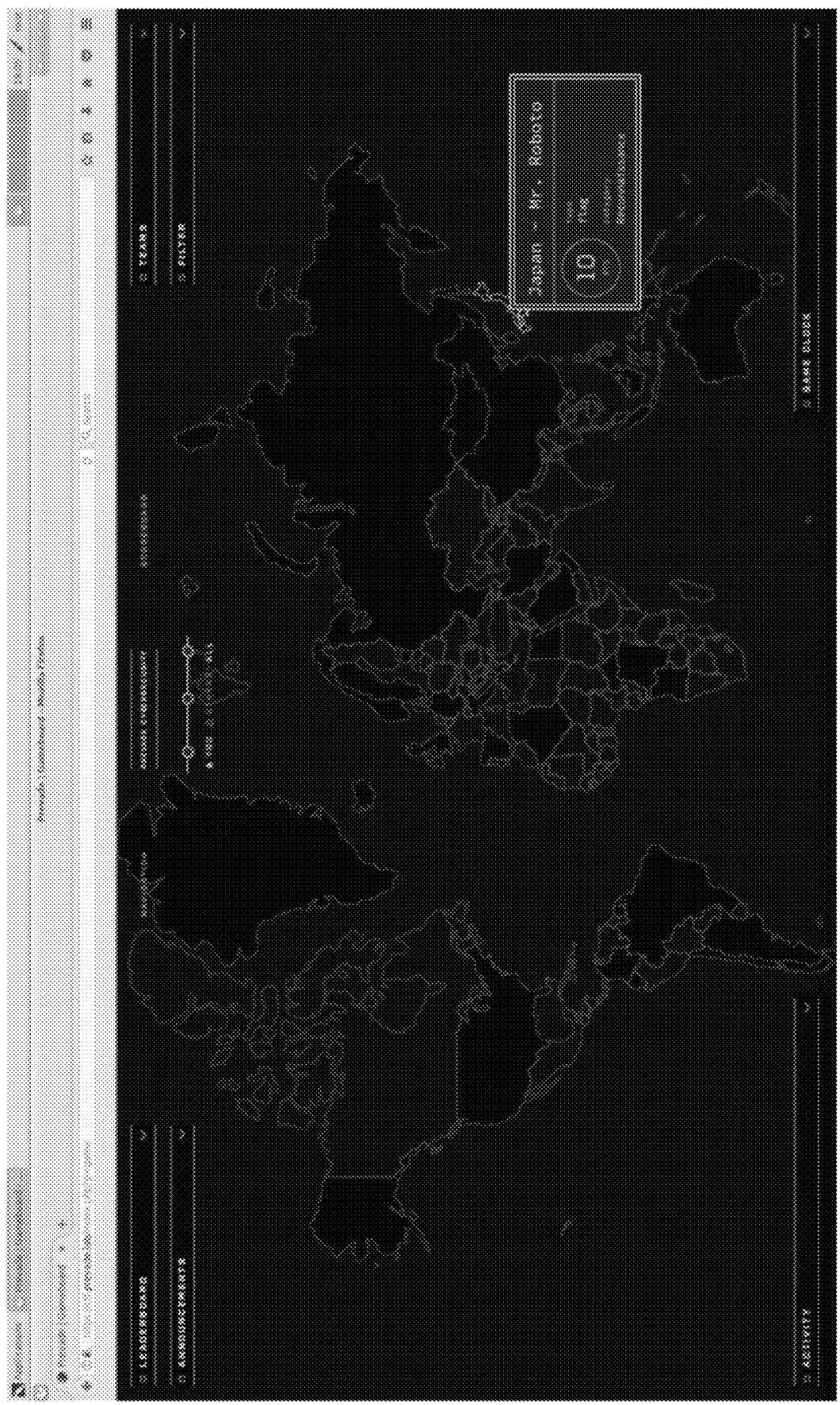
Fig. 4.28

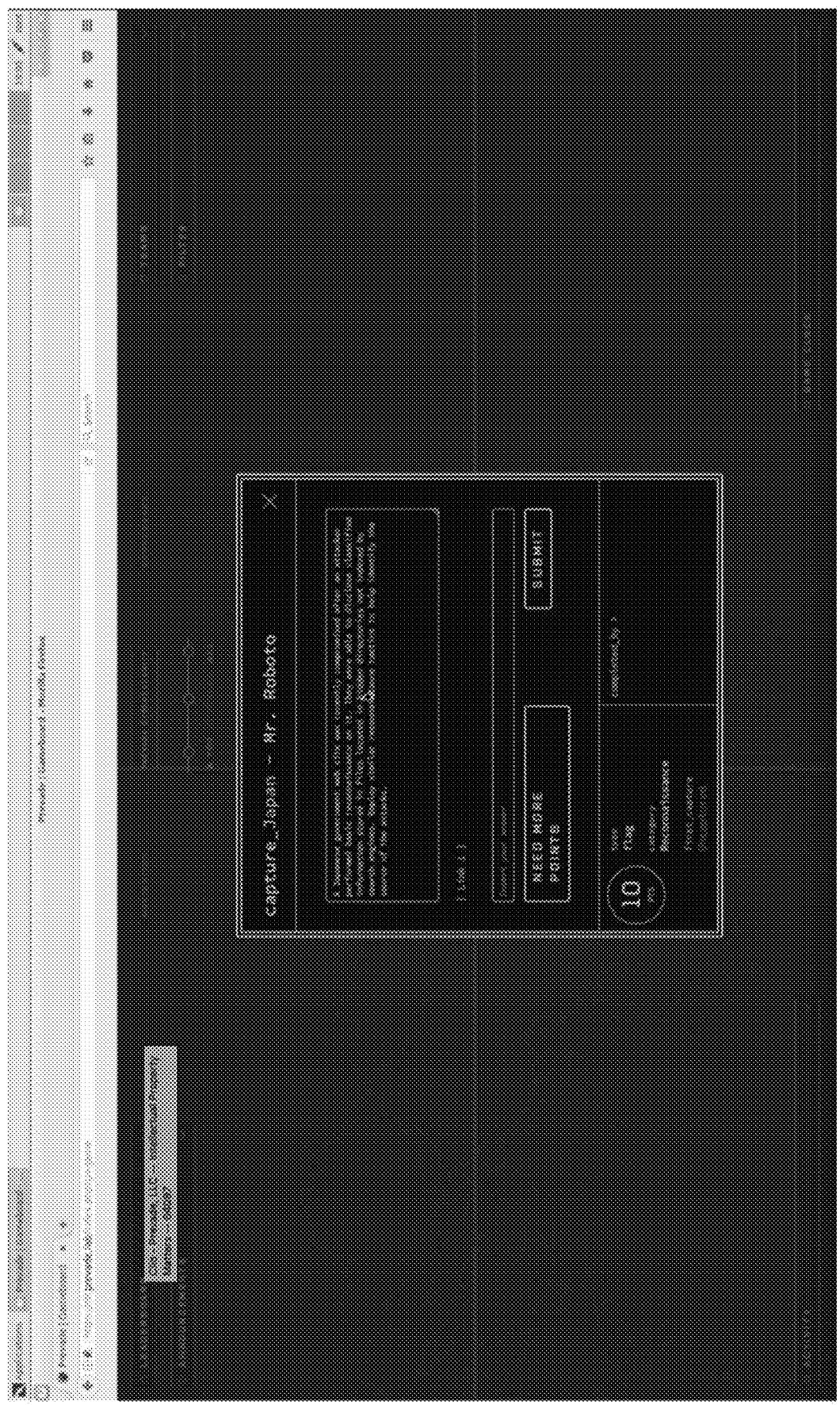
Fig. 4.29

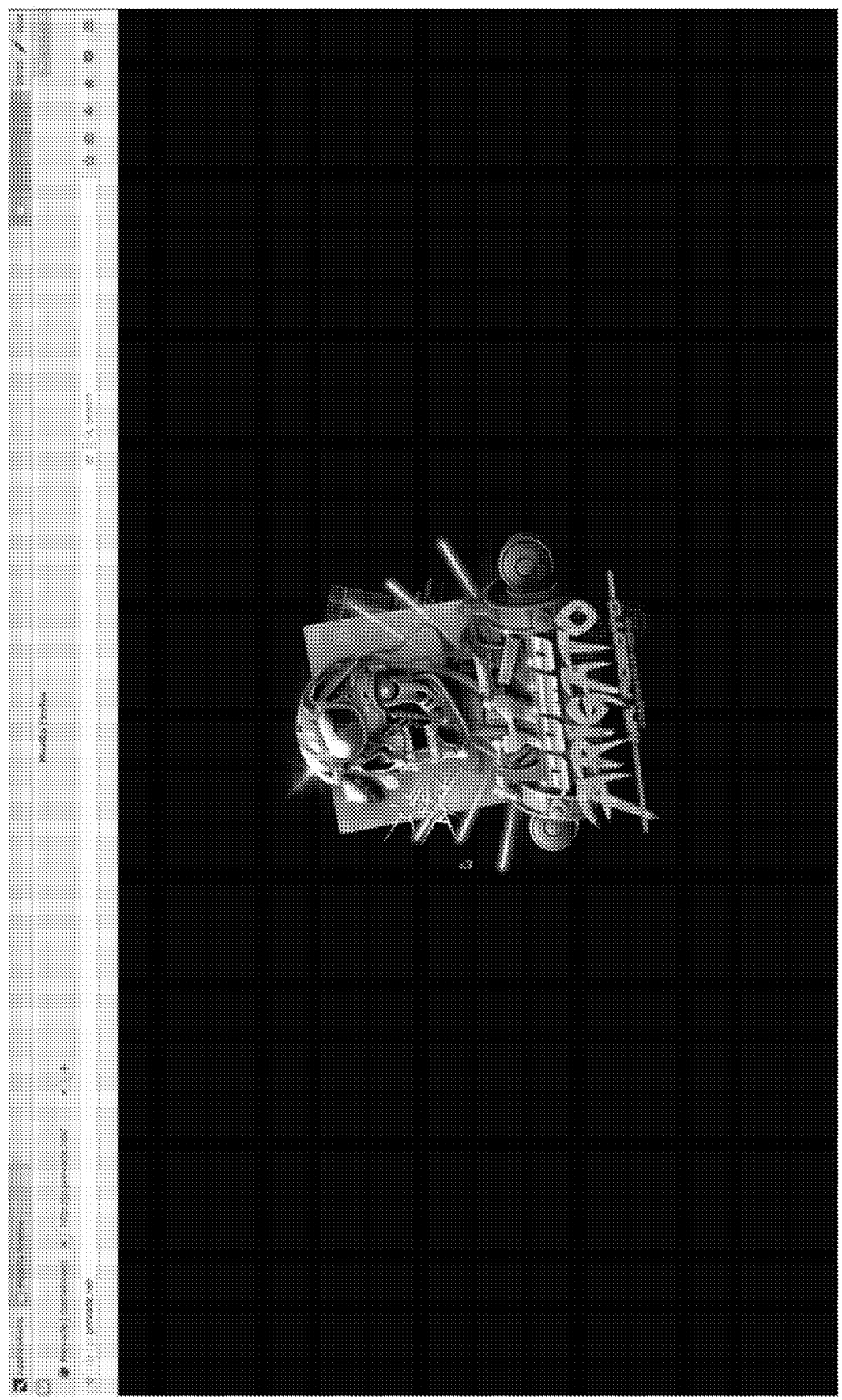
Fig. 4.30

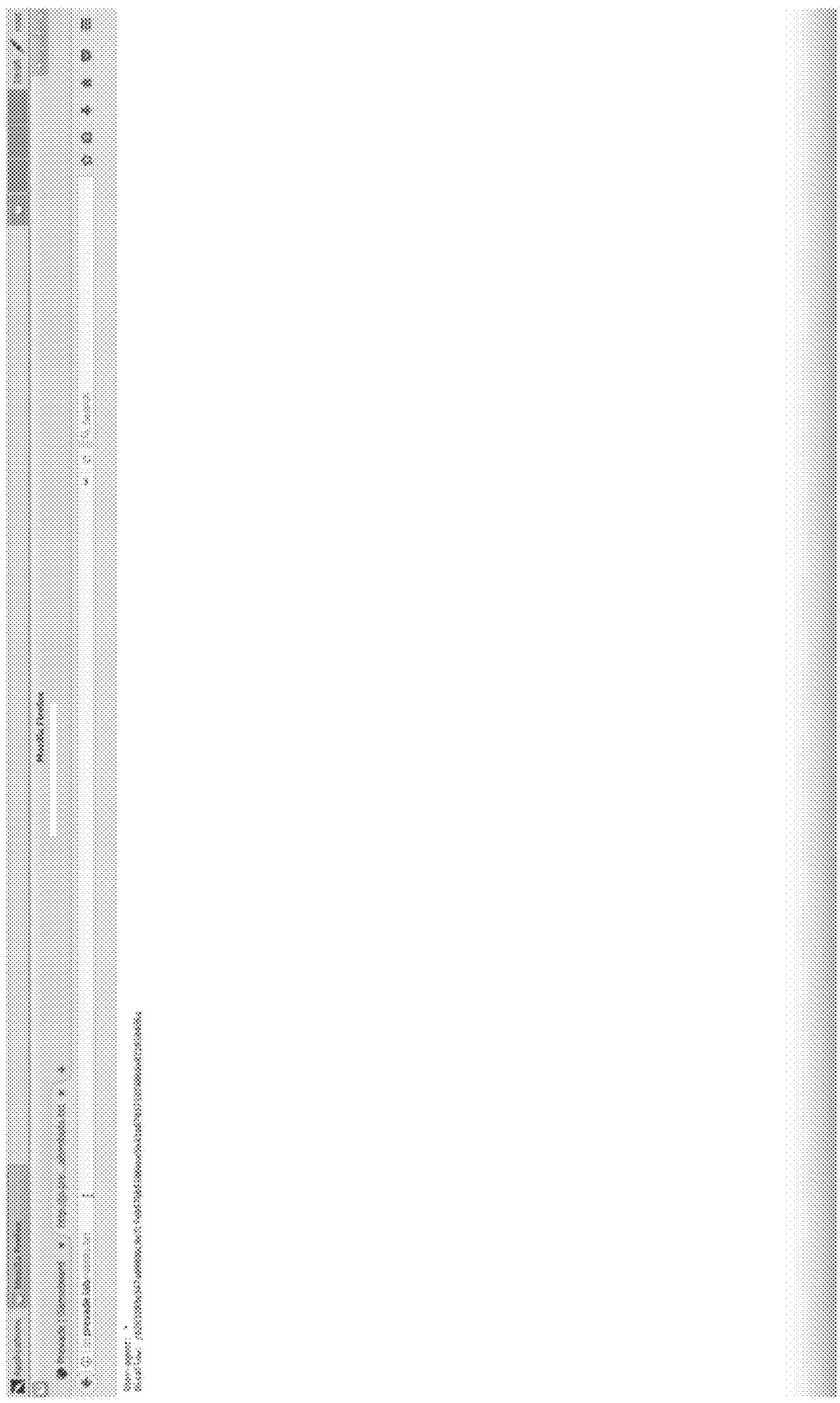
Fig. 4.31

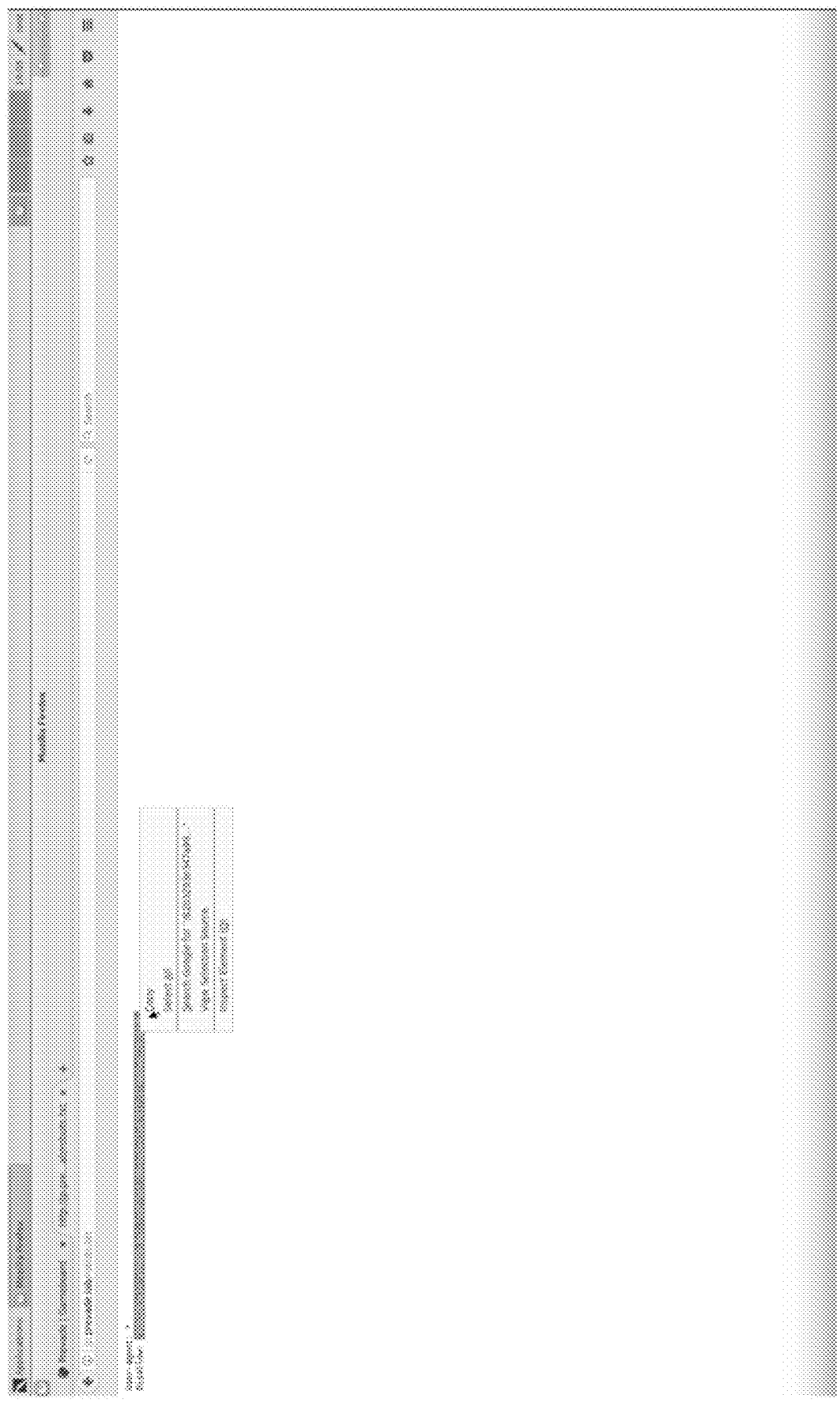
Fig. 4.32

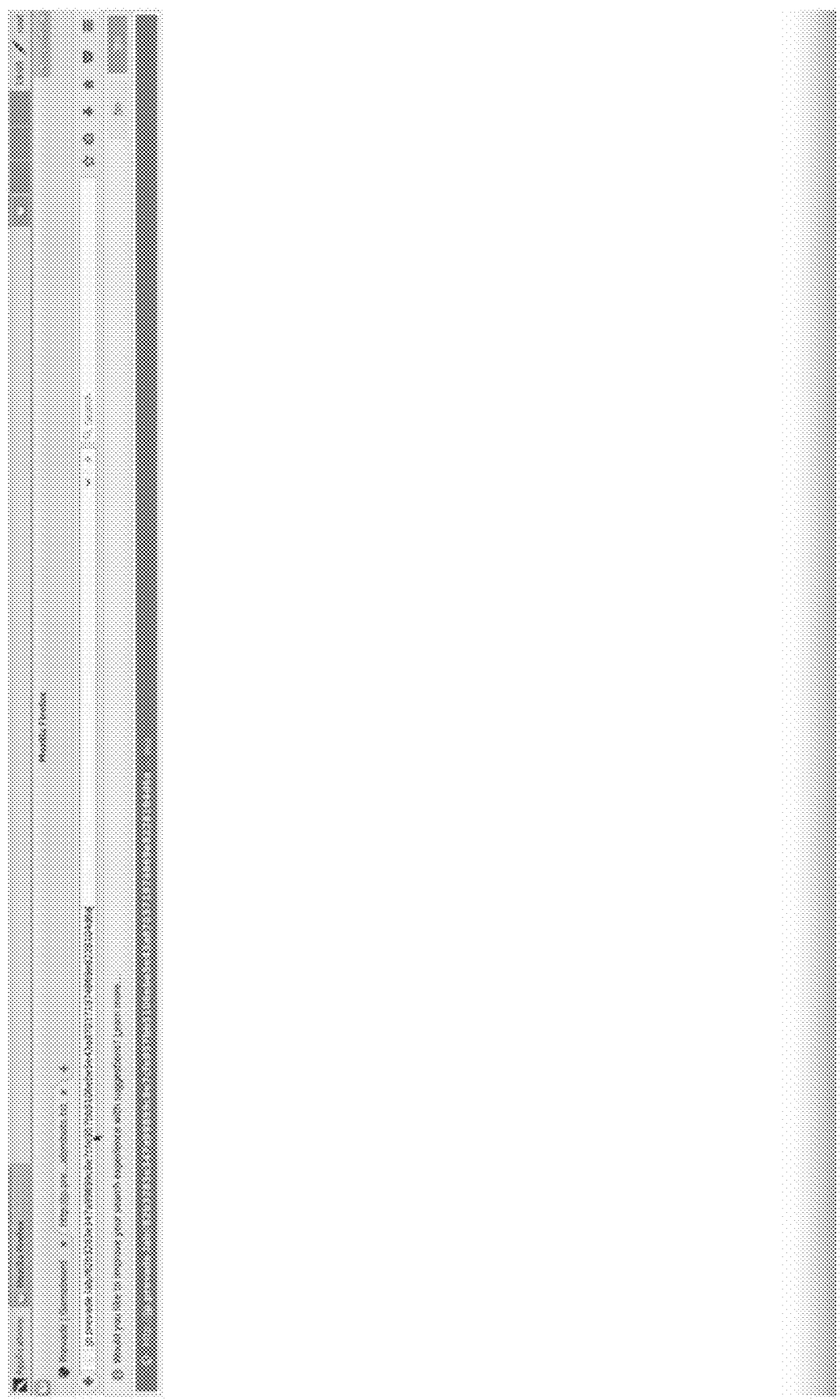
Fig. 4.33

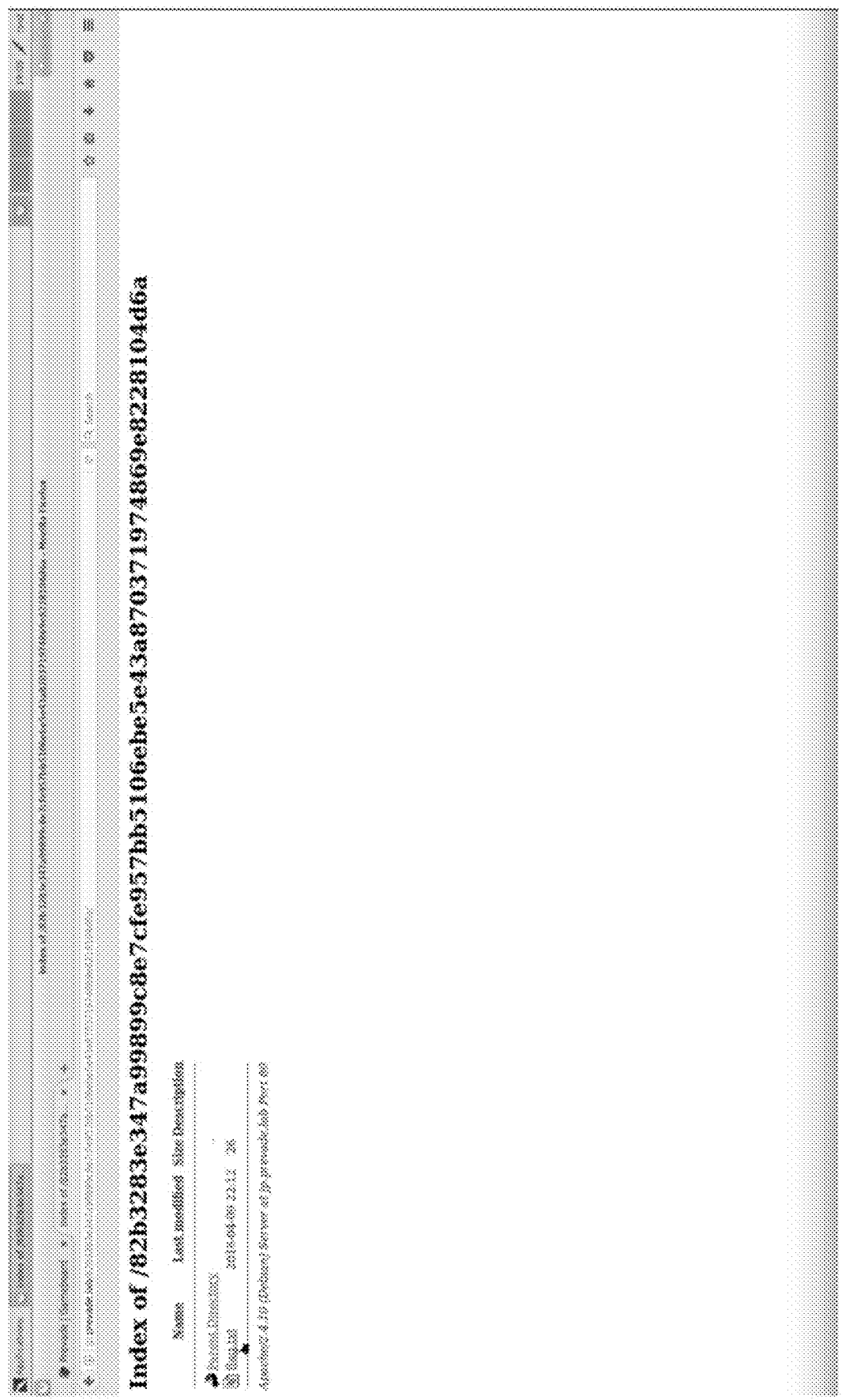
Fig. 4.34

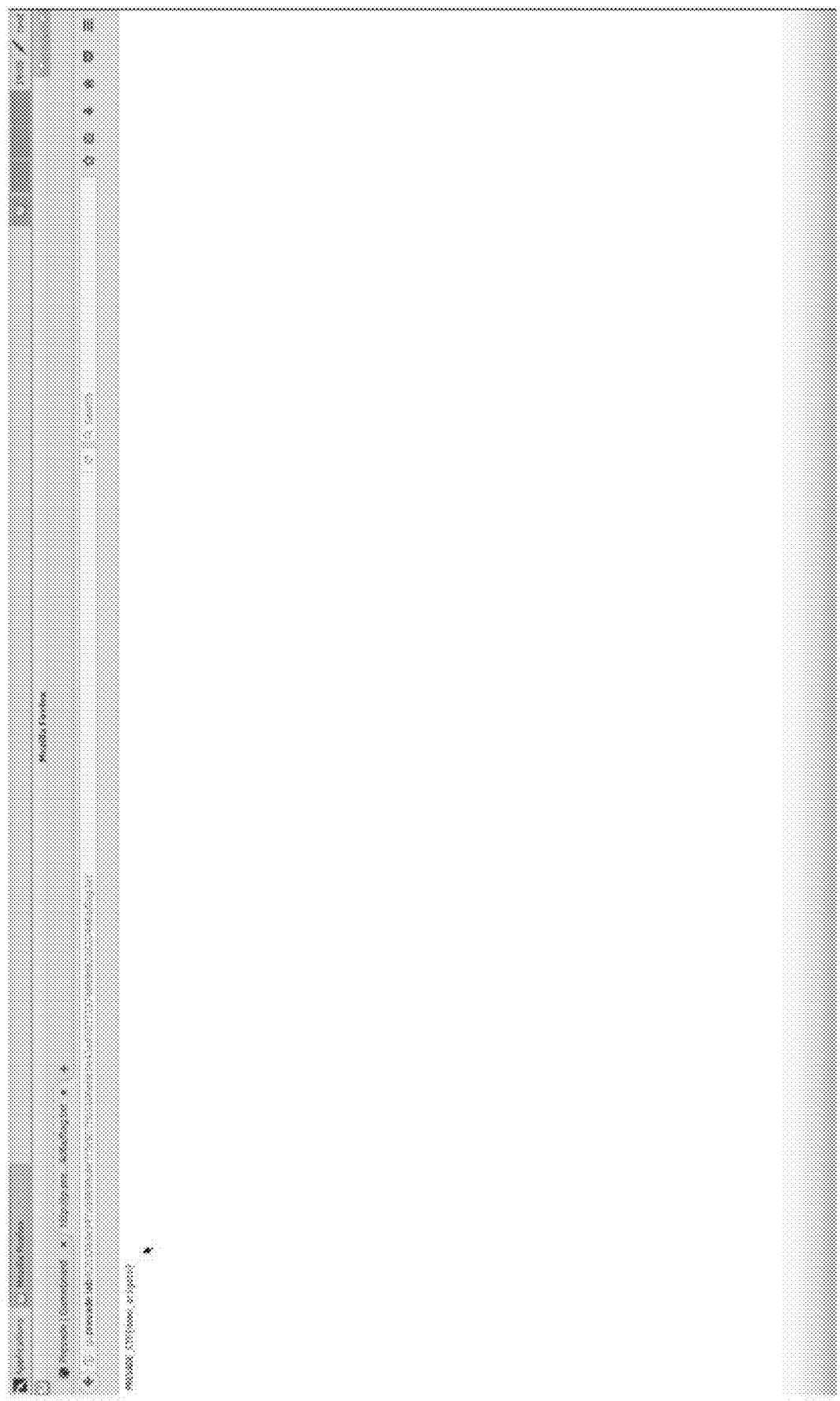
Fig. 4.35

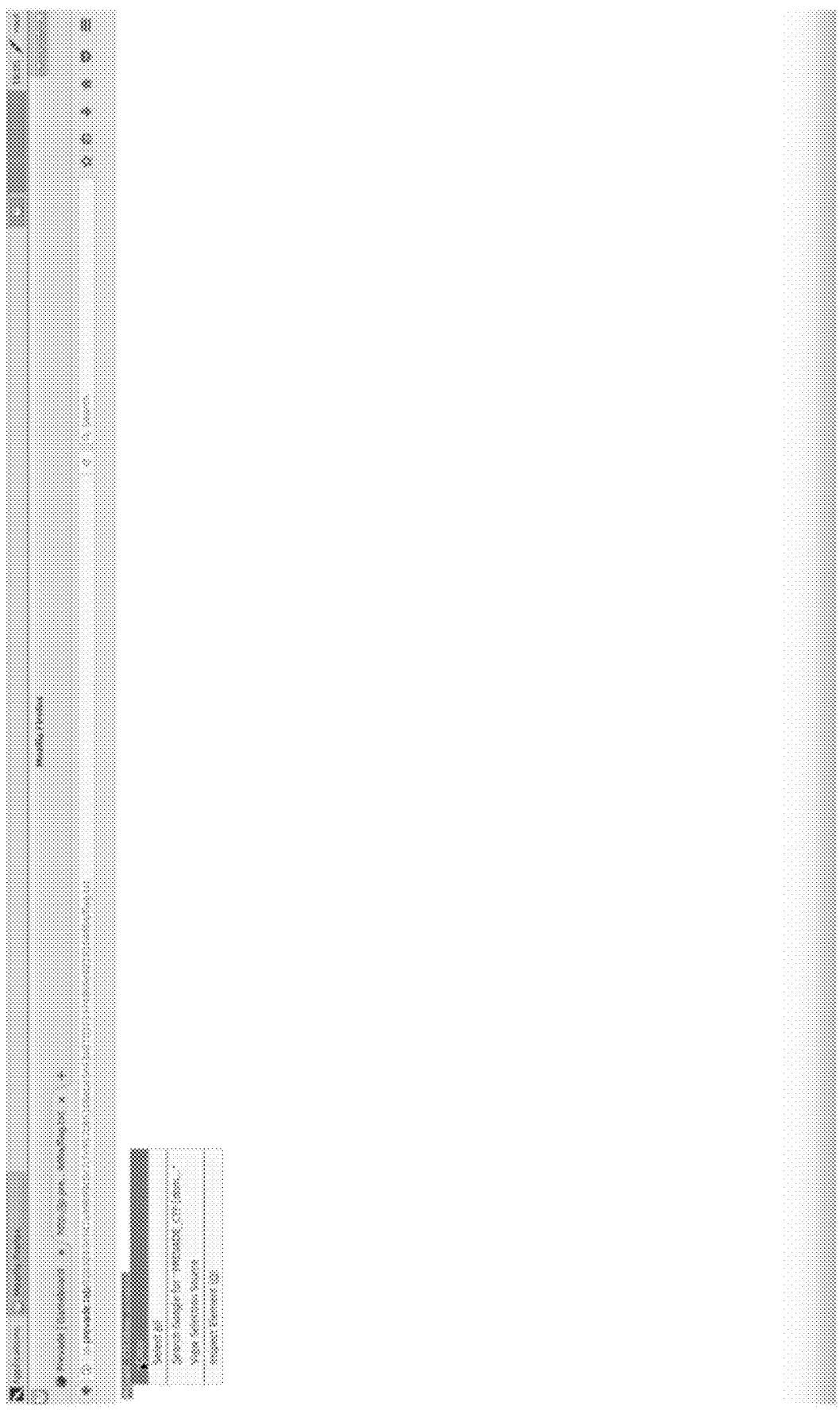
Fig. 4.36

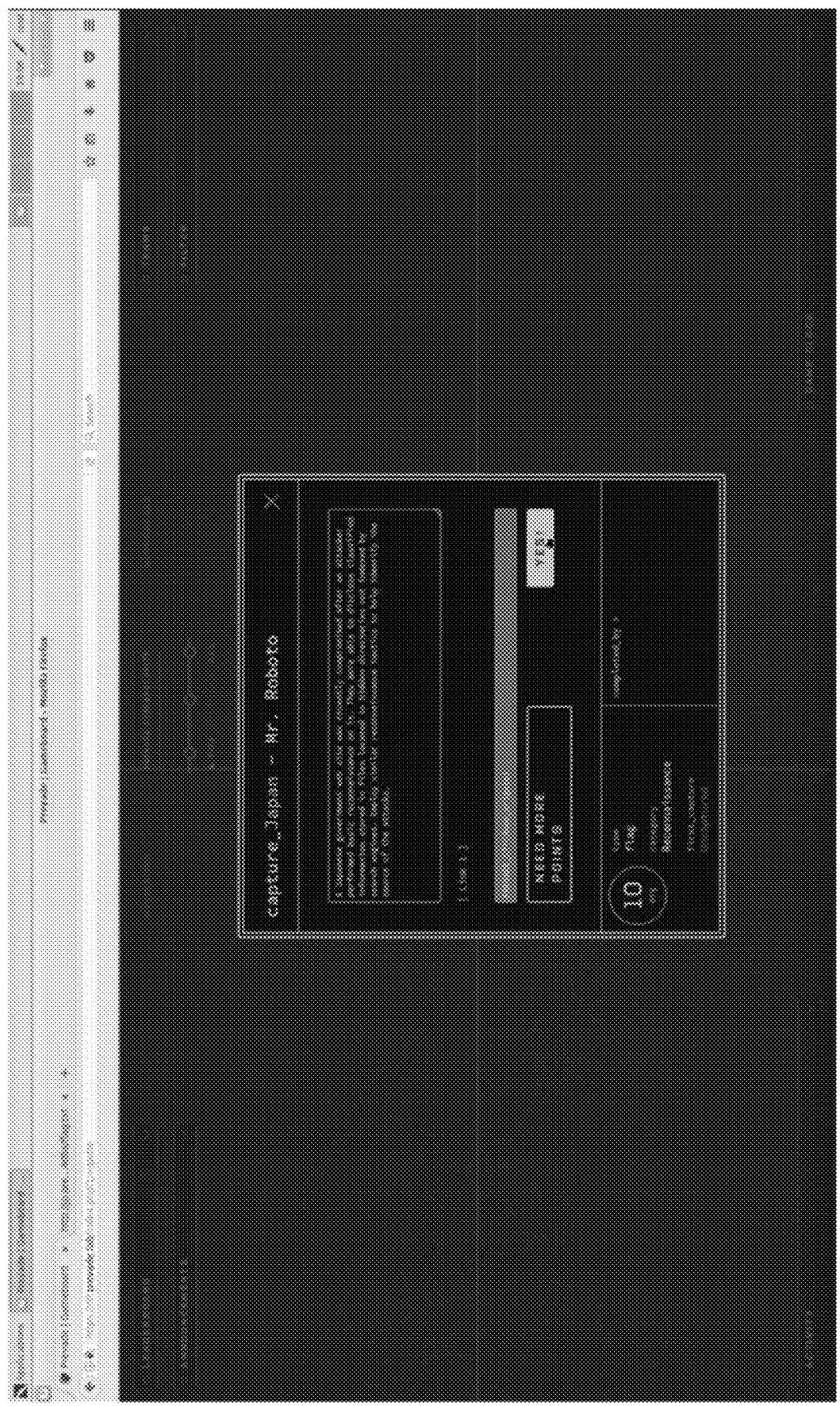
Fig. 4.37

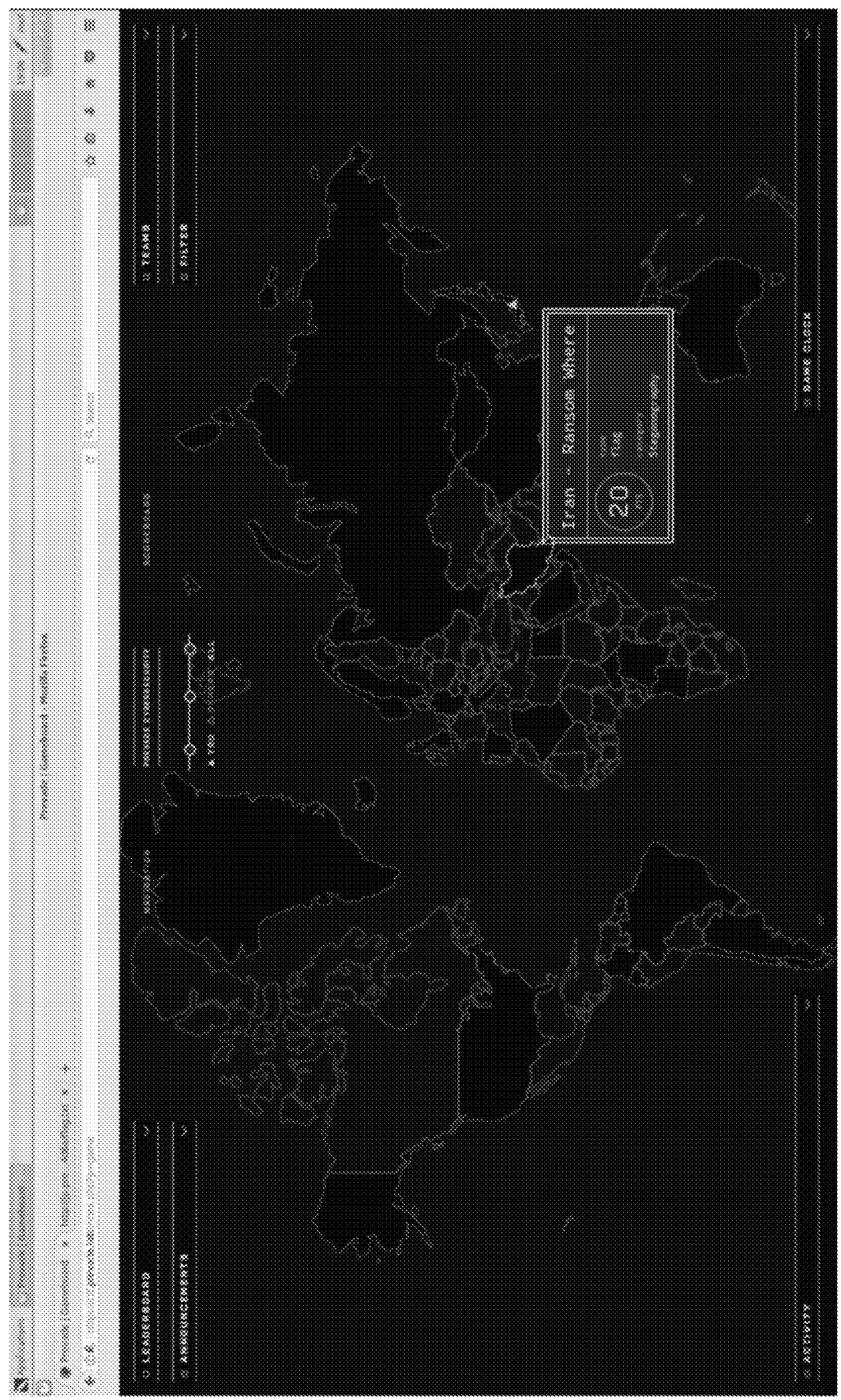
Fig. 4.38

Fig. 4.39

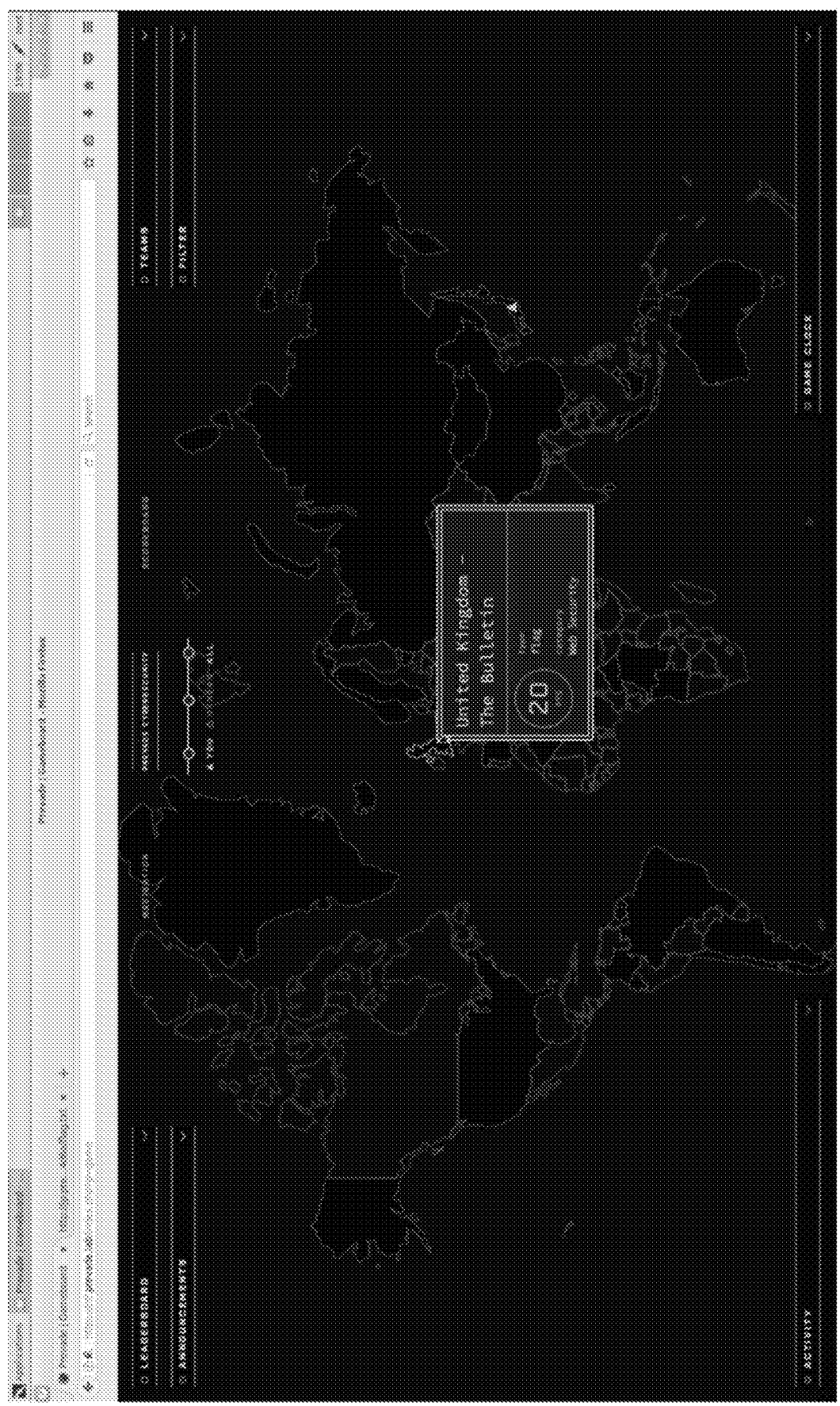
Fig. 4.40

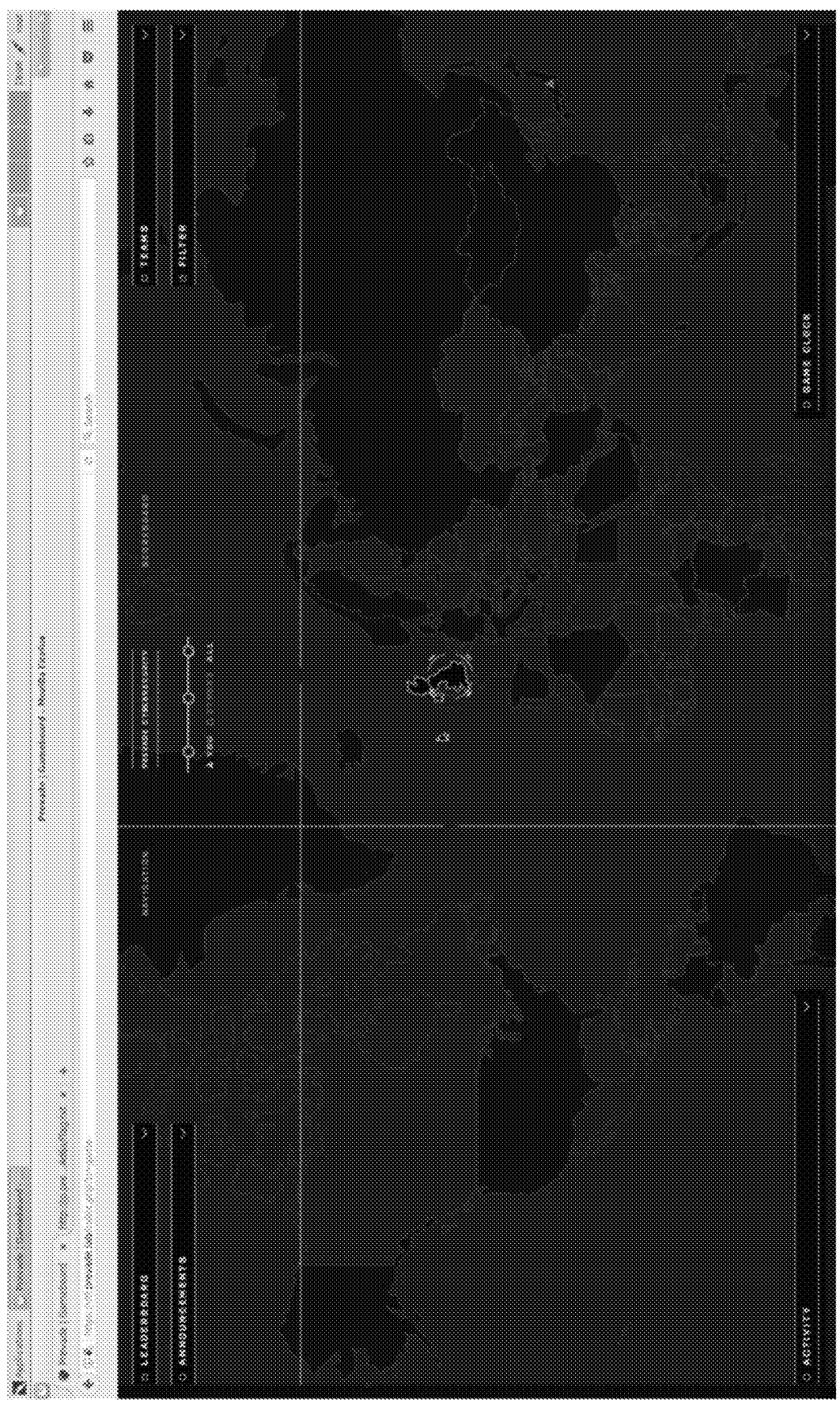
Fig. 4.41

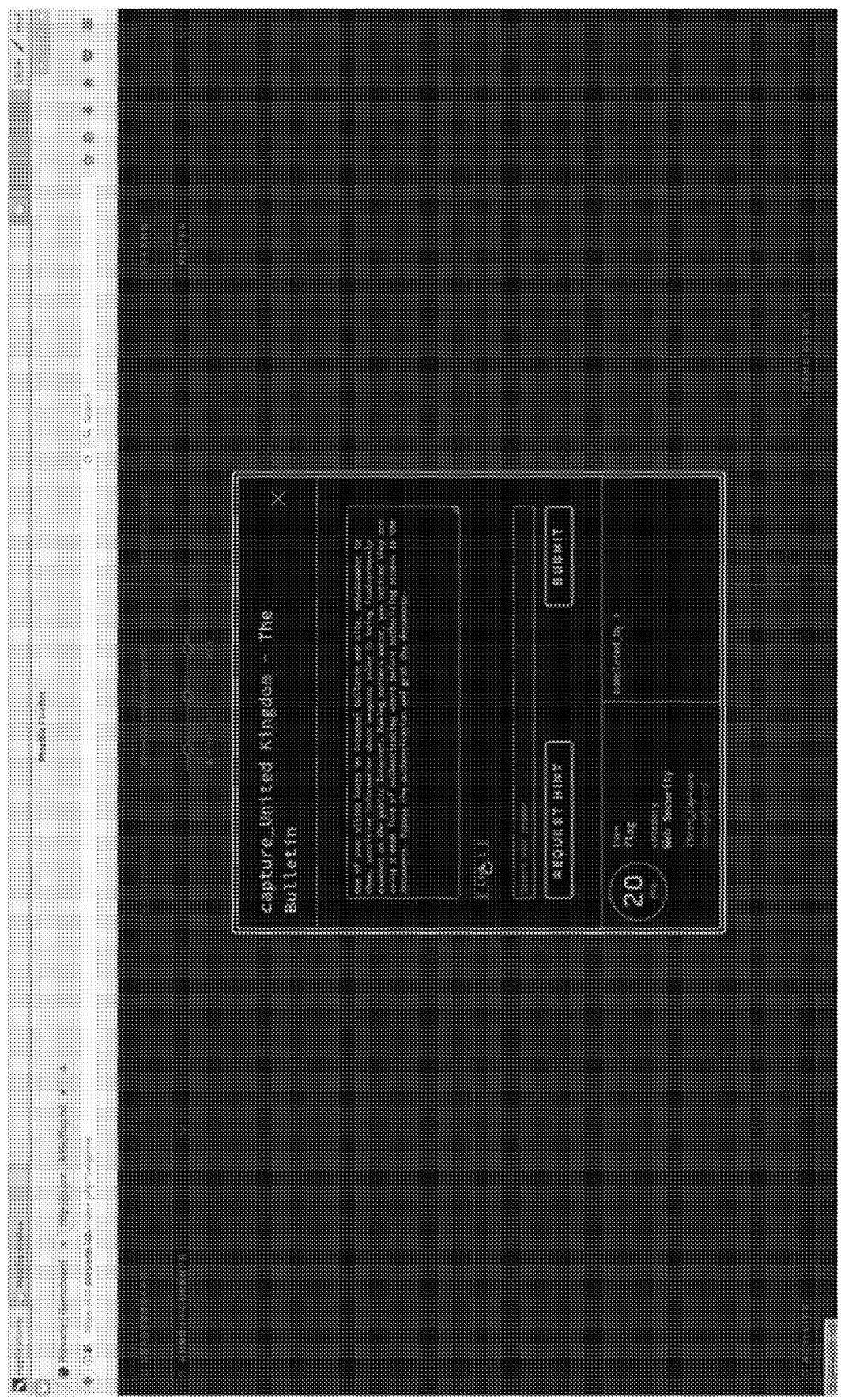
Fig. 4.42

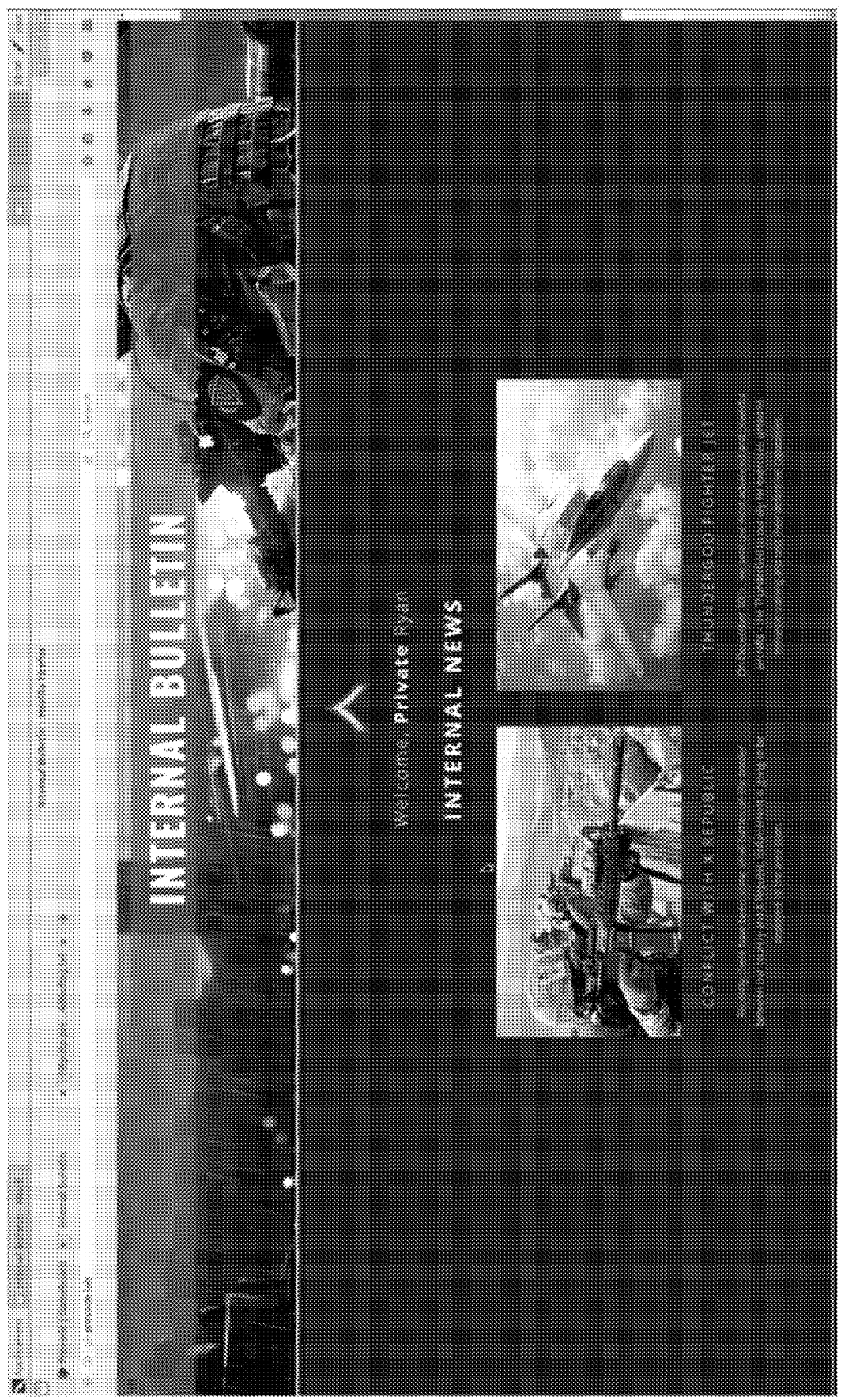
Fig. 4.43

Fig. 4.44

Fig. 4.45

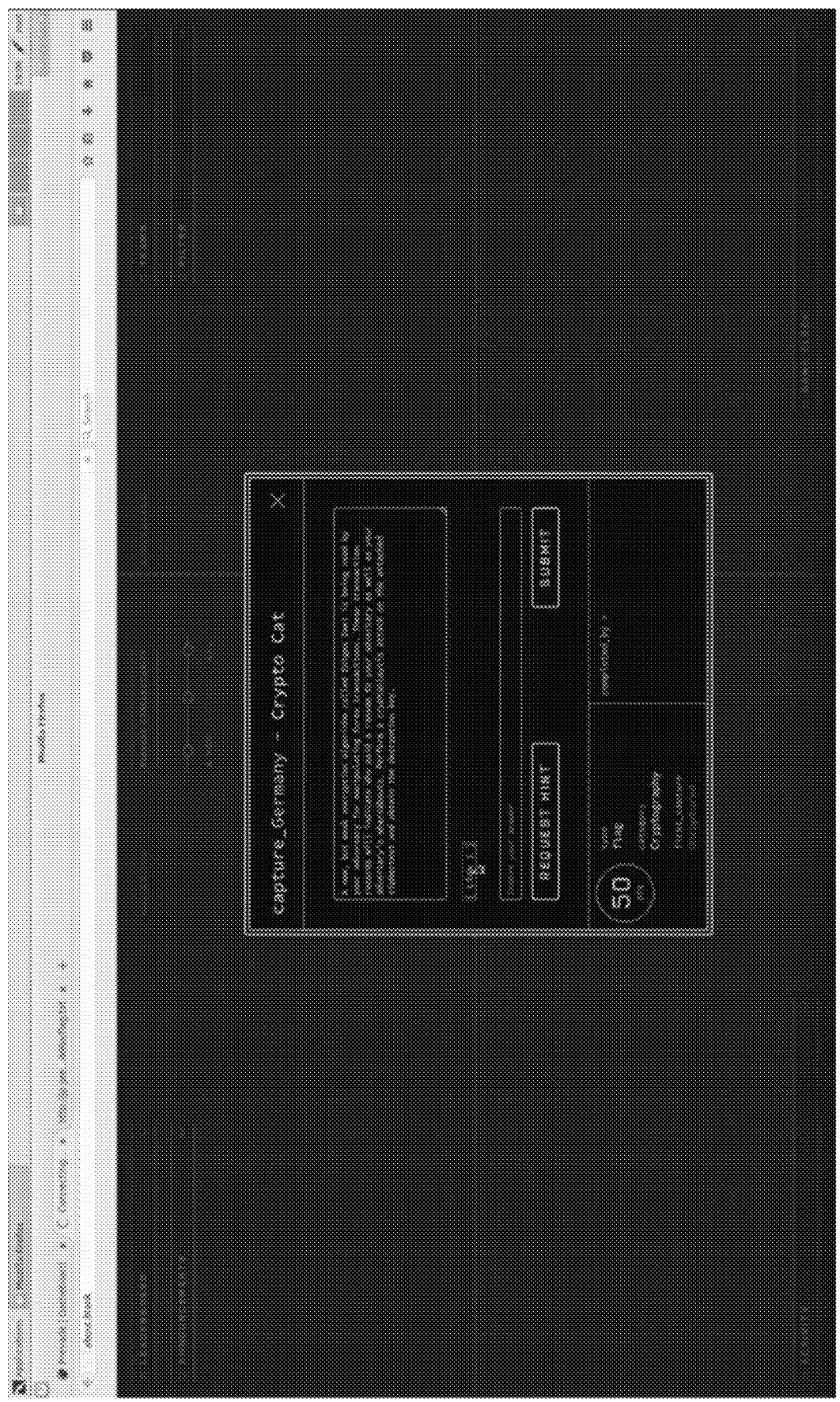
Fig. 4.46

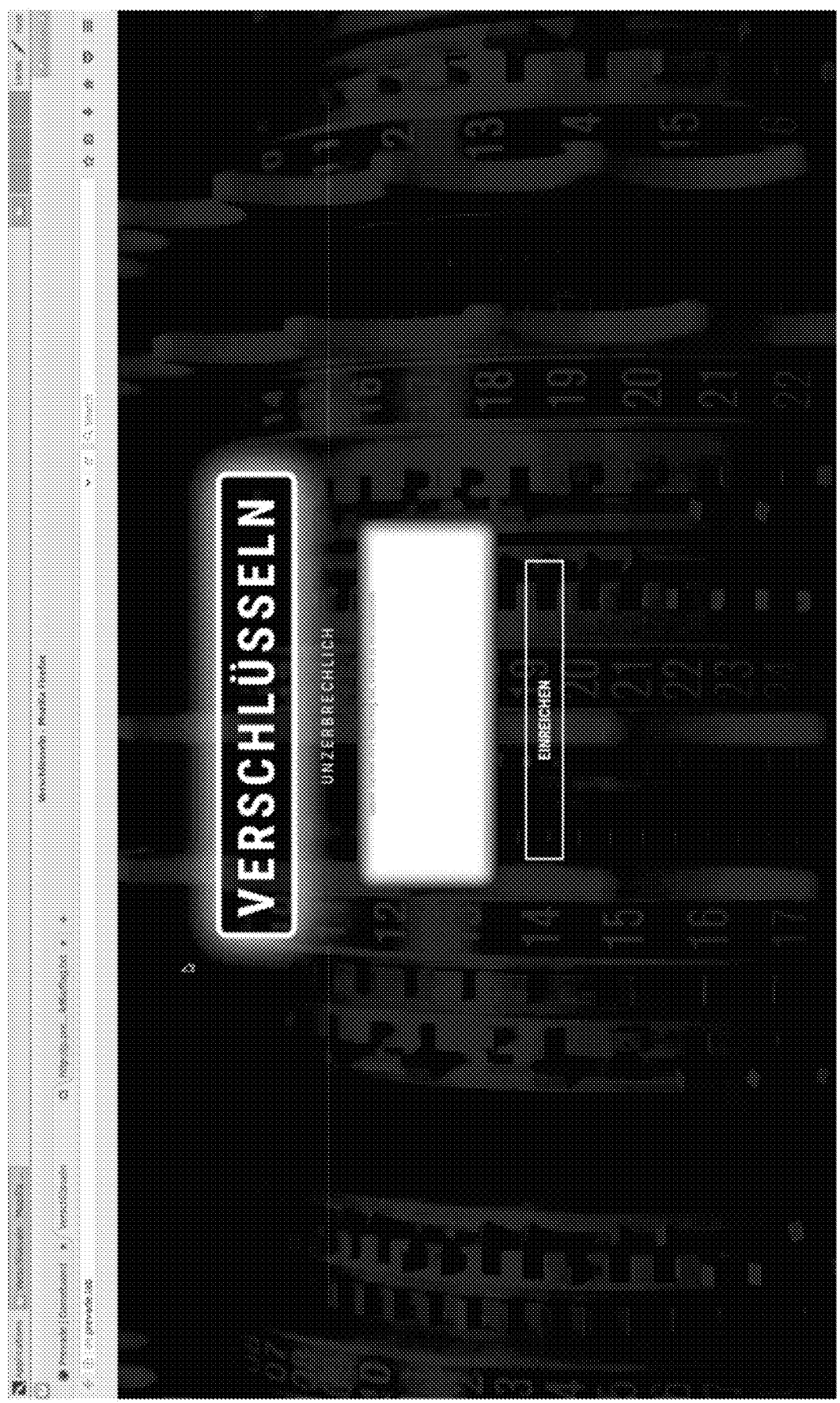
Fig. 4.47

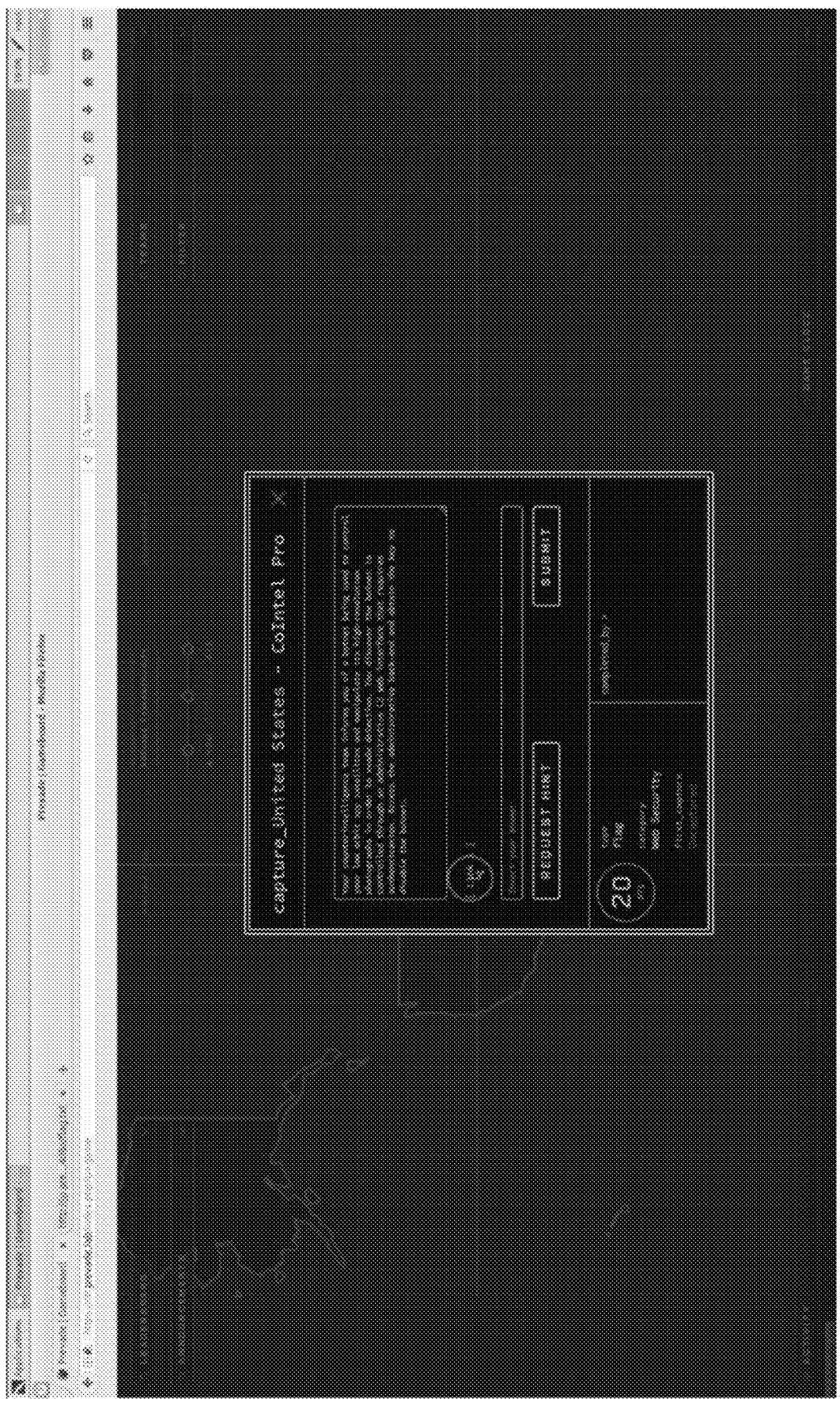
Fig. 4.48

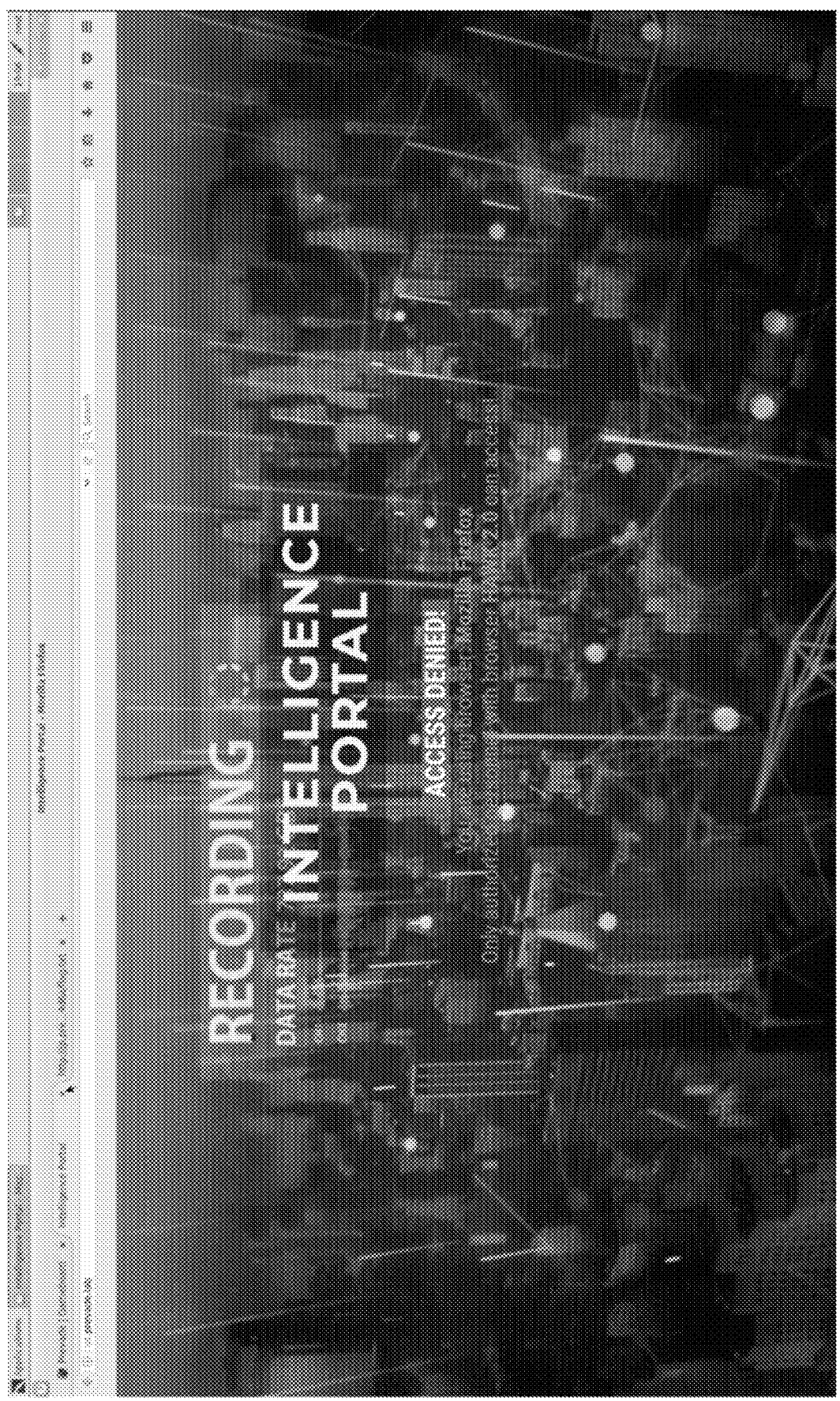
Fig. 4.49

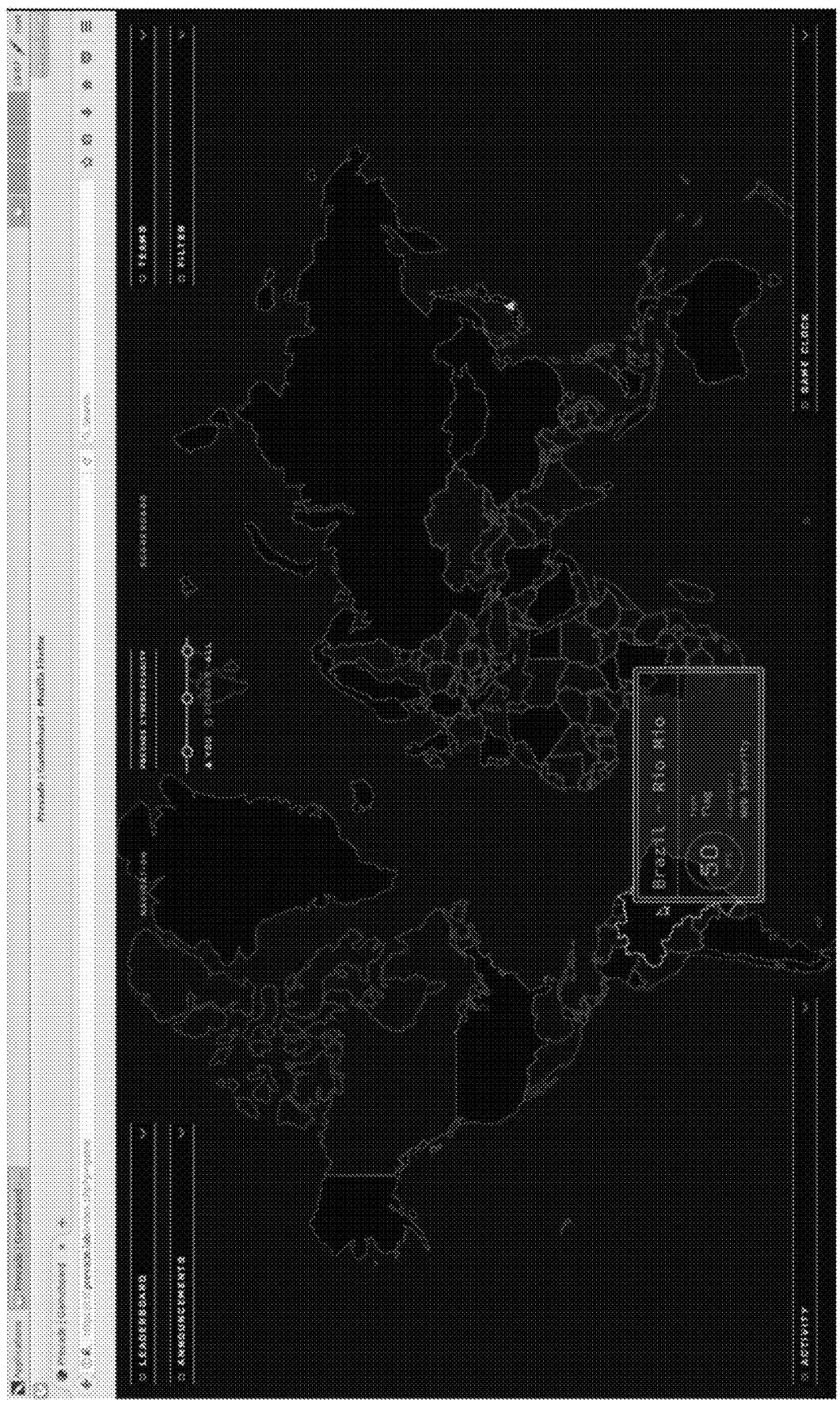
Fig. 4.50

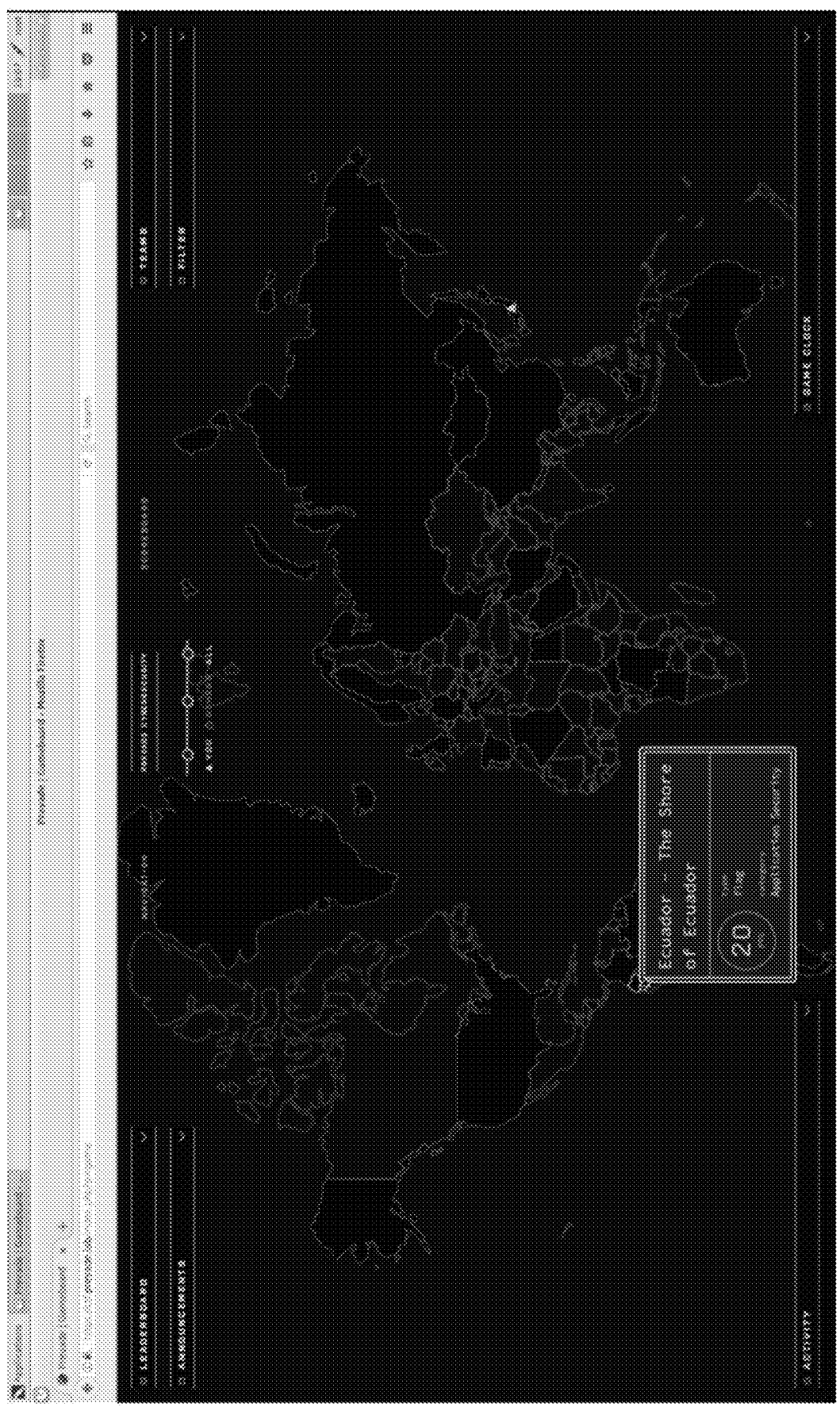
Fig. 4.51

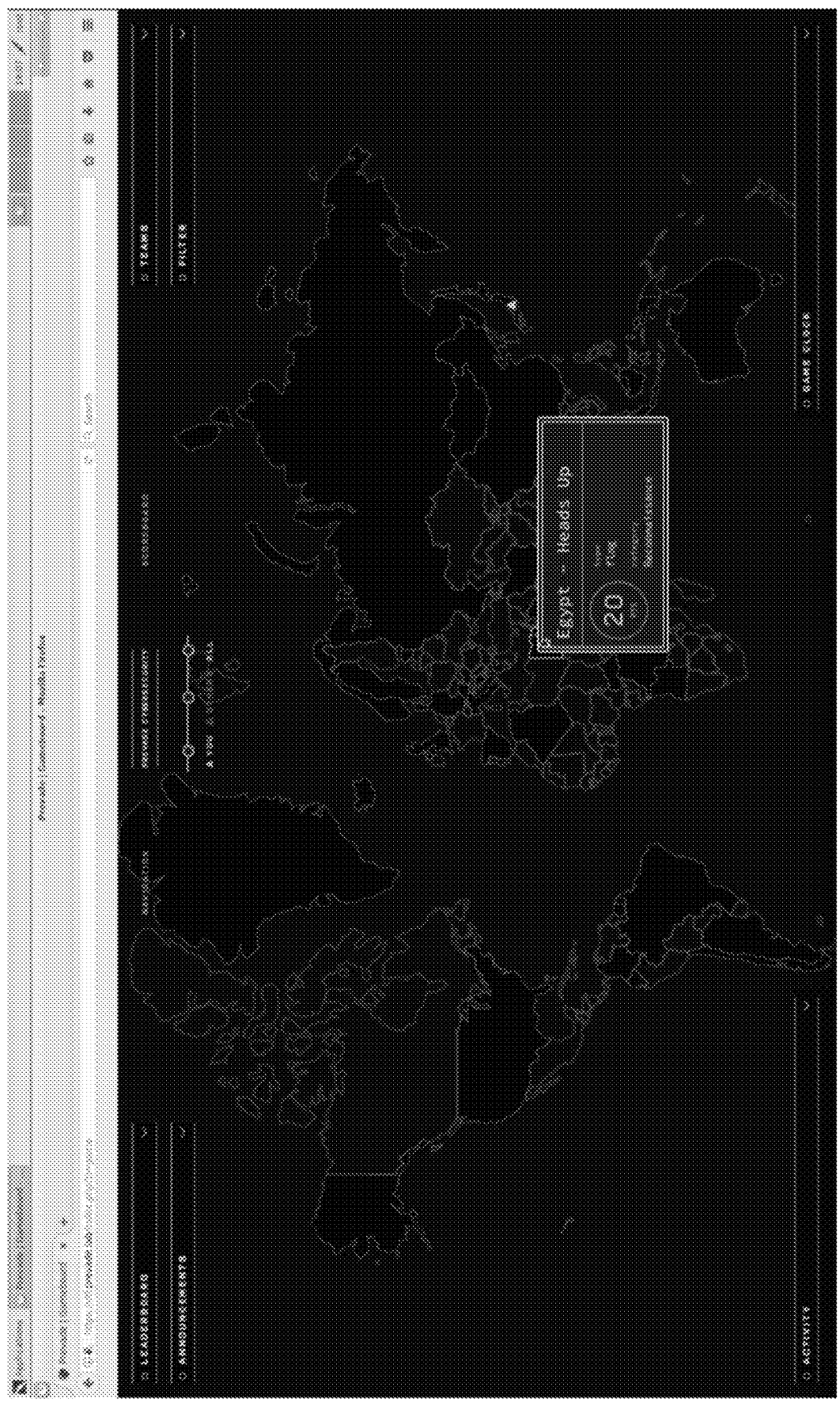
Fig. 4.52

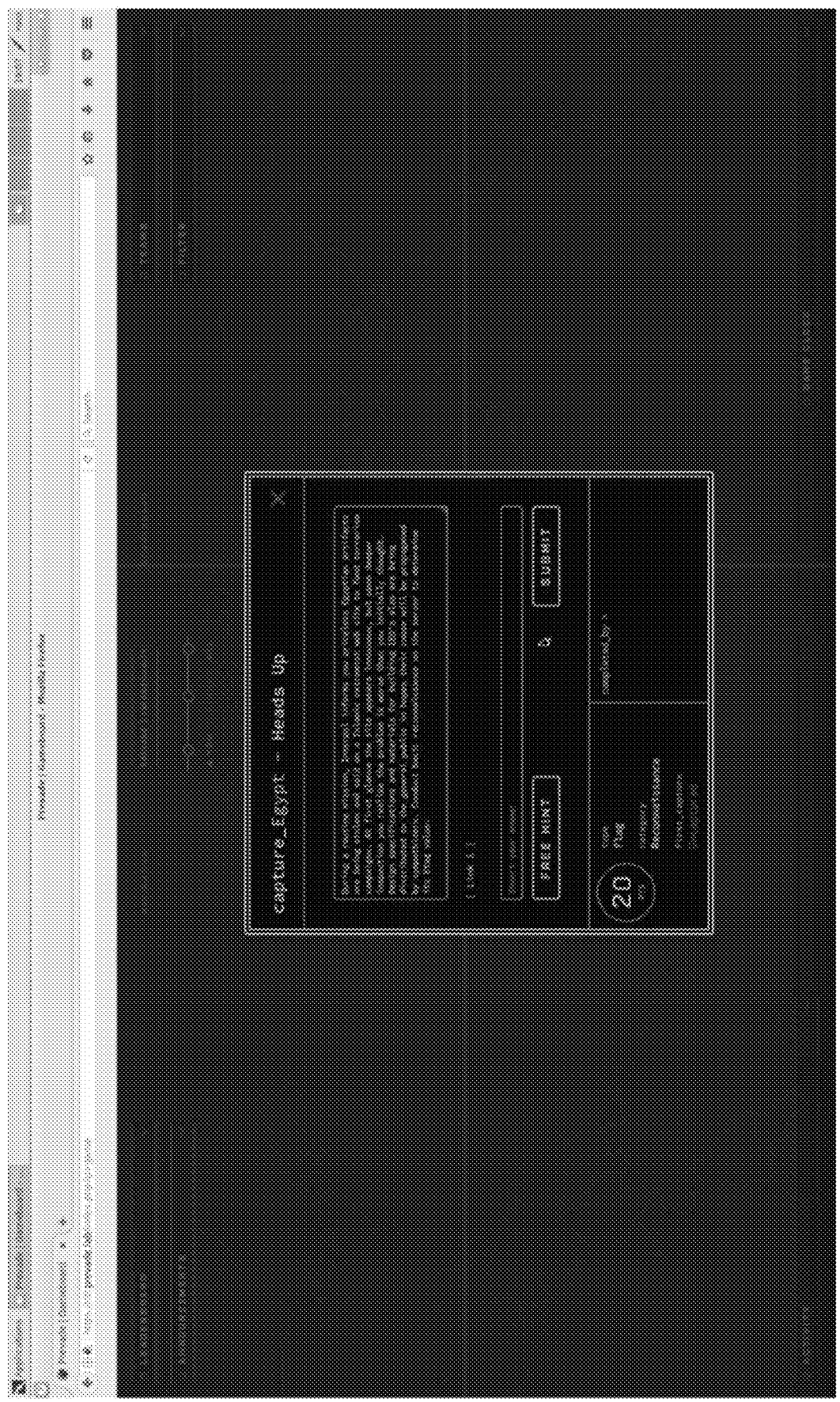
Fig. 4.53

Fig. 4.53

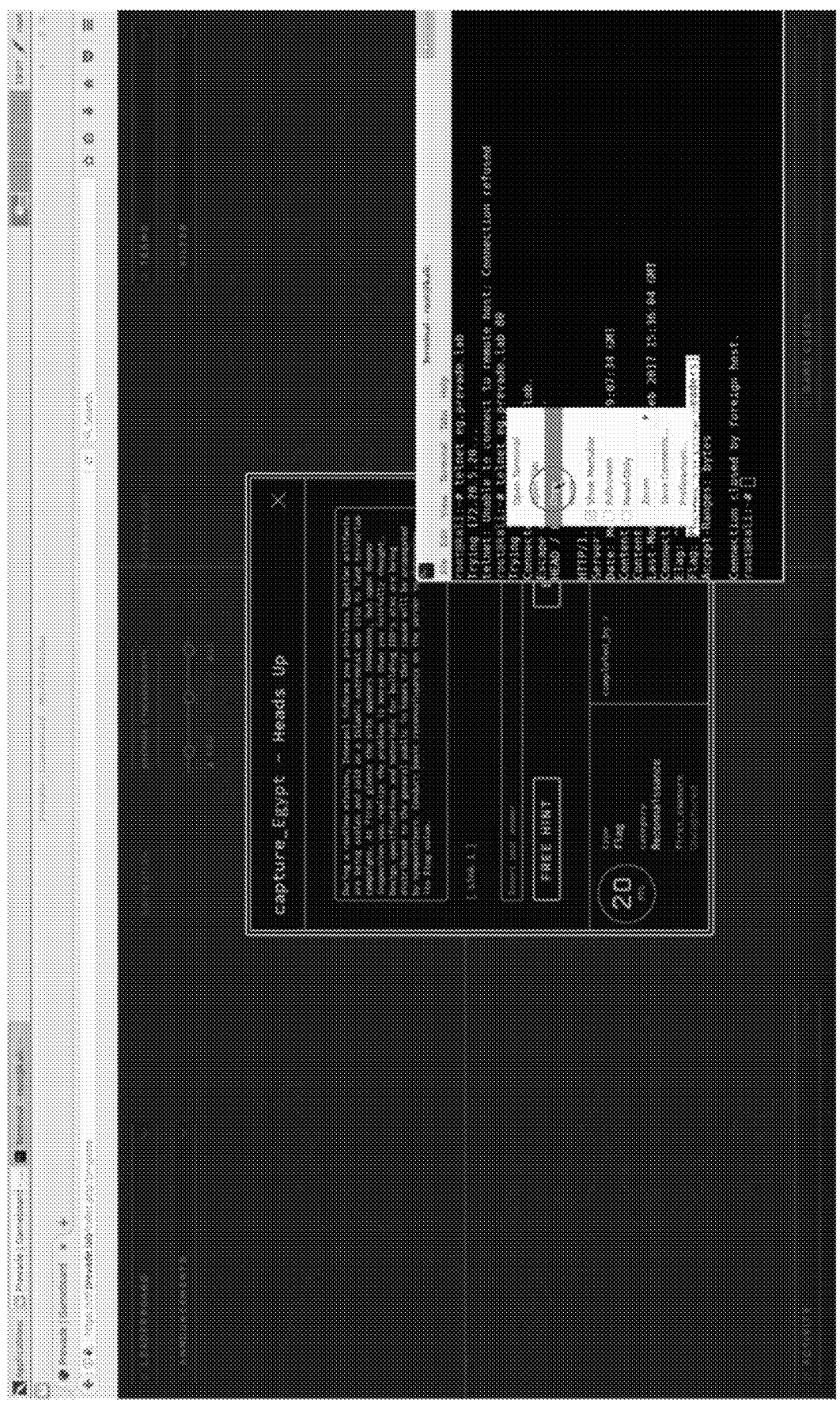
Fig. 4.55

Fig. 4.56

Fig. 4.57

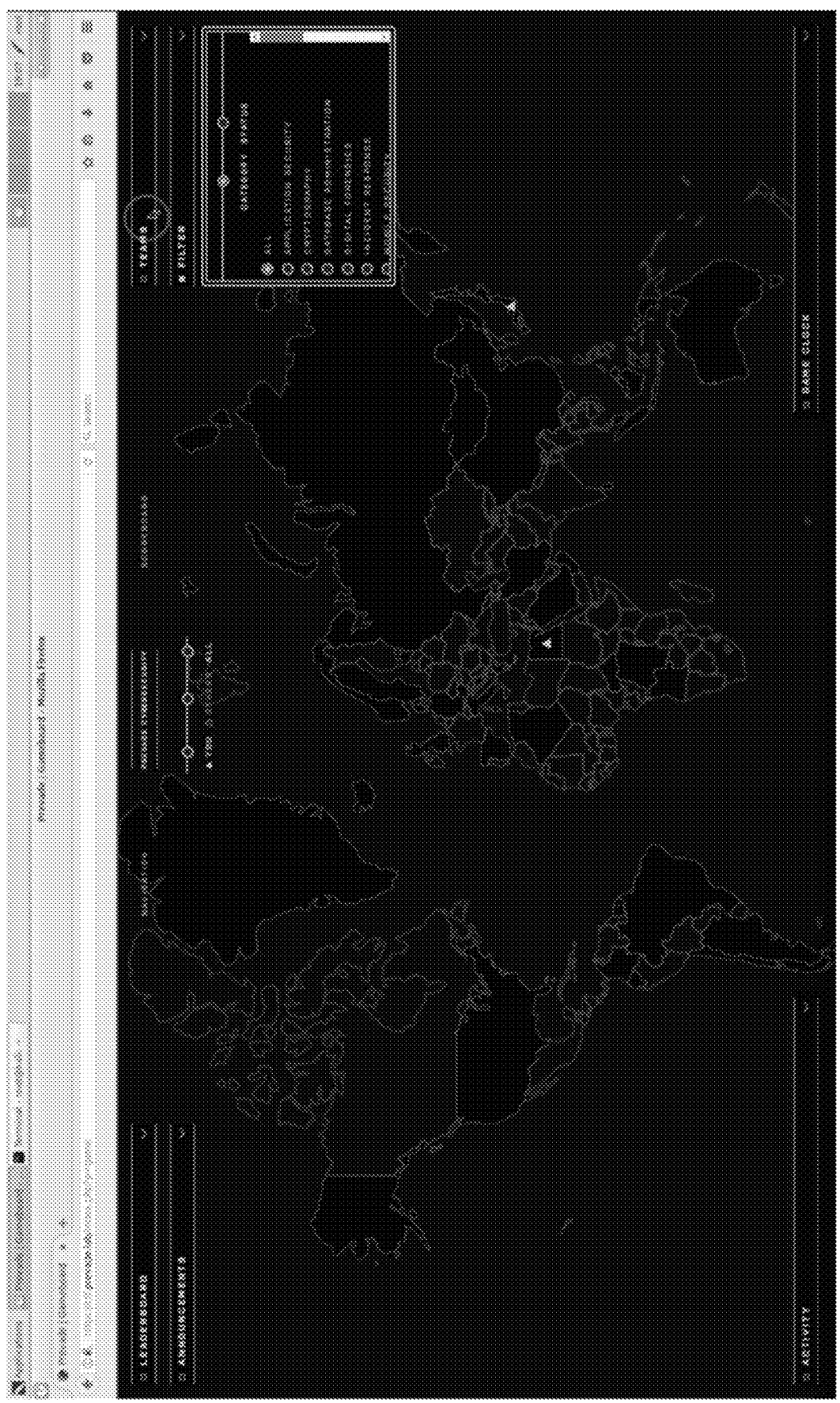
Fig. 4.58

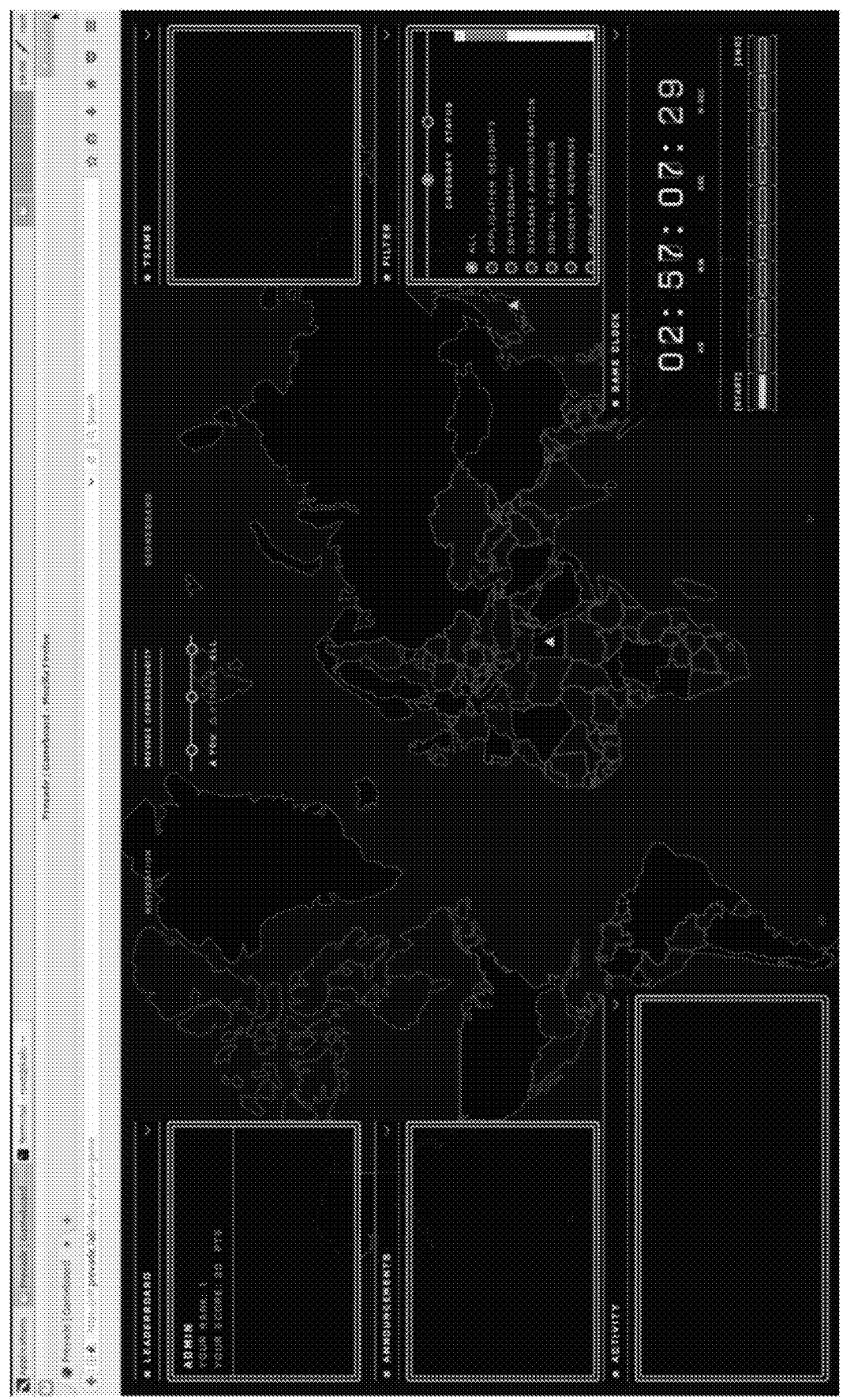
Fig. 4.59

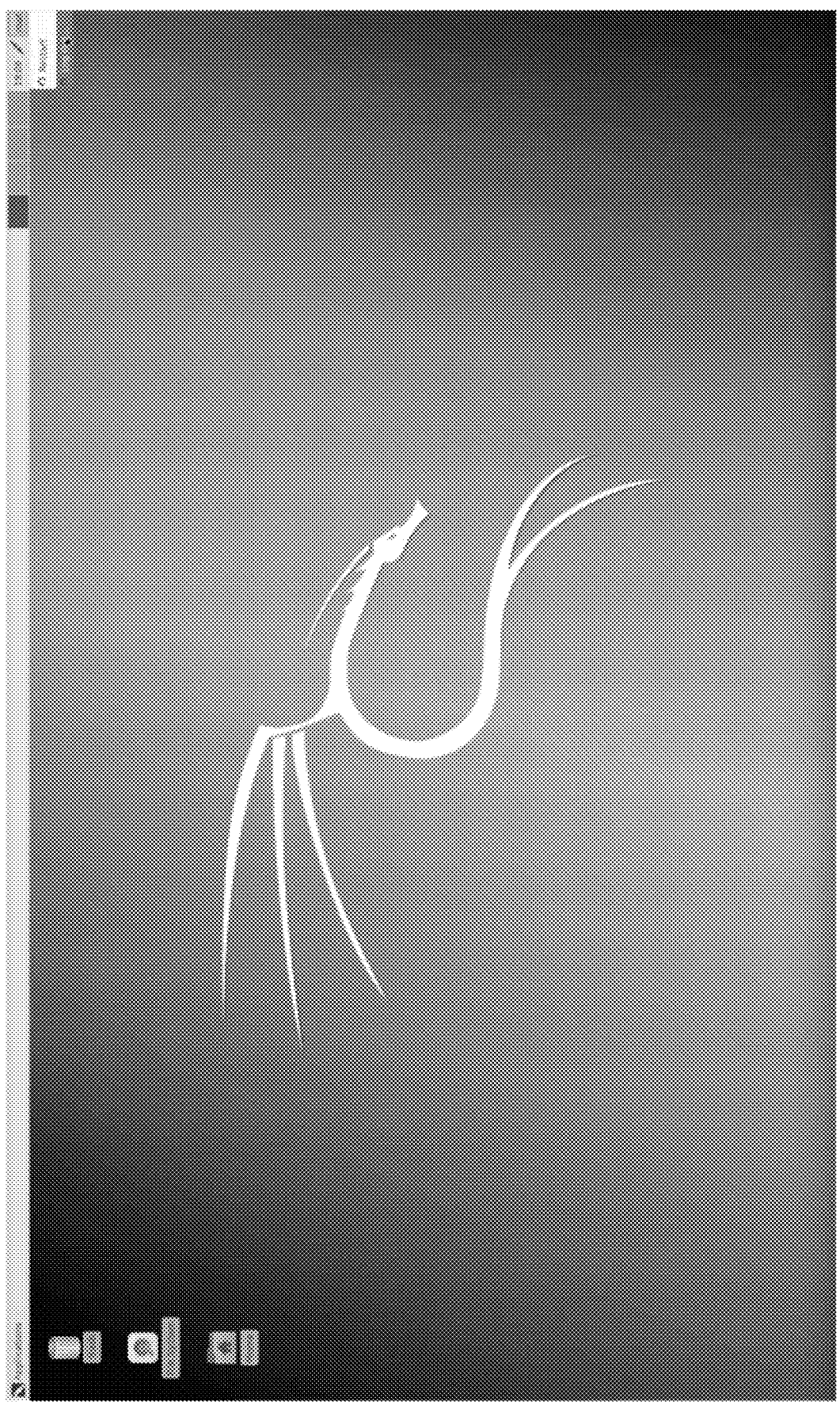
Fig. 4.60

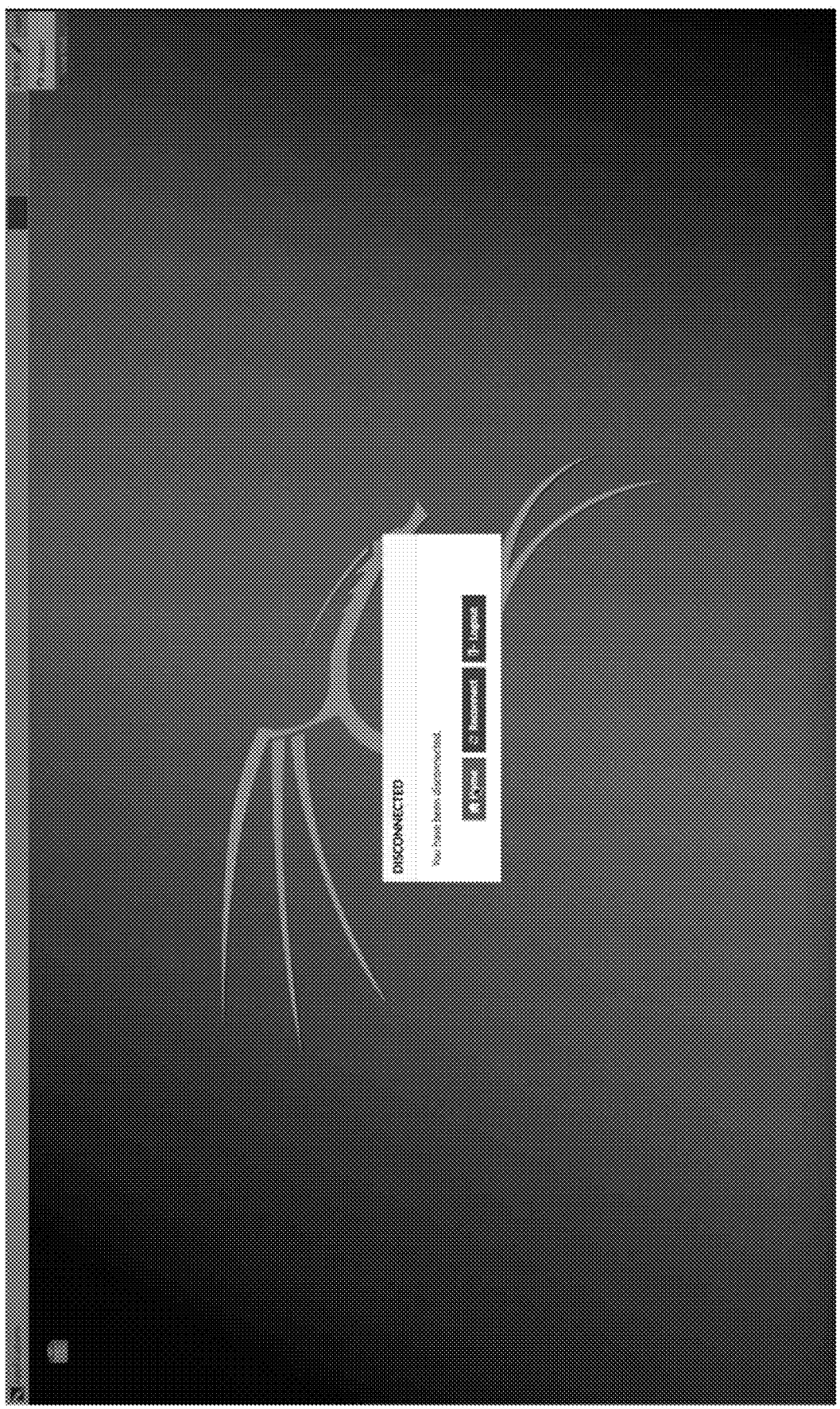
Fig. 4.61

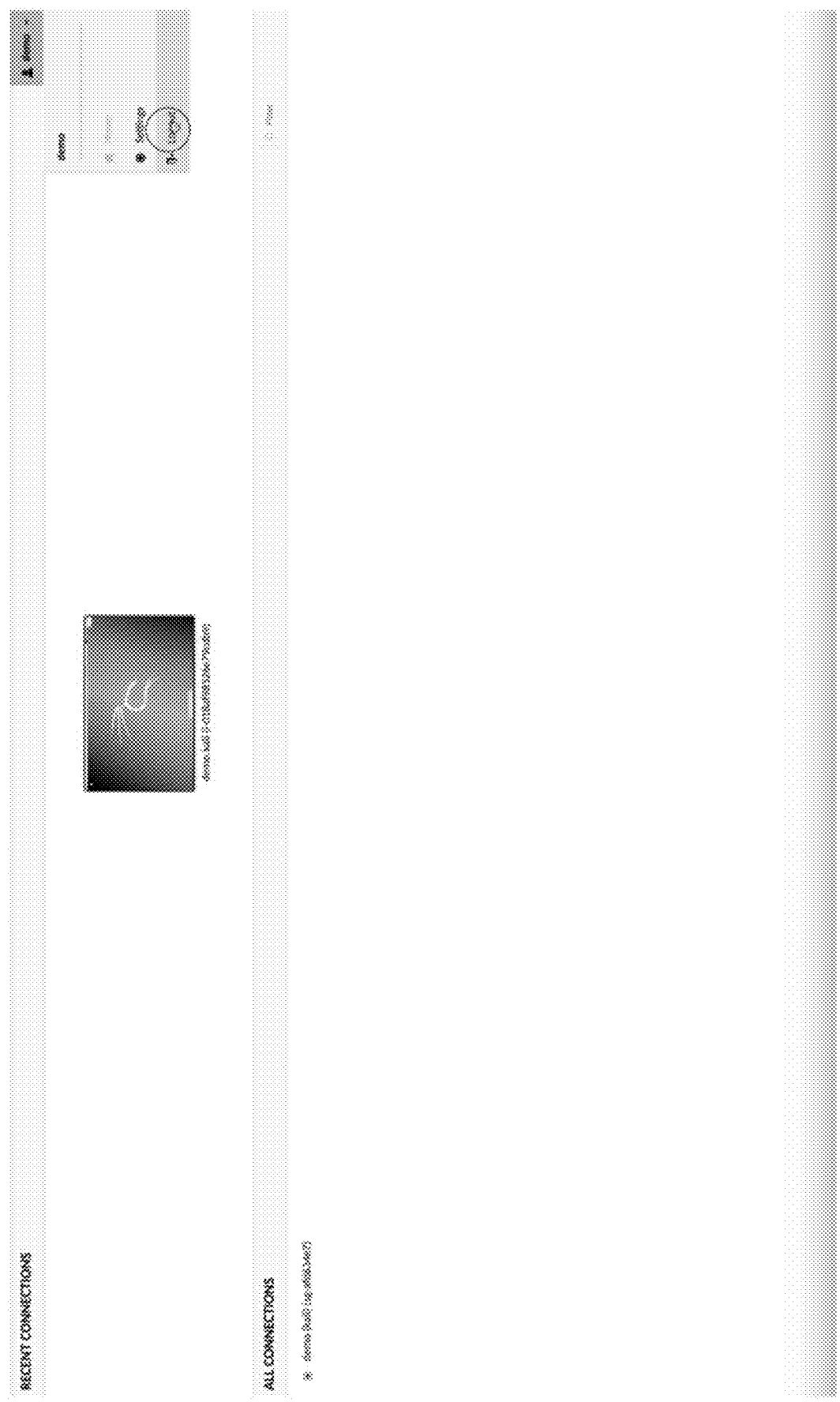
Fig. 4.62

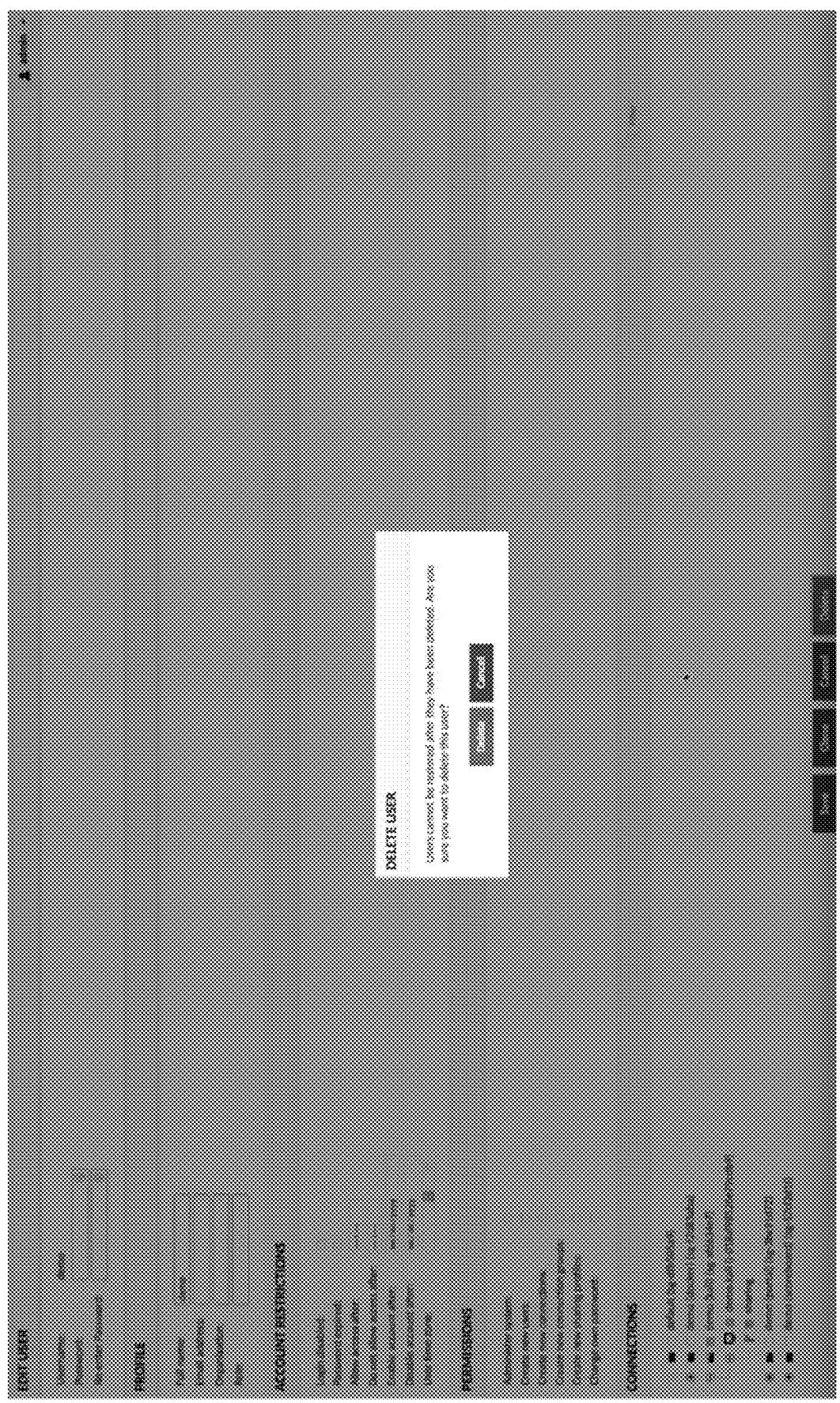
Fig. 4.63

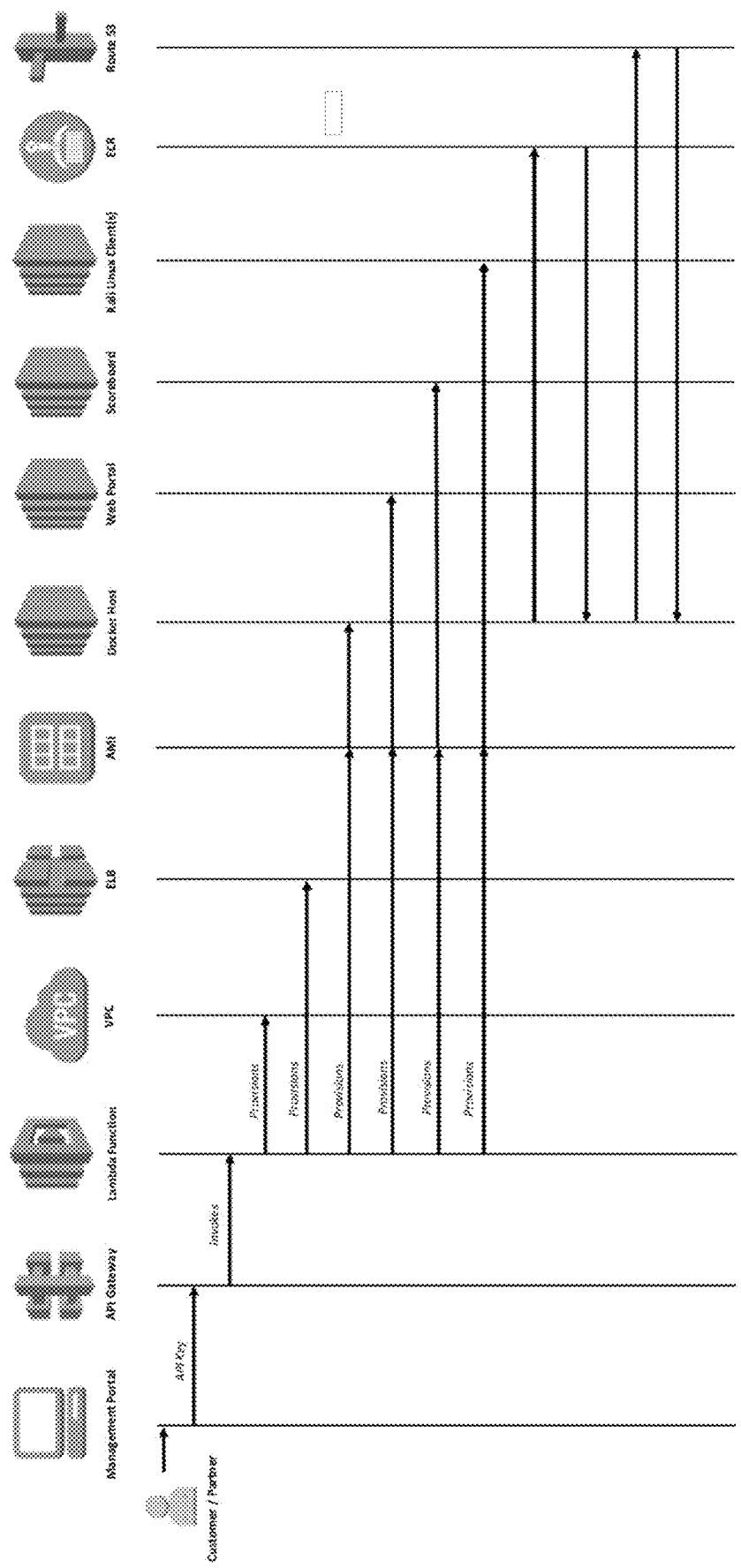
Fig. 5.1

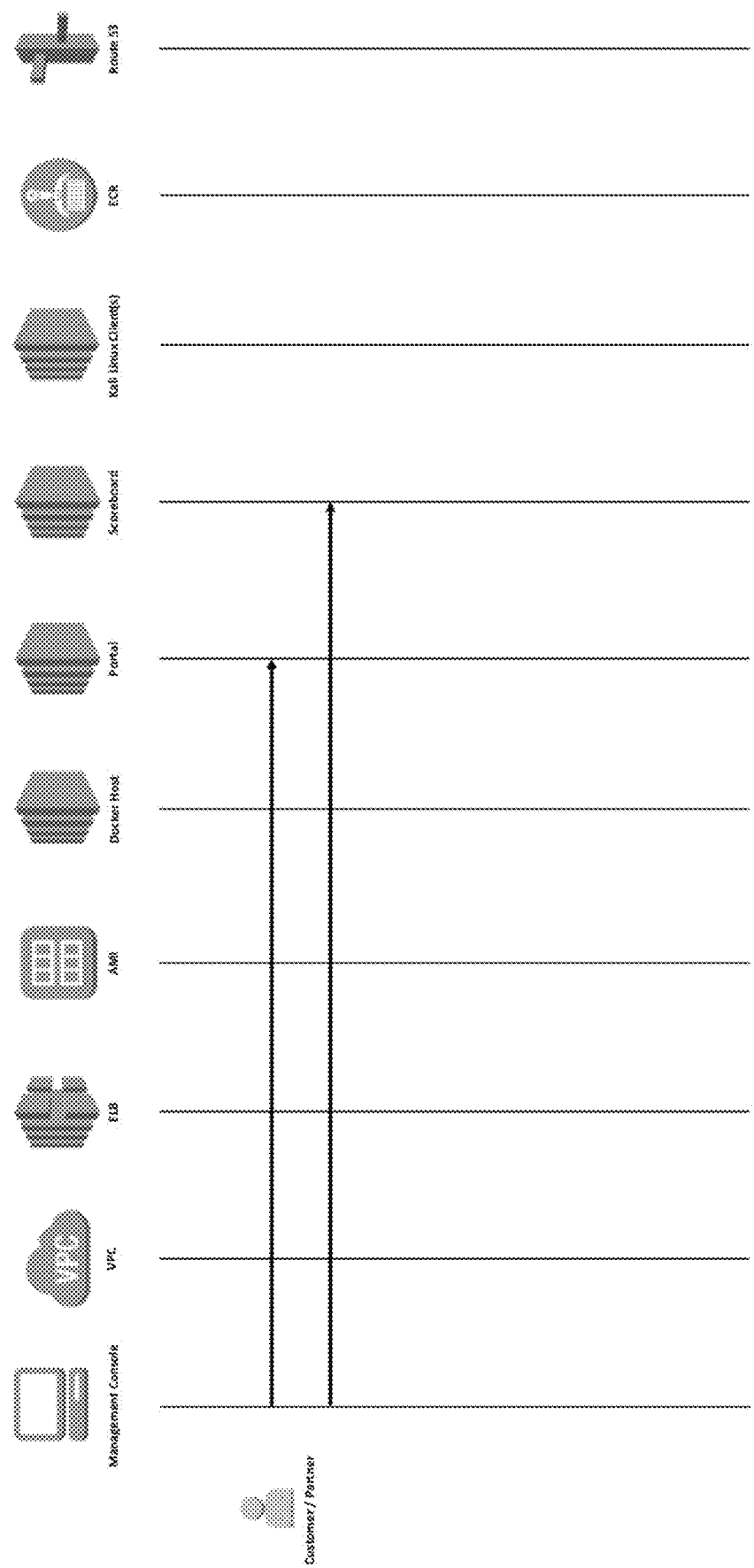
Fig. 5.2

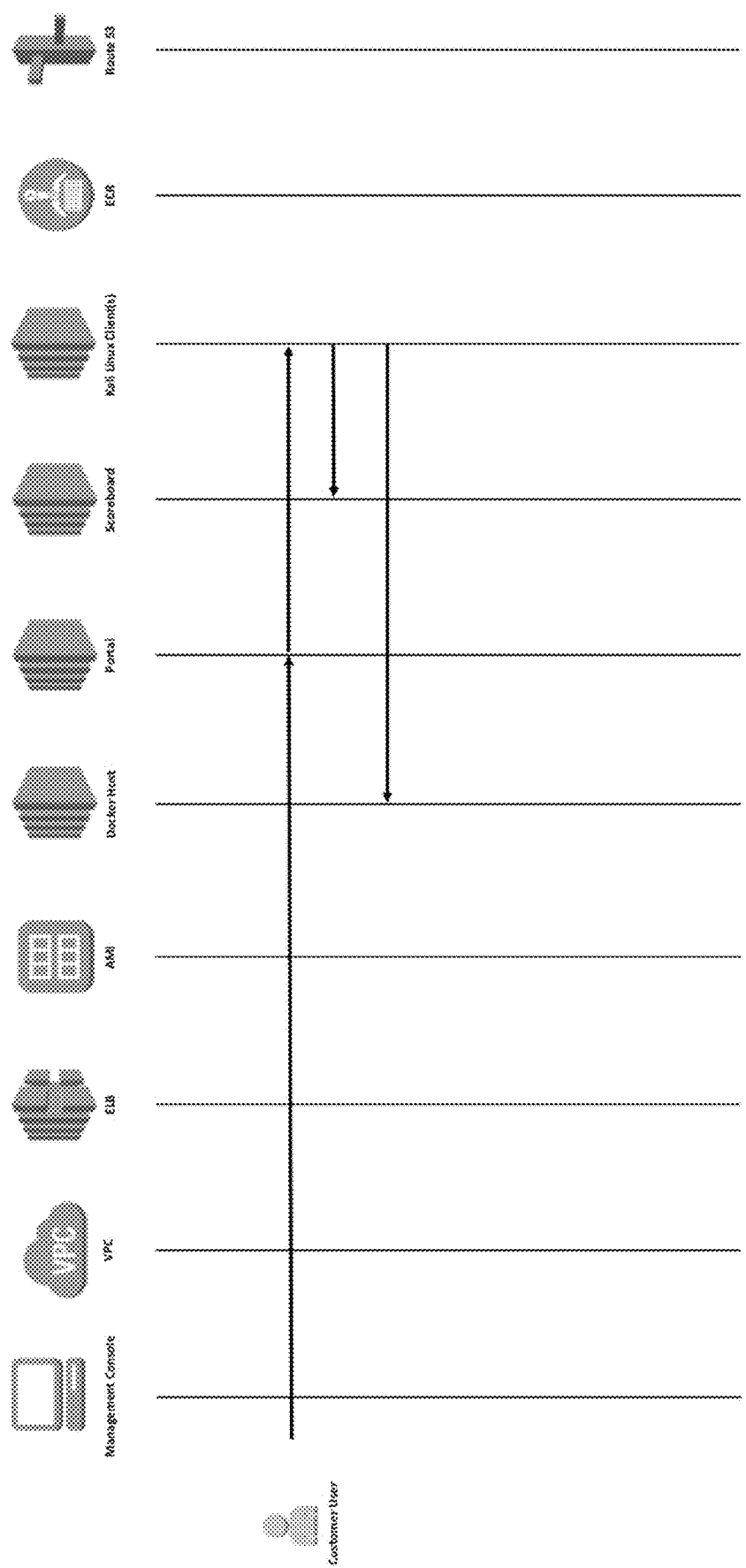
Fig. 5.3

Fig. 6.1

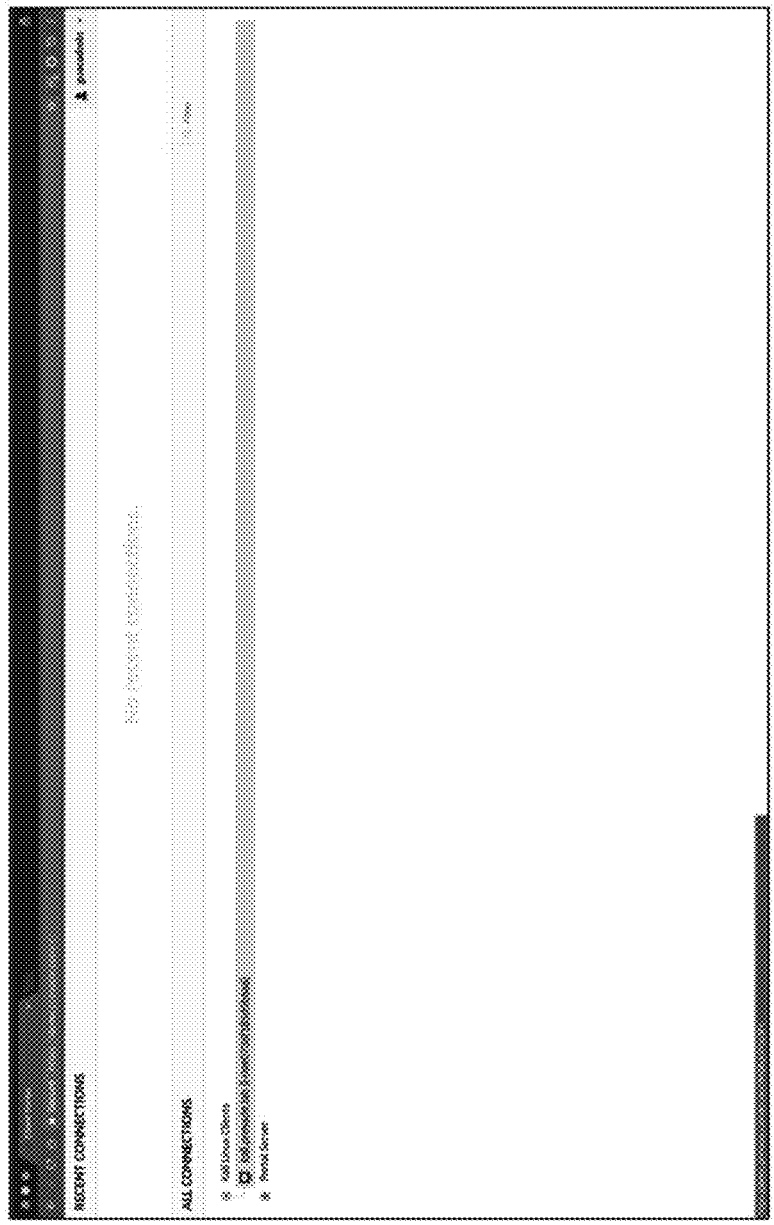
Fig. 6.2

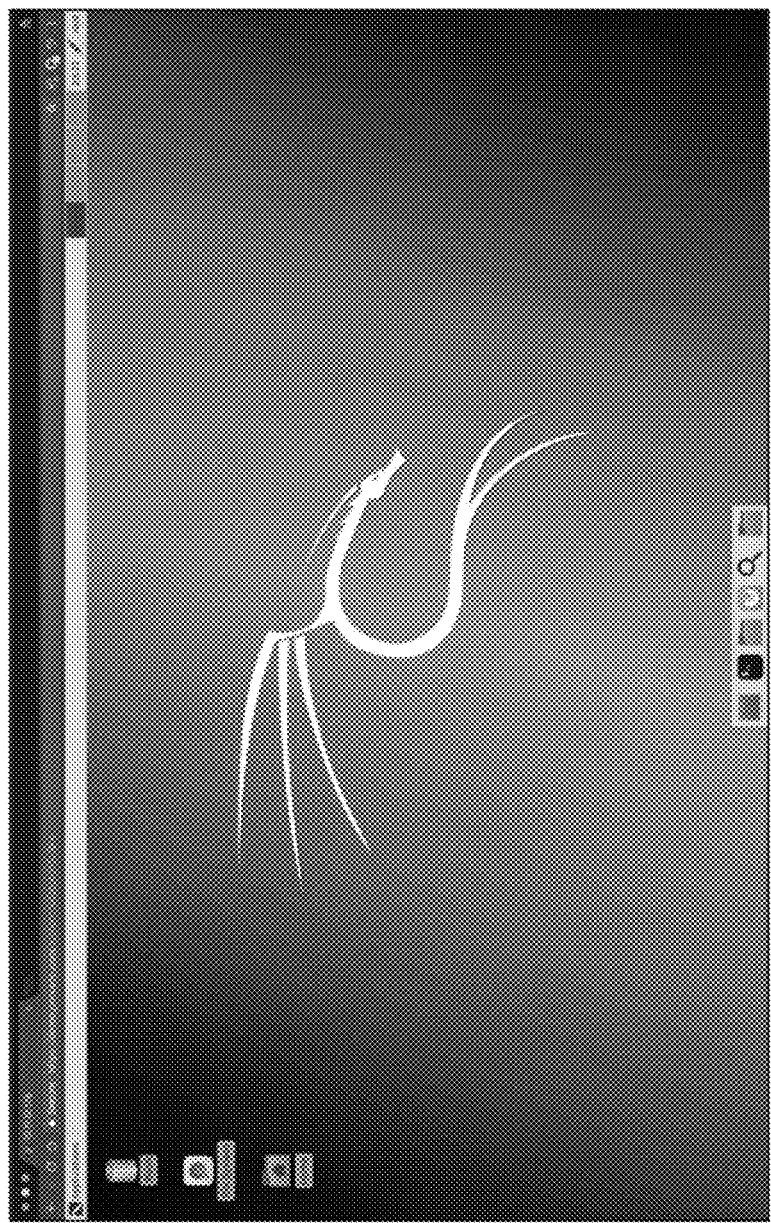
Fig. 6.3 WORKFLOW
A Kali Linux desktop GUI is rendered through the browser.

Fig. 6.4
WORKFLOW
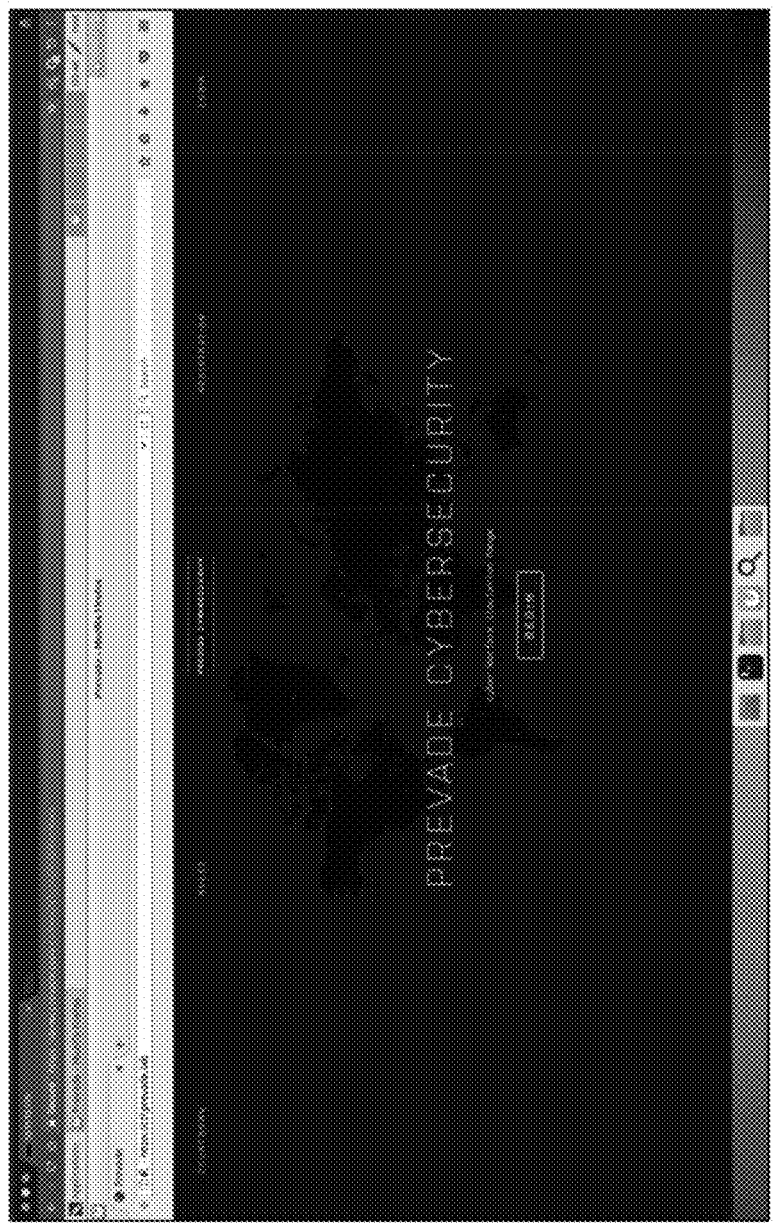
The scoreboard is accessed via browser on Kali Linux client.

Fig. 6.5

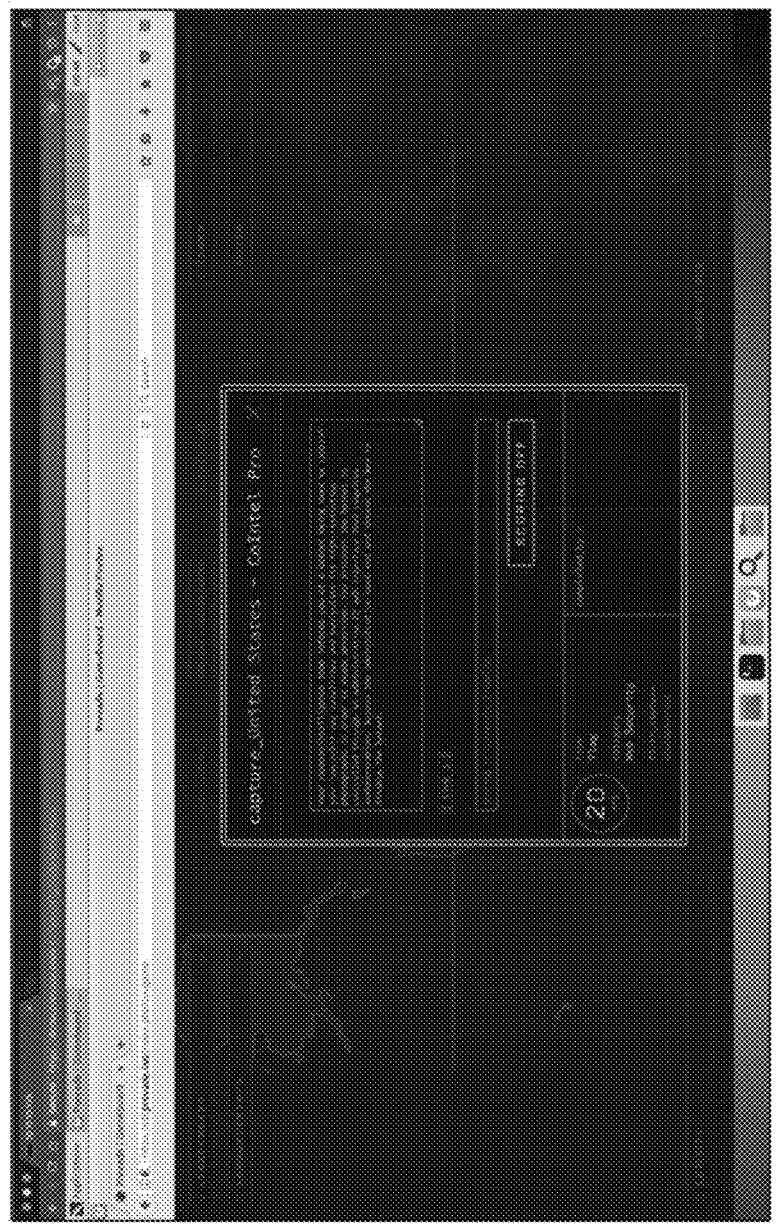
Fig. 6.6

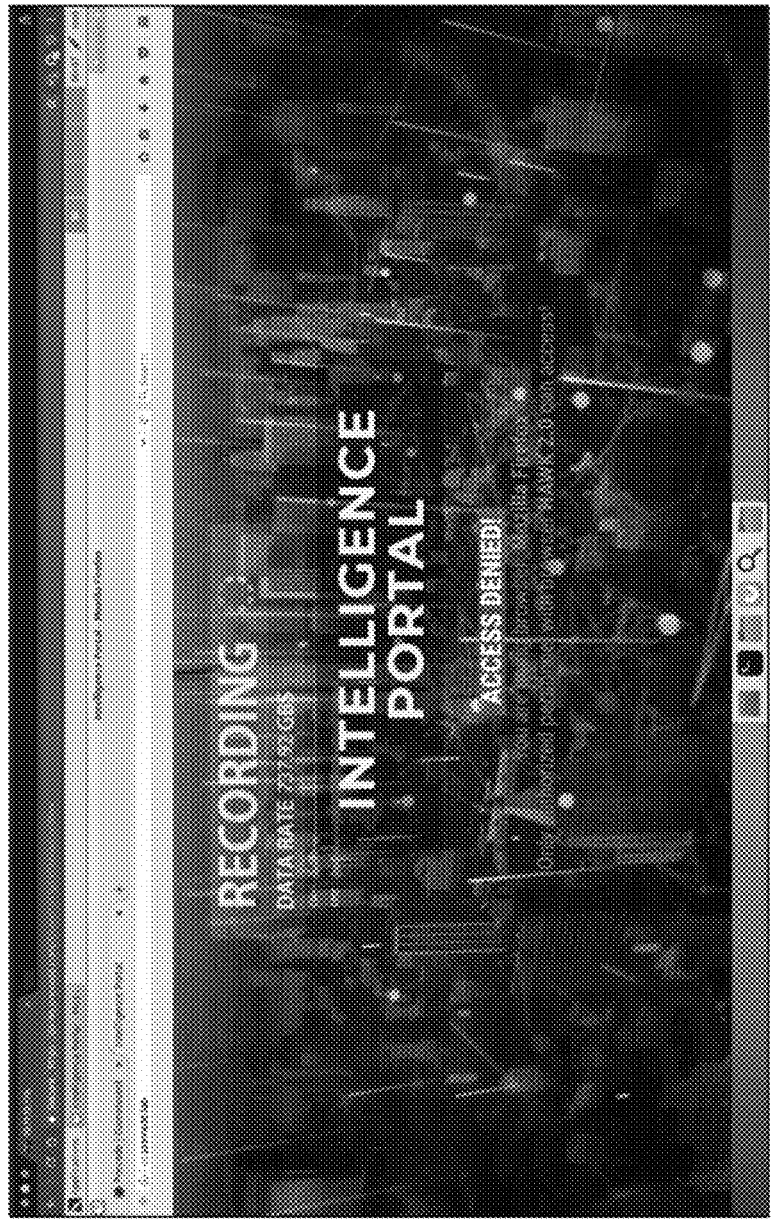
Fig. 6.7
Example challenge requiring the user to circumvent a security control and rewarded with points.

CYBERSECURITY TRAINING SYSTEM AND PROCESS

CROSS-REFERENCE TO RELATED APPLICATIONS

U.S. Provisional Application No. 62/641,658

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

TECHNICAL FIELD

The inventive subject matter relates to a cybersecurity training system.

BACKGROUND OF THE INVENTION

Cybersecurity involves the protection of computer systems from theft or damage to hardware, software or electronic data, and from disruption or misdirection of the services such computer systems provide. It is a field of great and ever-growing importance in the $21^{st}$ century, in which nearly all commercial and governmental institutions are critically reliant on computer systems that could be targets of cyberattacks. Individuals and teams therefore must be trained to provide cybersecurity services. As a result, many cybersecurity training solutions have been developed in recent years.

Previous cybersecurity training solutions do not provide an on-demand, custom-fit training environment that focuses on specific skill levels and areas of subject matter expertise.

Previous cybersecurity training solutions do not provide an immersive, hands-on experience in a simulated environment that reflects real-world cyber landscape.

Previous cybersecurity training solutions require attendee offsite attendance, proctor onsite attendance, on premise hardware/software installation and/or security policy exceptions.

Thus, there is a commercial need for new and improved cybersecurity training system.

BRIEF SUMMARY OF THE INVENTION

The present invention is directed to a novel cybersecurity training system and process. Features of the system and process may include a customized, on-demand cybersecurity training environment for individuals and groups, through a gamified, immersive, hands-on environment. Users may log into a secured web portal and select a graphical user interface desktop client virtual machine with security tools and challenges, which may be rendered through a browser connection. The system and process may provide an objective to use the security tools to complete the challenges, upon which Users may submit a unique character sequence on a scoreboard in exchange for points that are commensurate with the difficulty of the challenges. The challenges may include several subject domains and skill sets to ensure users of all skill levels are capable of participating.

Various additional objects, features, aspects, and advantages of the present invention will become more apparent from the following detailed description of preferred embodiments of the invention, along with the accompanying drawing in which like numerals represent like components.

BRIEF DESCRIPTION OF THE SEVERAL VIEWS OF THE DRAWING

FIGS. 4.1 through 4.63 show computer screenshots of one embodiment of the invention.

FIG. 5 shows a schematic diagram of one embodiment of the invention.

FIGS. 6.1 through 6.7 show computer screenshots of one embodiment of the invention.

DETAILED DESCRIPTION OF THE DRAWING

The following words appearing herein are understood by persons having skill in the art and are more specially defined as follows:

"Web portal" means is a website that authenticates administrative and non-administrative users and grants them access to training resources.

"Management portal" means a website that authenticates customers and partners and grants them access to customizing, purchasing, and provisioning their own training environment.

"Virtual machine" means is an emulated logical computer system that provides functionality of a physical computer.

"Connected" means the ability to transmit and receive information through a network.

"Security tool" means a software application designed to provide offensive or defensive security functionality.

"Browser" means a software application for accessing information on the world wide web.

"Challenge server" means a virtual machine which hosts challenge modules.

"Challenge" means an intentionally vulnerable target with varying degrees of difficulty in solving and several subject domains.

"Score" means a reward given for solving a challenge, commensurate with a challenge's level of difficulty.

"Scoreboard server" means a system which accepts proof of solving a challenge, rewards with points, and stores cumulative scores.

"Secure" means the ability to control access to re1tricted resources through identification, authentication, and authorization.

"Scoreboard map" means an interactive global map used to provide access to challenges.

"Hyperlink" means a reference to another website location or file.

There are many possible embodiments of the invention, some of which are described below.

Figure 1:
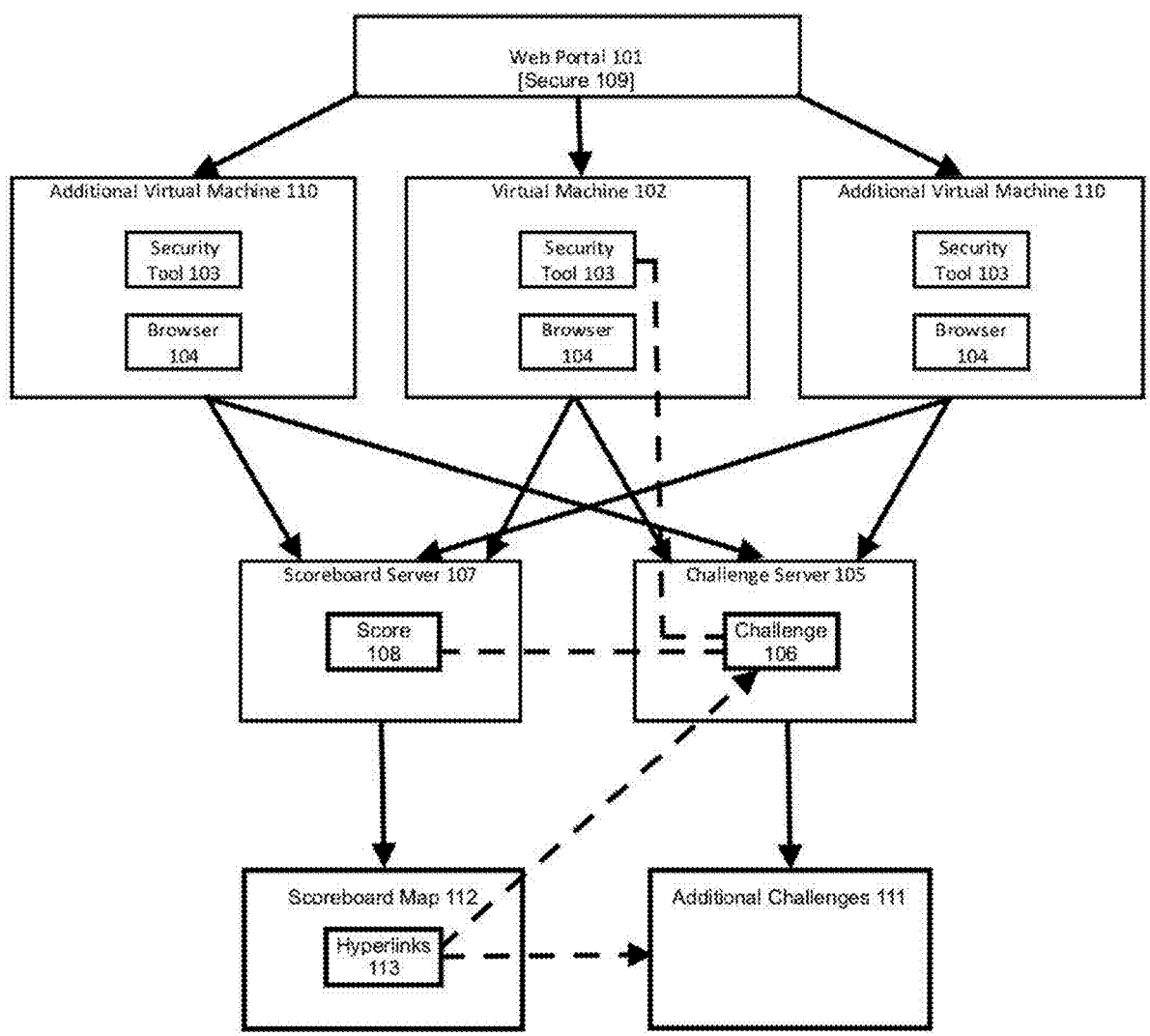
FIG. 1 shows a schematic diagram of one embodiment of the invention.

In further detail, FIG. 1 shows one embodiment of the invention whereby the cybersecurity training system and process may comprise: a web portal 101; a virtual machine 102 connected to the web portal 101; the virtual machine 102 comprising a security tool 103 and a browser 104; a challenge server 105 connected to the virtual machine 102; the challenge server 105 comprising a challenge 106; where the challenge 106 requires using the security tool 103; a scoreboard server 107 connected to the virtual machine 102; the scoreboard server 107 comprising a score 108; where the score 108 relates to the challenge 106. Further, the web portal 101 may be secure 109. Further, one or more additional virtual machines 110 may be connected to the web portal 101, the challenge server 105, and the scoreboard server 107. Further, the challenge server 105 may further comprise one or more additional challenges 111; the scoreboard server 107 may further comprise a scoreboard map 112; the scoreboard map 112 may further comprise hyperlinks 113 to the challenges 106 and 111.

Figure 2:
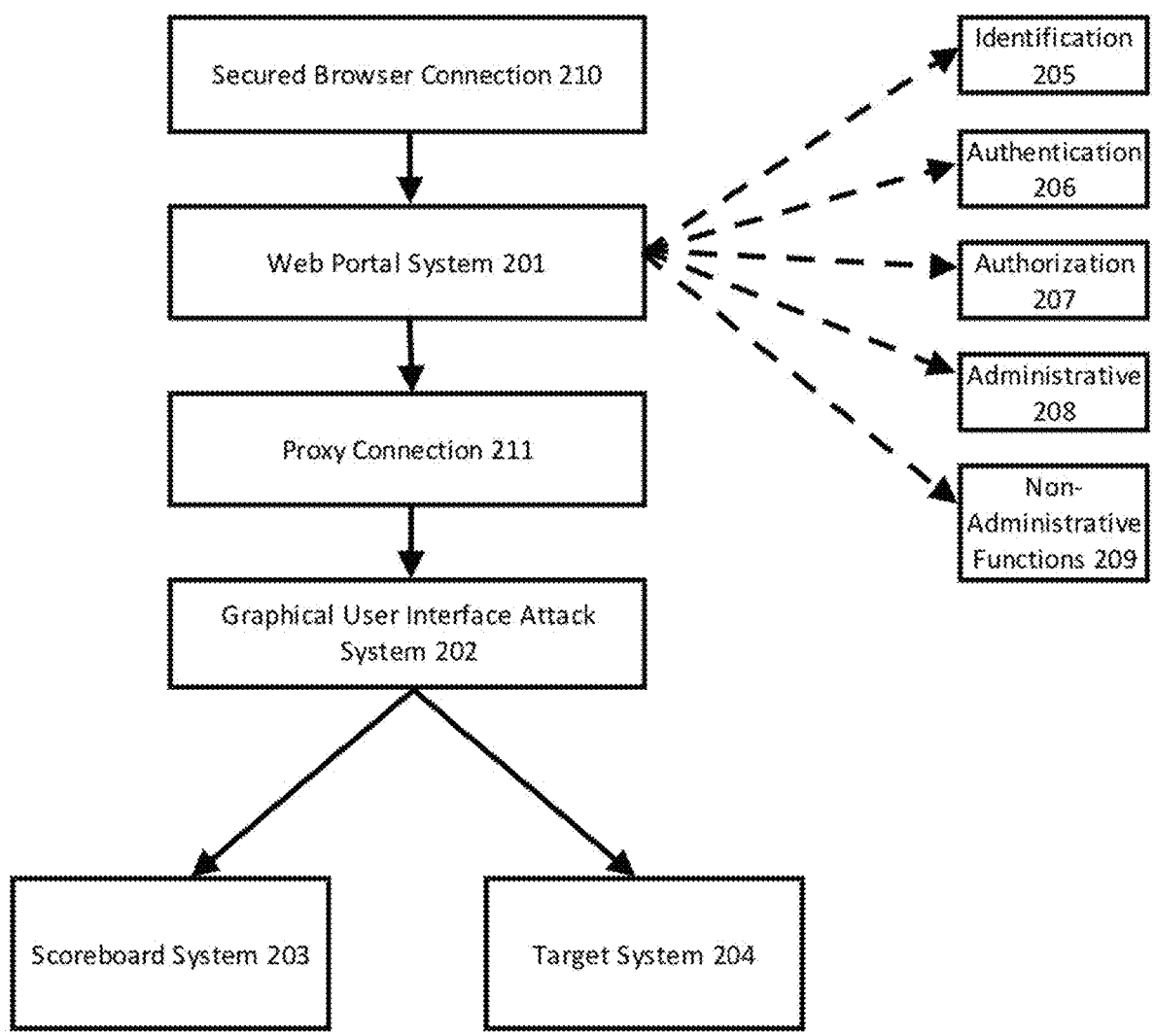
FIG. 2 shows a schematic diagram of one embodiment of the invention.

In further detail, FIG. 2 shows one embodiment of the invention whereby the cybersecurity training system and process may comprise: a web portal system 201, a graphical user interface attack system 202, a scoreboard system 203, and a target system 204. The web portal system 201 may facilitate identification 205, authentication 206, authorization 207, administrative 208, and non-administrative functions 209. The web portal system 201 may be accessed through a secured browser connection 210. Further, the web portal system 201 may facilitate a proxy connection 211 to the graphic user interface attack system(s) 202 through the secured browser connection 210. The scoreboard system 203 may be accessed via the graphical user interface attack system(s) 202. The target system 204 may be accessed is the graphical user interface attack system(s) 202.

Figure 3:
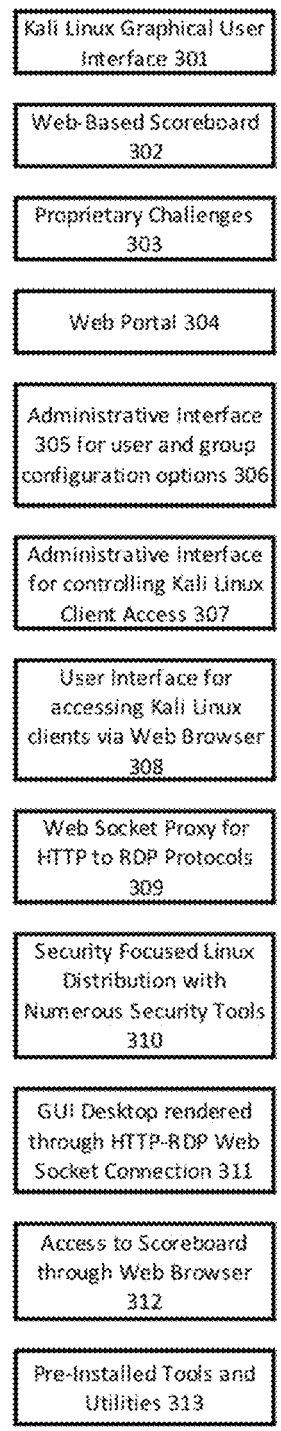
FIG. 3 shows a schematic diagram of one embodiment of the invention.

In further detail, FIG. 3 shows one embodiment of the invention whereby the cybersecurity training system and process may comprise a Kali Linux graphical user interface 301, a web-based scoreboard 302, proprietary challenges 303, and a web portal 304. Further, the system and process may include an administrative interface 305 for user and group configuration options 306, an administrative interface for controlling Kali Linux client access 307, a user interface for accessing Kali Linux clients via web browser 308, and a web socket proxy for HTTP to RDP protocols 309. Further, the system and process may feature security focused Linux distribution with numerous security tools 310, a GUI desktop rendered through HTTP-RDP web socket connection 311, access to scoreboard through web browser 312. Further, challenges may be solved using pre-installed tools and utilities 313.

In further detail, FIG. 4 shows computer screenshots of one embodiment of the invention.

4.1 shows the log in of an administrator using the web portal interface; successful authentication permits the administrator to manage accounts and access to training resources.

4.2 through 4.5 show different connections that are the various virtual machines that are running within the environment. The docker server/challenge server hosts the learning modules or flags or challenges. The web portal is the interface, users would log in to in order to access with the environment. The Kali Linux virtual machine(s) are what users would use to interact with the challenges and scoreboard. The scoreboard is where challenge points are earned through circumventing security controls.

4.6 through 4.12 show the setup of a demo where the user is given access to a Kali Linux instance and to a sharing profile that may be used for collaboration or troubleshooting. Multiple connections and teams can be created, grouped, and isolated from each other's machines. Access to a Kali Linux graphical user interface desktop environment may be made through a secured browser connection using web socket technologies.

FIG. 4.13 through 4.18 show the Kali Linux graphical user interface desktop environment with preinstalled security tools and a responsive interface, just as if the virtual machine were running locally on a laptop or desktop. The primary way that users access the challenges and scoreboard is through the web browser inside the Kali Linux machine.

FIG. 4.19 through 4.23 show the user logging in as an administrator to the administrative interface to the scoreboard; where the user may configure the flags which are the individual learning modules or challenges. The challenges have a title and a narrative about what the objective is to make it entertaining and gamified. A flag is shown that is submitted for points. The scoring system is based on ten levels of difficulty from ten to one hundred. Each level of difficulty is commensurate with the level of points. The levels are subdivided into subject domain categories.

FIG. 4.24 through 4.26 show the user beginning the game. Users would typically access the scoreboard itself to learn about the objectives of individual challenges and the challenge sever to work on the challenges.

FIG. 4.27 through 4.60 show a variety of active challenges. With respect to Japan, for example, a narrative is shown describing the type of cybersecurity reconnaissance techniques that are required. Clicking the link directs the user over to an internally hosted website on http://jp.prevade.lab. The user must then find that there is a file called robots.txt which has a sub-directory that is not supposed to be accessed. The user is shown copying and pasting that directory into the browser, and subsequently accessing a file called flag.txt. The user clicks on the flag.txt file, obtains the flag, and copies it back to the scoreboard, and submits it for points. It is shown that the user is the first one to capture this particular challenge, or flag. Several other challenges are shown. Several other features exist in this interface, including a leaderboard, announcements, and activity, and game clock.

FIG. 4.61 through 4.63 show the user logging out and returning to the portal interface.

In further detail, FIG. 5.1 through 5.3 shows a schematic diagram of one embodiment of the invention with elements labeled in the Figures. After registering an account with Prevade on the Management Portal, customers and Partners have the ability to select a series of options to customize, purchase, and provision a dedicated training environment for their use, with a specified duration, for which they are billed accordingly. Using a unique API key, an API gateway authorizes the invocation a Function-as-a-Service (FaaS) function, which runs proprietary code that bootstraps and provisions the entire infrastructure as shown. Upon completion, customers and partners receive a notification of how to access their customized Metaform deployment.

In further detail, FIGS. 6.1 through 6.7 show computer screenshots of one embodiment of the invention. Once deployed, customers and partners can login to the web portal and access the environment. This interface provides both administrative and non-administrative functionality to grant and/or revoke access to the Kali Linux virtual machines. Non-administrative user access the scoreboard and challenge server by selecting a Kali Linux client within the web portal interface.

Figure 7:
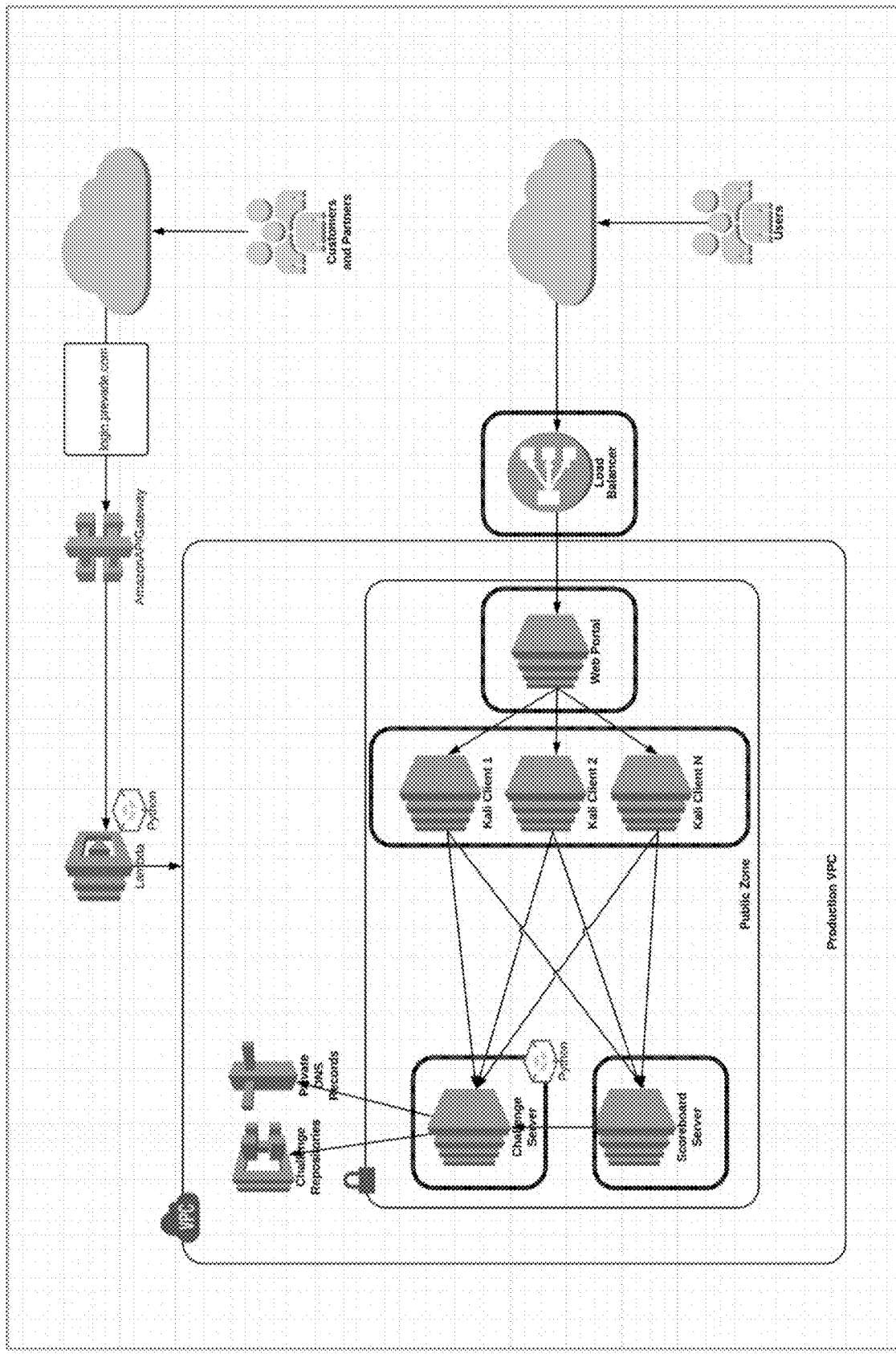
FIG. 7 shows a schematic diagram of one embodiment of the invention.

In further detail, FIG. 7 shows a schematic diagram of one embodiment of the invention with elements labeled in the Figure. Once the FaaS bootstrapping completes, the challenge server runs proprietary Python code to retrieve the challenge images from the challenge repository, queries the privately hosted DNS service, map the challenges' corresponding IP addresses, and challenges' DNS hostnames.

There are many advantages of the invention compared to previous cybersecurity training solutions, some of which are described below, by way of example.

A further advantage of the invention is that it may provide on-demand, custom-fit training environment that focuses on specific skill levels and areas of subject matter expertise.

A further advantage of the invention is that may Provide immersive, hands-on experience in a simulated environment that reflects real-world cyber landscape.

A further advantage of the invention is that it does not require attendee offsite attendance, proctor onsite attendance, on premise hardware/software installation, and/or security policy exceptions.

A further advantage of the invention is that it may be accessed via secured browser connection.

A further advantage of the invention is that it does not require any software installation or policy exceptions.

A further advantage of the invent on is that it may be accessed from any device with a web browser, any location, any time.

A further advantage of the invention is that it may provide on demand, automated, scalable provisioning.

A further advantage of the invention is that it may provide customized proprietary challenges.

A further advantage of the invent on is that it may be adapted to all skill levels.

A further advantage of the invention is that it my include many different subject domains, many different levels of difficulty, and many different missions hosted in an on-demand, web-accessible, and dedicated tenancy cloud environment.

A further advantage to the invention is that the gamification of training makes learning fun and entertaining.

A further advantage to the invention is that users can train individually or with a team.

A further advantage to the invention is that users can compete individually or with a team.

A further advantage to the invention is that it may be used by individuals or for group training events, live vendor product demonstrations, talent acquisitions, or skills assessments.

It should be appreciated that each of the different components of the present disclosure may be implemented using different combinations of software, firmware, and/or hardware. Thus, the techniques described herein and shown in the figures can be implemented using code and data stored and executed on one or more electronic devices (e.g., computer). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device.

While the foregoing written description of the invention enables one of ordinary skill to make and use what is considered presently to be the best mode thereof, those of ordinary skill will understand and appreciate the existence of variations, combinations, and equivalents of these specific embodiments. The invention should therefore not be limited by the above described embodiments, but shall include all embodiments within the scope and spirit of the invention.

The invention claimed is:

1. A cyber simulation training platform system providing a remotely accessible, on-demand, customizable using an administrative interface, and gamified teaching and learning environment for developing skills and experience of a user to respond to cybersecurity threats and attacks comprising:
   a web portal connected to a hardware processor, such that the cyber simulation training platform system is operable in a dedicated tenancy cloud environment;
   a virtual machine connected to the web portal; the virtual machine comprising a plurality of security tools and a browser; where the security tools comprise offensive or defensive security functionalities;
   a challenge server connected to the virtual machine; the challenge server comprising a plurality of challenges; where the challenges simulate intentionally vulnerable targets adapted for cybersecurity training; where each of the challenges requires using one or more of the security tools to complete the challenge; where the plurality of challenges comprise varying degrees of difficulty;
   a scoreboard server connected to the virtual machine; the scoreboard server comprising a score awarded to the user for each of the challenges the user completes; the score for each of the challenges being commensurate with the degree of difficulty of each of the challenges; the score being viewable by the user.

2. The cyber simulation training platform system of claim 1 further comprising a scoreboard map.

3. The cyber simulation training platform system of claim 1 further comprising a scoreboard map comprising a hyperlink to the cybersecurity training challenge.

4. The cyber simulation training platform system of claim 1 further comprising a management portal.

5. The cyber simulation training platform system of claim 1 where the web portal is a secure web portal.

6. The cyber simulation training platform system of claim 1 where the virtual machine further comprises a graphical user interface.

7. The cyber simulation training platform system of claim 1 further comprising one or more additional virtual machines.

* * * * *